US012652569B2

(12) United States Patent
Muruganathan et al.

(10) Patent No.: US 12,652,569 B2
(45) Date of Patent: Jun. 9, 2026

(54) TYPE II CSI REPORTING FOR CJT WITH ANGLE AND DELAY RECIPROCITY

(71) Applicant: Telefonaktiebolaget LM Ericsson (publ), Stockholm (SE)

(72) Inventors: Siva Muruganathan, Stittsville (CA); Fredrik Athley, Västra Frölunda (SE); Shiwei Gao, Nepean (CA); Andreas Nilsson, Gothenburg (SE); Xinlin Zhang, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 227 days.

(21) Appl. No.: 18/685,944

(22) PCT Filed: Aug. 23, 2022

(86) PCT No.: PCT/IB2022/057900
§ 371 (c)(1),
(2) Date: Feb. 23, 2024

(87) PCT Pub. No.: WO2023/026197
PCT Pub. Date: Mar. 2, 2023

(65) Prior Publication Data
US 2025/0159518 A1     May 15, 2025

Related U.S. Application Data

(60) Provisional application No. 63/236,160, filed on Aug. 23, 2021.

(51) Int. Cl.
*H04W 24/10* (2009.01)
*H04B 7/0456* (2017.01)
*H04L 5/00* (2006.01)

(52) U.S. Cl.
CPC .......... *H04W 24/10* (2013.01); *H04B 7/0481* (2023.05); *H04L 5/0051* (2013.01)

(58) Field of Classification Search
CPC .... H04W 24/10; H04B 7/0481; H04L 5/0051; H04L 5/0055; H04L 5/0062; H04L 5/0023; H04L 5/0057; H04L 5/0094; H04L 5/005
See application file for complete search history.

(56) References Cited

U.S. PATENT DOCUMENTS

| 10,020,860 B2 | 7/2018 | Onggosanusi et al. |
| 11,936,456 B2 | 3/2024 | Grossman et al. |

(Continued)

FOREIGN PATENT DOCUMENTS

| EP | 4106217 A1 * | 12/2022 | ........... H04B 7/0456 |
| WO | 2023026195 A1 | 3/2023 | |

(Continued)

OTHER PUBLICATIONS

Author Unknown, "Technical Specification Group Radio Access Network; NR; Physical layer procedures for data (Release 16)," Technical Specification 38.214, Version 16.5.0, Mar. 2021, 3GPP Organizational Partners, 171 pages.

(Continued)

*Primary Examiner* — Nizar N Sivji
(74) *Attorney, Agent, or Firm* — Withrow & Terranova, PLLC

(57) ABSTRACT

Systems and methods are disclosed herein for Channel State Information (CSI) reporting with angle and delay reciprocity. Embodiments of a User Equipment (UE) and a method of operation thereof are disclosed. Embodiments of network node and a method of operation thereof are also disclosed.

17 Claims, 15 Drawing Sheets

(56)                References Cited

U.S. PATENT DOCUMENTS

| | | | | |
|---|---|---|---|---|
| 12,432,588 | B2 * | 9/2025 | Zeineddine | .......... H04B 17/345 |
| 12,563,434 | B2 | 2/2026 | Khoshnevisan et al. | |
| 2021/0359745 | A1 | 11/2021 | Farag et al. | |
| 2022/0303812 | A1 * | 9/2022 | Chung | ................ H04W 52/281 |
| 2023/0037394 | A1 | 2/2023 | Rahman et al. | |
| 2023/0061722 | A1 | 3/2023 | Hao et al. | |
| 2023/0246781 | A1 | 8/2023 | Kim et al. | |
| 2023/0403058 | A1 | 12/2023 | Khan Beigi et al. | |

FOREIGN PATENT DOCUMENTS

| | | | |
|---|---|---|---|
| WO | 2023026196 | A1 | 3/2023 |
| WO | 2023026200 | A1 | 3/2023 |

OTHER PUBLICATIONS

Author Unknown, "Technical Specification Group Radio Access Network; NR; Radio Resource Control (RRC) protocol specification (Release 16)," Technical Specification 38.331, Version 16.5.0, Jun. 2021, 3GPP Organizational Partners, 959 pages.

Ericsson, "R1-2101687: CSI enhancements for Multi-TRP and FR1 FDD reciprocity," 3GPP TSG-RAN WG1 Meeting #104-e, Jan. 25-Feb. 5, 2021, Electronic Meeting, 22 pages.
Huawei, et al., "RWS-210437: NR enhancements for DL MIMO," 3GPP TSG RAN Meeting #92-e, Jun. 28-Jul. 2, 2021, Electronic Meeting, 14 pages.
Huawei, et al., "R1-2101884: Summary of CSI enhancements for MTRP and FDD (Round 0)," 3GPP TSG RAN WG1 Meeting #104-e, Jan. 25-Feb. 5, 2021, Electronic Meeting, 48 pages.
Samsung, "RWS: 210181: On Rel-18 NR MIMO enhancements for 5G Advanced," 3GPP TSG RAN Rel-18 Workshop, Jun. 28-Jul. 2, 2021, Electronic Meeting, 9 pages.
International Search Report and Written Opinion for International Patent Application No. PCT/IB2022/057898, mailed Dec. 21, 2022, 16 pages.
International Search Report and Written Opinion for International Patent Application No. PCT/IB2022/057907, mailed Dec. 16, 2022, 18 pages.
International Search Report and Written Opinion for International Patent Application No. PCT/IB2022/057899, mailed Dec. 14, 2022, 18 pages.
International Search Report and Written Opinion for International Patent Application No. PCT/IB2022/057900, mailed Dec. 20, 2022, 18 pages.

* cited by examiner

OFDM SYMBOL #

Step 2:

- Based on the estimates $\hat{\tau}_i$, $\hat{\theta}_i$, and $\hat{\varphi}_i$, gNB computes SD and FD precoders $w_{SD}^{(p)}$ and $w_{FD}^{(p)}$ for CSI-RS port $p$, for $p = 1, \ldots, P$

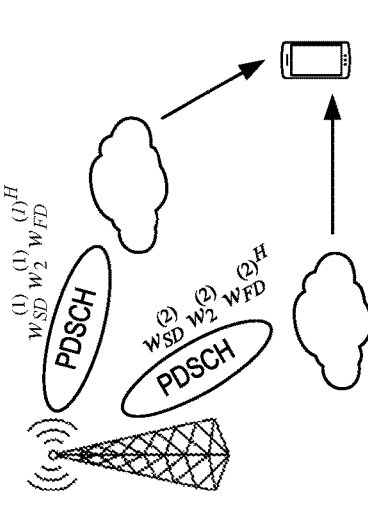

$w_{SD}^{(1)} w_{FD}^{(1)H}$

CSI-RS 1

CSI-RS 2

$w_{SD}^{(2)} w_{FD}^{(2)H}$

Step 4:

- In DL, gNB computes PDSCH precoder based on $w_{SD}^{(p)}$, $w_{FD}^{(p)}$ and UE feedback, and performs PDSCH transmission

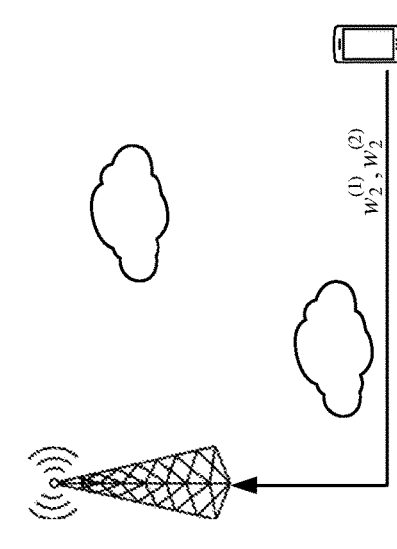

$w_{SD}^{(1)} w_2^{(1)} w_{FD}^{(1)H}$

PDSCH

PDSCH $w_{SD}^{(2)} w_2^{(2)} w_{FD}^{(2)H}$

Step 1:

- In UL, UE sounds SRS
- gNB estimates delay $\tau_i$ and angle $\theta_i$, $\varphi_i$ to propagation clusters

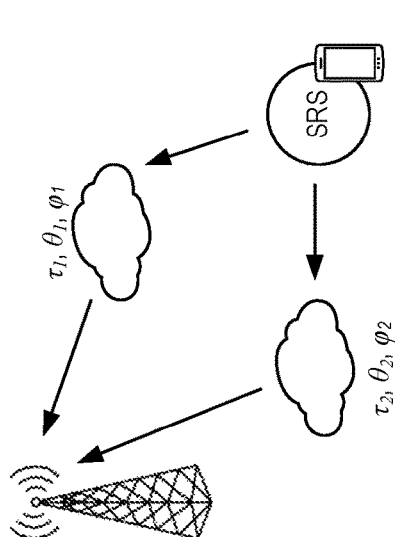

SRS $\tau_1, \theta_1, \varphi_1$ $\tau_2, \theta_2, \varphi_2$

Step 3:

- UE measures the CSI-RS ports, and computes and feeds back the complex coefficients $w_2^{(p)}$ for combining the $P$ ports $w_2^{(1)}, w_2^{(2)}$

*FIG. 6*

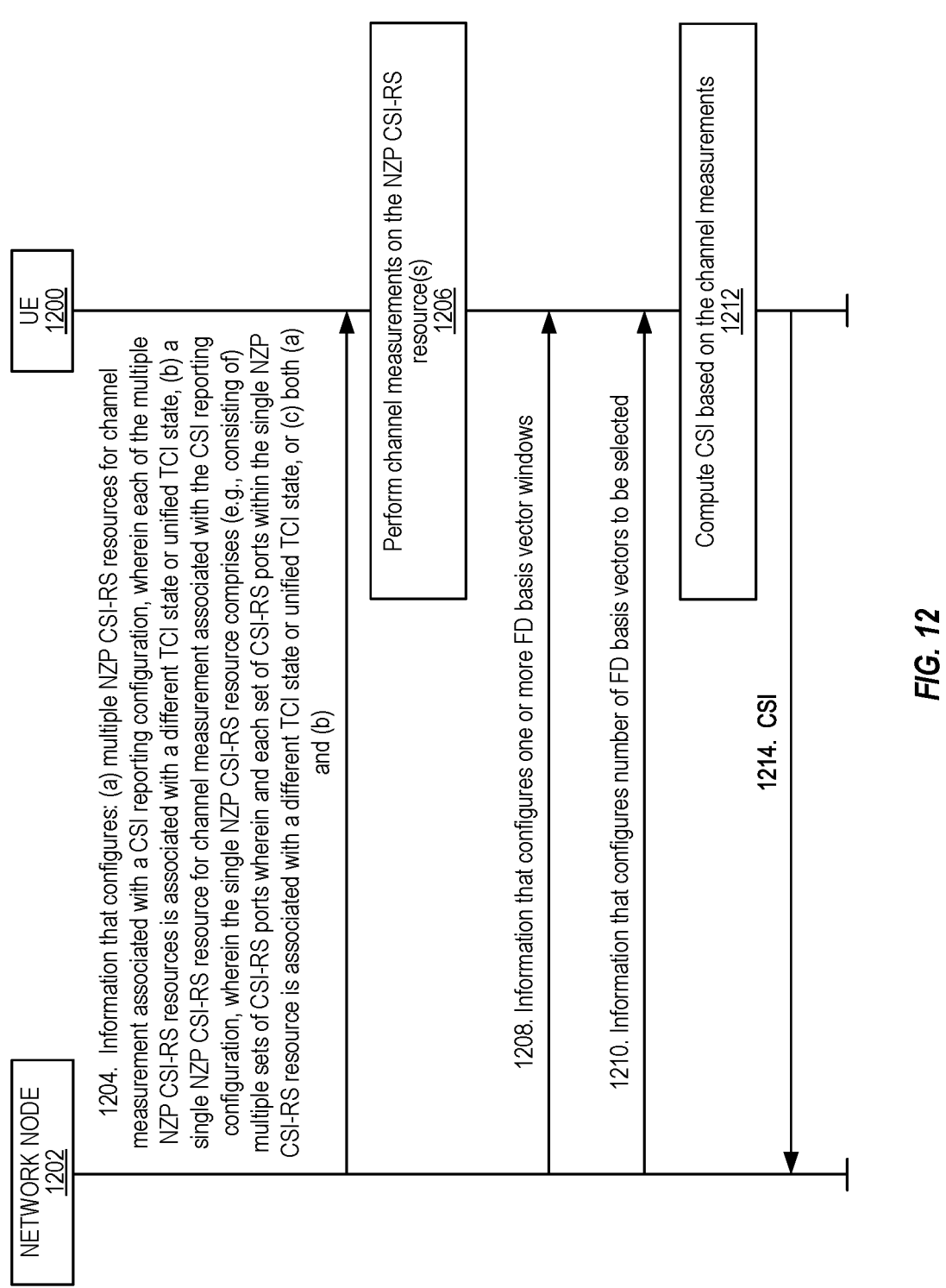

NETWORK NODE 1202

UE 1200

1204. Information that configures: (a) multiple NZP CSI-RS resources for channel measurement associated with a CSI reporting configuration, wherein each of the multiple NZP CSI-RS resources is associated with a different TCI state or unified TCI state, (b) a single NZP CSI-RS resource for channel measurement associated with the CSI reporting configuration, wherein the single NZP CSI-RS resource comprises (e.g., consisting of) multiple sets of CSI-RS ports wherein and each set of CSI-RS ports within the single NZP CSI-RS resource is associated with a different TCI state or unified TCI state, or (c) both (a) and (b)

Perform channel measurements on the NZP CSI-RS resource(s) 1206

1208. Information that configures one or more FD basis vector windows

1210. Information that configures number of FD basis vectors to be selected

Compute CSI based on the channel measurements 1212

1214. CSI

FIG. 12

TYPE II CSI REPORTING FOR CJT WITH ANGLE AND DELAY RECIPROCITY

RELATED APPLICATIONS

This application is a 35 U.S.C. § 371 national phase filing of International Application No. PCT/IB2022/057900, filed Aug. 23, 2022, which claims the benefit of provisional patent application Ser. No. 63/236,160, filed Aug. 23, 2021, the disclosures of which are hereby incorporated herein by reference in their entireties.

TECHNICAL FIELD

The present disclosure relates to a wireless communication system and, more specifically, relates to Channel State Information (CSI) feedback in a wireless communication system.

BACKGROUND

1.1 Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The Third Generation Partnership Project (3GPP) New Radio (NR) standard is currently evolving with enhanced MIMO support. A core component in NR is the support of MIMO antenna deployments and MIMO related techniques like for instance spatial multiplexing. The spatial multiplexing mode is aimed for high data rates in favorable channel conditions. An illustration of the spatial multiplexing operation is provided in FIG. 1.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a Precoder Matrix Indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

NR uses Orthogonal Frequency Division Multiplexing (OFDM) in the downlink (and Discrete Fourier Transform (DFT) precoded OFDM in the uplink for rank-1 transmission) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the User Equipment (UE).

In closed-loop precoding for the $N_R$ downlink, the UE transmits, based on channel measurements in the downlink, recommendations to the $N_R$ base station (gNB) of a suitable precoder to use. The gNB configures the UE to provide feedback according to CSI-ReportConfig and may transmit Channel State Information Reference Signal (CSI-RS) and configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of Channel State Information (CSI) feedback, which also encompasses feeding back other information than recommended precoders to assist the gNodeB in subsequent transmissions to the UE. Such other information may include Channel Quality Indicators (CQIs) as well as transmission Rank Indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 Physical Resource Blocks (PRBs) depending on the band width part (BWP) size.

Given the CSI feedback from the UE, the gNB determines the transmission parameters it wishes to use to transmit to the UE, including the precoding matrix, transmission rank, and Modulation and Coding Scheme (MCS). These transmission parameters may differ from the recommendations the UE makes. The transmission rank, and thus the number of spatially multiplexed layers, is reflected in the number of columns of the precoder W. For efficient performance, it is important that a transmission rank that matches the channel properties is selected.

1.2 2D Antenna Arrays

Embodiments of solution(s) described in the present disclosure may be used with two-dimensional (2D) antenna arrays and some of the presented embodiments use such antennas. Such antenna arrays may be (partly) described by the number of antenna columns corresponding to the horizontal dimension $N_h$, the number of antenna rows corresponding to the vertical dimension Ny and the number of dimensions corresponding to different polarizations $N_p$. The total number of antennas is thus $N = N_h N_v N_p$. The concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with dual-polarized antenna elements is illustrated in FIG. 2.

Precoding may be interpreted as multiplying the signal with different beamforming weights for each antenna prior to transmission. A typical approach is to tailor the precoder to the antenna form factor, i.e. taking into account $N_h$, $N_v$ and $N_p$ when designing the precoder codebook.

1.3 Channel State Information Reference Signals (CSI-RS)

For CSI measurement and feedback, CSI-RS are defined. A CSI-RS is transmitted on each antenna port and is used by a UE to measure downlink channel between each of the transmit antenna ports and each of its receive antenna ports. The transmit antenna ports are also referred to as CSI-RS ports. The supported number of antenna ports in NR are {1,2,4,8,12,16,24,32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain REs in a slot and certain slots. FIG. 3 shows an example of CSI-RS REs for 12 antenna ports, where 1 Resource Element (RE) per Resource Block (RB) per port is shown.

In addition, Interference Measurement Resource (IMR) is also defined in $N_R$ for a UE to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI, i.e. rank, precoding matrix, and the channel quality.

Furthermore, a UE in NR may be configured to measure interference based on one or multiple NZP CSI-RS resource.

1.4 CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report.

Each CSI reporting setting contains at least the following information:

A CSI-RS resource set for channel measurement

An IMR resource set for interference measurement

Optionally, a CSI-RS resource set for interference measurement

Time-domain behavior, i.e. periodic, semi-persistent, or aperiodic reporting

Frequency granularity, i.e. wideband or subband

CSI parameters to be reported such as RI, PMI, CQI, and CSI-RS Resource Indicator (CRI) in case of multiple CSI-RS resources in a resource set Codebook types, i.e. type I or II, and codebook subset restriction.

Measurement restriction.

Subband size. One out of two possible subband sizes is indicated, the value range depends on the bandwidth of the bandwidth part (BWP). One CQI/PMI (if configured for subband reporting) is fed back per subband).

1.5 DFT-Based Precoders

A common type of precoding is to use a DFT-precoder, where the precoder vector used to precode a single-layer transmission using a single-polarized Uniform Linear Array (ULA) with N antennas is defined as $$
w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \frac{k}{QN}} \end{bmatrix},
$$

where k=0,1, . . . . QN−1 is the precoder index and Q is an integer oversampling factor. A corresponding precoder vec-

4 tor for for a two-dimensional Uniform Planar Array (UPA) can be created by taking the Kronecker product of two precoder vectors as $$
w_{2D}(k, l) = w_{1D}(k) \otimes w_{1D}(l).
$$

Extending the precoder for a dual-polarized UPA may then be done as $$
w_{2D,DP}(k, l, \phi) =
$$

$$
\begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},
$$

where $e^{J\phi}$ is a co-phasing factor that may for instance to be selected from Quadrature Phase Shift Keying (QPSK) alphabet $$
\phi \in \left\{ 0, \frac{\pi}{2}, \pi, \frac{3\pi}{2} \right\}.
$$

A precoder matrix $W_{2D,DP}$ for multi-layer transmission may be created by appending columns of DFT precoder vectors as $$
W_{2D,DP} = [w_{2D,DP}(k_1, l_1, \phi_1) w_{2D,DP}(k_2, l_2, \phi_2) \cdots w_{2D,DP}(k_r, l_r, \phi_r)],
$$

where r is the number of transmission layers, i.e. the transmission rank. In a common special case, for a rank-2 DFT precoder, $k_1=k_2=k$ and $l_1=l_2=l$, meaning that $$
W_{2D,DP} =
$$

$$
[w_{2D,DP}(k, l, \phi_1) w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.
$$

Such DFT-based precoders are used for instance in NR Type I CSI feedback.

1.6 Mu-Mimo

With multi-user MIMO (MU-MIMO), two or more UEs in the same cell are co-scheduled on the same time-frequency resource. That is, two or more independent data streams are transmitted to different UEs at the same time, and the Spatial Domain (SD) is used to separate the respective streams. By transmitting several streams simultaneously, the capacity of the system can be increased. This, however, comes at the cost of reducing the Signal to Interference plus Noise Ratio (SINR) per stream, as the power must be shared between streams, and the streams will cause interference to each-other.

1.7 Multi-Beam (Linear Combination) Precoders

One central part of MU-MIMO is to obtain accurate CSI that enables null forming between co-scheduled UEs. Therefore, support has been added in Long Term Evolution (LTE) Rel. 14 and NR Rel.15-16 for codebooks that provide more detailed CSI than the traditional single DFT-beam precoders. These codebooks, which are referred to as Advanced CSI (LTE), Type II codebooks (NR Rel.15), and enhanced Type II codebooks (NR Rel.16), can be described as a set of precoders where each precoder is created from multiple DFT beams. A multi-beam precoder may be defined as a linear combination of several DFT precoder vectors as $$w = \sum_i c_i \cdot w_{2D,DP}(k_i, l_i, \phi_i),$$

where $\{c_i\}$ may be general complex coefficients. Such a multi-beam precoder may more accurately describe the UE's channel and may thus bring an additional performance benefit compared to a DFT precoder, especially for MU-MIMO where rich channel knowledge is desirable in order to perform nullforming between co-scheduled UEs.

1.7.1 NR Rel-15 Type II Codebook

For the NR Type II codebook in Rel-15, the precoding vector for each layer and subband is expressed in 3GPP Technical Specification (TS) 38.214 for a given dual-polarization antenna array with $N_1$ and $N_2$ elements in each dimension for each polarization as:

$$W^l_{q_1, q_2, n_1, n_2, p_l^{(1)}, p_l^{(2)}, c_l} =$$

$$\frac{1}{\sqrt{N_1 N_2 \sum_{i=0}^{2L-1} \left( p_{l,i}^{(1)} p_{l,i}^{(2)} \right)^2}} \begin{bmatrix} \sum_{i=0}^{L-1} v_{m_1^{(i)}, m_2^{(i)}} p_{l,i}^{(1)} p_{l,i}^{(2)} \varphi_{l,i} \\ \sum_{i=0}^{L-1} v_{m_1^{(i)}, m_2^{(i)}} p_{l,i+L}^{(1)} p_{l,i+L}^{(2)} \varphi_{l,i+L} \end{bmatrix}, l = 1, 2$$

If we restructure the above formula and express it a bit simpler, we can form the precoder vector $W_{l,p}(k)$ for a certain layer $l=0,1$, polarization $p=0.1$ and subband $k=0, \ldots, N_{SB}-1$ as $$w_{l,p}(k) = \frac{1}{C} \sum_{i=0}^{L-1} v_i p_{l,i}^{(1)} c_{l,i}(k)$$

where $v_i = w_{2D}(m_1, m_2) = w_{1D}(m_1) \otimes w_{1D}(m_2)$ is the $i^{th}$ selected 2D beam, $$c_{l,i}(k) = p_{l,i}^{(2)}(k)\varphi_{l,i}(k) \text{ for } p = 0 \text{ and } c_{l,i}(k) = p_{l,L+i}^{(2)}(k)\varphi_{l,L+i}(k)$$

for $p=1$, and $N_{SB}$ is the number of subbands in the CSI reporting bandwidth. Hence, the change in a beam coefficient across frequency $c_{l,i}(k)$ is determined based on the $2N_{SB}$ parameters $$p_{l,i}^{(2)}(0), \ldots, p_{l,i}^{(2)}(N_{SB} - 1)$$

and $\varphi_{l,i}(0), \ldots, \varphi_{l,i}(N_{SB}-1)$, where the subband amplitude parameter $$p_{l,i}^{(2)}$$

is quantized using 0 or 1 bit, and the subband phase parameter Qui is quantized using 2 or 3 bits (i.e., either QPSK or 8 PSK alphabets), depending on codebook configuration. Further details of the NR rel-15 Type II codebook and associated CSI reporting can be found in 3GPP TS 38.214 V16.5.0 (Clause 5.2.2.2.3).

1.7.2 NR Rel-16 Type II Codebook

For NR Rel-16 Type II, overhead reductions mechanism has been specified. The rationale is that it has been observed that there is a strong correlation between different values of $c_{l,i}$, for different subbands, and one could exploit this correlation to perform efficient compression in order to reduce the number of bits required to represent the information. This would thus lower the amount of information which needs to be signaled from the UE to the gNB which is relevant from several aspects.

Thus, in NR Rel-16 Type II codebook, a set of Frequency Domain (FD) DFT vectors over a set of subbands is introduced. The codebook design for NR Rel-16 Type II codebook can be described as follows:

Precoder matrix for all FD-units for a spatial layer is given by a size-$P \times N_3$ matrix $$W = \left[ w^{(0)} \ldots w^{(N_3-1)} \right] = W_1 \tilde{W}_2 W_f^H,$$

where $P=2N_1N_2$ is the number of antenna ports or the SD dimensions, where $N_1$ and $N_2$ are the number of antenna ports in the $1^{st}$ dimension and the 2nd dimension of the antenna array, respectively $N_3=N_{SB} \times R$ is the number of PMI subbands, or the FD dimension, where The value $R=\{1,2\}$ (the PMI subband size indicator) is Radio Resource Control (RRC) configured $N_{SB}$ is the number of CQI subbands, which is also configured by RRC.

This applies for $N_{SB} \times R \leq 13$, $W_1$ is size-$P \times 2$ L spatial compression matrix, where L is a number of selected beams or 2D spatial DFT vectors out of P 2D spatial DFT vectors $\{W_{2D}(m_1, m_2), m_1=0,1 \ldots, N_1; m_2=0,1, \ldots, N_2\}$ $W_f$ is size-$N_3 \times M$ frequency compression matrix, where M is a number of selected FD basis vectors out of the $N_3$ orthogonal FD DFT basis vectors $\{f_0 f_1 \ldots f_{N_3-1}\}$, where $f_k$ is a size-$N_3 \times 1$ frequency domain DFT vector $\tilde{W}_2$ is size 2 L×M coefficient matrix Precoder normalization: the precoding matrix for a given rank and unit of $N_3$ is normalized to norm 1/sqrt(rank)

v □$\{1, \ldots, RI_{MAX}\} \in \{1, \ldots, RI_{MAX}\}$ is the rank reported in Part 1 of the CSI report SD compression by $W_1$ L SD basis vectors are selected; the L SD basis vectors mapped to the two polarizations, and hence there are 2 L columns in total in $W_1$ Compression in SD using $$W_1 = \begin{bmatrix} v_0 v_1 \ldots v_{L-1} & 0 \\ 0 & v_0 v_1 \ldots v_{L-1} \end{bmatrix},$$

where $$\{v_i\}_{i=0}^{L-1}$$

are $N_1 N_2 \times 1$ orthogonal 2D SD DFT vectors (same as Rel. 15 Type II) from rotated DFT basis 4 rotation hypotheses per spatial dimension corresponding to 4× oversampling SD-basis selection is layer-common The value of L={2,4,6} (number of "beams" or SD-basis vectors) is RRC configured L=6 only supported for limited parameter setting:

$$32\, Tx,\, R=1,\, (p, \beta) \in \left\{ \left(\frac{1}{4}, \frac{1}{4}\right), \left(\frac{1}{4}, \frac{1}{2}\right), \left(\frac{1}{4}, \frac{3}{4}\right), \left(\frac{1}{2}, \frac{1}{4}\right) \right\}$$

Frequency-domain (FD) compression by $W_f$

Compression via $W_f = [f_{k_0}\, f_{k_1} \ldots f_{k_{M-1}}]$, where $$\{f_{k_m}\}_{m=0}^{M-1}$$

are M size-$N_3 \times 1$ orthogonal frequency domain DFT vectors, where $M = \lceil p \times N_3 / R \rceil$, and $p = y_0$ for rank=1-2 and $p = v_0$ for rank=3-4

The parameters $(y_0, v_0)$ are jointly configured in RRC and take values from $$\left\{ \left(\frac{1}{2}, \frac{1}{4}\right), \left(\frac{1}{4}, \frac{1}{4}\right), \left(\frac{1}{4}, \frac{1}{8}\right) \right\}$$

Note that M represents the nominal number of FD components.

FD-basis selection is layer-specific but uses a layer-common intermediary subset for $N_3 > 19$.

For $N_3 \leq 19$, one-step free selection is used

FD-basis selection per layer is indicated with a $$\left\lceil \log_2 \binom{N_3 - 1}{M_l - 1} \right\rceil$$

bit combinatorial indicator for the $l^{th}$ layer, and $M_l$ is the number of selected FD basis vectors for the $l^{th}$ layer. In TS 38.214, the combinatorial indicator is given by the index $i_{1,6,l}$ where l corresponds to the layer index. This combinatorial index is reported by UE to the gNB per layer per PMI.

For $N_3 > 19$, two-step selection with layer-common intermediary subset (IntS) is used A window-based IntS selection which is fully parameterized with $M_{initial}$, the intermediate basis set consists of FD bases mod $(M_{initial} + n, N_3)$, $n = 0, 1, \ldots, N_3' - 1$, where $N_3' = 2M$.

Note that as specified in TS 38.214, the selected IntS is reported by UE to the gNB by the UE via the index $i_{1,5}$ which is reported as part of the PMI.

The $2^{nd}$ step subset selection is indicated by an $$\left\lceil \log_2 \binom{N_3' - 1}{M_l - 1} \right\rceil - \text{bit}$$

combinatorial indicator for the $l^{th}$ layer in part 2 of the CSI report. In TS 38.214, the combinatorial indicator is given by the index $i_{1,6,l}$ where l corresponds to the layer index. This combinatorial index is reported by UE to the gNB per layer per PMI.

Linear combination by $\tilde{W}_2$ (for $l^{th}$ layer)

$$\tilde{W}_{2,l} = \begin{bmatrix} c_{l,0,0} & \cdots & c_{l,0,M-1} \\ \vdots & \ddots & \vdots \\ c_{l,2L-1,0} & \cdots & c_{l,2L-1,M-1} \end{bmatrix}$$

is composed of K=2 $LM_l$ linear combination coefficients

Coefficient subset selection

Only a subset $K_{NZ,l} \leq K_0 < 2\, LM_l$ coefficients are non-zero and reported as part of CSI feedback The 2 $LM_l - K_{NZ,i}$ non-reported coefficients are considered zero and not reported The maximum number of non-zero coefficients per layer is $K_0 = [\beta \times 2\, LM_0]$ $$\beta \in \left\{ \frac{1}{4}, \frac{1}{2}, \frac{3}{4} \right\}$$

is RRC configured

For rank v={2,3,4}, the total maximum number of non-zero (NZ) coefficients across all layers $\leq 2K_0$ Coefficient subset selection: for each layer l a size-2 $LM_l$ bitmap with $K_{NZ,l}$ ones is indicated in Part 2 of the CSI Indication of $K_{NZ,TOT}$ (the total number of non-zero coefficients summed across all the layers, where $K_{NZ,TOT} \in \{1, 2, \ldots, 2K_0\}$ is given in Part 1 of the CSI, so that Part 2 of the CSI payload can be known Coefficient quantization according to $$c_{l,i,m} = p_{ref}\left(\left\lfloor \frac{i}{L} \right\rfloor\right) \times p(i, m) \times \varphi(i, m)$$

Strongest coefficient: the strongest coefficient $c_{l,i^*,m^*} = 1$ (hence its amplitude/phase is not reported) indicated with a per-layer strongest coefficient indicator ($SCI_l$)

For rank=1, a $\lceil \log_2 K_{NZ,0} \rceil$-bit indicator is included for the strongest coefficient index, SCI, $(i^*, m^*)$ For rank>1, a $\lceil \log_2 2\, L \rceil$-bit indicator is used per layer l with $l \in \{1, \ldots, v\}$ and v being the rank indicator (RI). The location (index) of the strongest linear combination (LC) coefficient for layer l before index remapping is $$(i_l^*, m_l^*),\ SCI_l = i_l^*\ \text{and}\ m_l^*$$

9 is not reported

Two polarization-specific reference amplitudes $p_{ref}$(0), $p_{ref}$(1)

For the polarization associated with the strongest coefficient $$p_{ref}\left(\left\lfloor\frac{i^*}{L}\right\rfloor\right) = 1$$

and hence is not reported

For the other polarization, the reference amplitude is quantized to 4 bits:

The alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \dots, \left(\frac{1}{2^{14}}\right)^{\frac{1}{4}},\right.$$

"reserved"} with a −1.5 dB step size.

For $\{c_{l,i,m}, (i, m) \neq (i_l^*, m_l^*)\}$:

For each polarization, differential amplitudes p(i, m) of the coefficients calculated relative to the associated polarization-specific reference amplitude and quantized to 3 bits The alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}$$

with a −3 dB step size.

Each phase φ(i, m) is quantized to 16 PSK (4-bit)

The NR rel-16 Type II codebook structure, utilizing both SD and FD compression is illustrated in FIG. 4. Further details of the NR rel-16 Type II codebook and associated CSI reporting can be found in 3GPP TS 38.214 V16.5.0 (Clause 5.2.2.2.5).

1.7.3 Structure, Configuration and Reporting of eType II PS Codebook

The enhanced Type II (eType II) Port Selection (PS) codebook was introduced in Rel-16, also known as rel-16 Type II port selection codebook, which is intended to be used for beamformed CSI-RS, where each CSI-RS port covers a small portion of the cell coverage area with high beamforming gain (comparing to non-beamformed CSI-RS). Although it is up to gNB implementation, it is usually assumed that each CSI-RS port is transmitted in a 2D spatial beam which has a main lobe with an azimuth pointing angle and an elevation pointing angle. The actual precoder matrix used for CSI-RS is transparent to UE. Based on the measurement, UE selects the best CSI-RS ports and recommends to gNB to use for downlink (DL) transmission. The eType II PS codebook can be used by UE to feedback the selected CSI-RS ports and the way to combine them.

For a given transmission layer l, with l∈{1, . . . , v} and v being the rank indicator (RI), the precoder matrix for all FD-units is given by a size $P_{CSI-RS} \times N_3$ matrix $W_l$, where $P_{CSI-RS}$ is the number of single-polarized CSI-RS ports.

$N_3 = N_{SB} \times R$ is the number of PMI subbands, where

The value R={1,2} (the PMI subband size indicator) is RRC configured.

$N_{SB}$ is the number of CQI subbands, which is also RRC configured.

The RI value v is set according to the configured higher layer parameter typeII-RI-Restriction-r16. UE shall not report v>4.

The precoder matrix $W_l$ can be factorized as $$W_l = W_1 \tilde{W}_{2,l} W_{f,l}^H$$

(see FIG. 5), and $W_l$ is normalized such that $\|W_l\|_F = 1/\sqrt{v}$, for l=1, . . . , v.

The codebook design for eType II PS codebook can be described as follows:

Port selection matrix $W_1$: $W_1$ is a size $P_{CSI-RS} \times 2$ L port selection precoder matrix that can be factorized into $$W_1 = W_{PS} \otimes \begin{bmatrix} 1 & 0 \\ 0 & 1 \end{bmatrix},$$

where $W_{PS}$ is a size $$\frac{P_{CSI-RS}}{2} \times L$$

port selection matrix consisting 0s and 1s. Selected ports are indicated by 1s which are common for both polarizations.

L is the number of selected CSI-RS ports per polarization. Supported L values can be found in Table 1.

Selected CSI-RS ports are jointly determined by two parameters d and $i_{1,1}$. Starting from the $i_{1,1}$-th port, only every d-th port can be selected (note that port numbering is up to gNB to decide).

The value of d is configured with the higher layer parameter portSelectionSamplingSize, where d∈{1, 2, 3, 4} and $$d < \min\left(\frac{P_{CSI-RS}}{2}, L\right).$$

The value of $i_{1,1}$, where $$i_{1,1} \in \left\{0, 1, \dots, \left\lceil \frac{P_{CSI-RS}}{2d} \right\rceil - 1\right\},$$

is determined by UE based on CSI-RS measurement. UE shall feed back the chosen $i_{1,1}$ to gNB.

$W_1$ is common for all layers.

Frequency-domain compression matrix $W_{f,l}$: $W_{f,l}$ is a size $N_3 \times M_v$ FD-domain compression matrix for layer l, where $$M_v = \left\lceil p_v \frac{N_3}{R} \right\rceil$$

11 is the number of selected FD basis vectors, which depends on the rank indicator v and the RRC configured parameter $p_v$. Supported values of $p_v$ can be found in Table 1.

$W_{f,l}=[f_{0,l} \, f_{1,l} \, \ldots \, f_{M_v,l}]$, where $$\{f_{k,l}\}_{k=0}^{M_v-1}$$

are $M_v$ size $N_3 \times 1$ FD basis vectors that are selected from $N_3$ orthogonal DFT basis vectors $$\{y_t\}_{t=0}^{N_3-1}$$

with size $N_3 \times 1$.

For $N_3 \leq 19$, a one-step free selection is used.

For each layer, FD basis selection is indicated with a $$\left\lceil \log_2 \binom{N_3 - 1}{M_v - 1} \right\rceil \text{bit}$$

combinatorial indicator. In TS 38.214, the combinatorial indicator is given by the index $i_{1,6,l}$ where l corresponds to the layer index. This combinatorial index is reported by UE to the gNB per layer per PMI.

For $N_3 > 19$, a two-step selection with layer-common intermediary subset (IntS) is used.

In this first step, a window-based layer-common IntS selection is used, which is parameterized by $M_{initial}$. The IntS consists of FD basis vectors mod $(M_{initial} + n, N_3)$, where $$n = 0, 1, \ldots, N_3' - 1$$

and $$N_3' = 2M_v.$$

$N_3' = 2M_v$. In TS 38.214, the selected IntS is reported by the UE to the gNB via the parameter $i_{1,5}$, which is reported as part of the PMI.

The second step subset selection is indicated by an $$\left\lceil \log_2 \binom{N_3' - 1}{M_v - 1} \right\rceil \text{-bit}$$

combinatorial indicator for each layer in Part 2 of the CSI report. In TS 38.214, the combinatorial indicator is given by the index $i_{1,6,l}$ where l corresponds to the layer index. This combinatorial index is reported by UE to the gNB per layer per PMI.

$W_{f,l}$ is layer-specific.

Linear combination coefficient matrix $\tilde{W}_{2,l}$: $\tilde{W}_{2,l}$ is a size $2 L \times M_v$ matrix that contains $2 LM_v$ coefficients for linearly combining the selected $M_v$ FD basis vectors for the selected 2 L CSI-RS ports.

For layer l, only a subset of $$K_l^{NZ} \leq K_0$$

coefficients are non-zero and reported. The remaining $$2LM_v - K_l^{NZ}$$

non-reported coefficients are considered zero.

$K_0 = \lceil \beta \times 2 \, LM_1 \rceil$ is the maximum number of non-zero coefficients per layer, where $\beta$ is a RRC configured parameter. Supported $\beta$ values are shown in Table 1.

For $v \in \{2, 3, 4\}$, the total number of non-zero coefficients summed across all layers, $$K_{tot}^{NZ} = \sum_{l=1}^{v} K_l^{NZ}, \text{ shall satisfy } K_{tot}^{NZ} \leq 2K_0.$$

Selected coefficient subset for each layer is indicated with $$K_l^{NZ}$$

1s in a size 2 $LM_v$ bitmap, which is included in Part 2 of the CSI report.

Indication of $$K_{tot}^{NZ}, \text{ where } K_{tot}^{NZ} \in \{1, 2, \ldots, 2K_0\},$$

is included in Part of the CSI report, so that payload of Part 2 of the CSI report can be known.

The amplitude and phase of coefficients in $\tilde{W}_{2,l}$ shall be quantized for reporting.

$\tilde{W}_{2,l}$ is layer-specific.

TABLE 1

| Rel-16 eType II PS codebook parameter configurations for L, $p_\upsilon$ and $\beta$ | | | | |
|---|---|---|---|---|
| | | $p_\upsilon$ | | |
| paramCombination-r16 | L | $\upsilon \in \{1, 2\}$ | $\upsilon \in \{3, 4\}$ | $\beta$ |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |

Further details of the eType II PS codebook and associated CSI reporting can be found in 3GPP TS 38.214 V16.5.0 (Clause 5.2.2.2.6).

1.8 FDD-Based Reciprocity Operation and Rel-17 Type II Port Selection Codebook

In Frequency Division Duplex (FDD) operation, the uplink (UL) and DL transmissions are carried out on different frequencies, thus the propagation channels in UL and DL are not reciprocal as in the Time Division Duplex (TDD) case. Despite of this, some physical channel parameters, e.g., delays and angles to different clusters, which depend on the spatial properties of the channel but not the carrier frequency, are reciprocal between UL and DL. Such properties can be exploited to obtain partial reciprocity based FDD transmission. The reciprocal part of the channel can be combined with the non-reciprocal part in order to obtain the complete channel. An estimate of the non-reciprocal part can be obtained by feedback from the UE. In 3GPP RAN1, it has been agreed that in Rel-17, the Rel-16 Type II port selection codebook will be enhanced to support the above-mentioned FDD-based reciprocity operation. It has been agreed in 3GPP RAN1 #104e that the Rel-17 Type II port selection codebook will adopt the same codebook structure as the Rel-16 Type II port selection codebook, i.e., the codebook consists of $W_1$, $W_2$, and $W_f$. Discussion regarding the details of the codebook component, such as dimension of each matrix, is still ongoing.

1.8.1 Procedure for FDD-Based Reciprocity Operation

One example procedure for reciprocity based FDD transmission scheme is illustrated in FIG. 6 in 4 steps, assuming that NR Rel. 16 enhanced Type II port-selection codebook is used.

In Step 1, the UE is configured with SRS by the gNB and the UE transmits SRS in the UL for the gNB to estimate the angles and delays of different clusters, which are associated with different propagation paths.

In Step 2, in gNB implementation algorithm, the gNB selects dominant clusters according to the estimated angle-delay power spectrum profile, based on which a set of Spatial-Domain and Frequency-Domain (SD-FD) basis pairs are computed by gNB for CSI-RS beamforming. Each SD-FD pair corresponds to a CSI-RS port with certain delay being pre-compensated. Each CSI-RS port resource can contain one or multiple SD-FD basis pairs by applying different delays on different resource elements of the resource. gNB precodes all the CSI-RS ports in a configured CSI-RS resource or multiple CSI-RS resources to the UE, with each configured CSI-RS resource containing the same number of SD-FD basis pairs.

In Step 3, gNB has configured the UE to measure CSI-RS, and the UE measures the received CSI-RS ports and then determines a type II CSI including RI, PMI for each layer and CQI. The precoding matrix indicated by the PMI includes the selected SD-FD basis pairs/precoded CSI-RS ports, and the corresponding best phase and amplitude for co-phasing the selected pairs/ports. The phase and amplitude for each pair/port are quantized and fed back to the gNB.

In Step 4, the gNB implementation algorithm computes the DL precoding matrix per layer based on the selected beams and the corresponding amplitude and phase feedback and performs Physical Downlink Shared Channel (PDSCH) transmission. The transmission is based on the feed-back (PMI) precoding matrices directly (e.g., Single User MIMO, SU-MIMO transmission) or the transmission precoding matrix is obtained from an algorithm combining CSI feed-back from multiple UEs (MU-MIMO transmission). In this case, a precoder derived based on the precoding matrices (including the CSI reports from co-scheduled UEs) (e.g., Zero-Forcing precoder or regularized ZF precoder). The final precoder is commonly scaled so that the transmit power per power amplifier is not overridden.

Such reciprocity-based transmission can potentially be utilized in a codebook-based DL transmission for FDD in order to, for example, reduce the feedback overhead in UL when NR Type II port-selection codebook is used. Another potential benefit is reduced complexity in the CSI calculation in the UE.

Note that FIG. 6 only sketches one example of the procedure for FDD-based reciprocity operation, where each CSI-RS port contains a single pair of SD-FD basis and UE performs wideband averaging of the channel to obtain the corresponding coefficients. It is possible that each CSI-RS port contains multiple pairs of SD-FD basis and that UE can compress the channel with more FD components besides the DC DFT component.

1.8.2 Type II Port Selection Codebook for FDD Operation Based on Angle and Delay Reciprocity If the Rel.16 enhanced Type II port-selection codebook is used for FDD operation based on angle and/or delay reciprocity, the frequency-domain (FD) basis $W_f$ still needs to be determined by the UE. Therefore, in the CSI report, the feedback overhead for indicating which FD basis vectors are selected can be large, especially when $N_3$, the number of PMI subbands, is large. Also, the computational complexity at UE for evaluating and selecting the best FD basis vectors also increases as $N_3$ increases. In addition, the channel seen at the UE is frequency-selective, which requires a number of FD basis vectors to compress in the PMI report. Reporting coefficients to these FD basis vectors also consumes a large amount of UL overhead.

Based on the angle and delay reciprocity, as mentioned in the previous section, gNB can determine a set of dominant clusters in the propagation channel by analyzing the angle-delay power spectrum of the UL channel. Then, gNB can utilize this information in a way such that each CSI-RS port is precoded towards a dominant cluster. In addition to SD beamforming, each of the CSI-RS ports will also be pre-compensated in time such that all the precoded CSI-RS ports are aligned in delay domain. As a result, frequency-selectivity of the channel is removed and the UE observes a frequency-flat channel, which requires very small number of FD basis to compress. Ideally, if all the beams can be perfectly aligned in time, UE only needs to do a wideband filtering to obtain all the channel information, based on which UE can calculate the Rel-17 Type II PMI. Even if delay cannot be perfectly pre-compensated at gNB in reality, the frequency selectively seen at the UE can still be greatly reduced, so that UE only requires a much smaller number of FD basis vectors, i.e., the number of basis vectors in $W_f$, to compress the channel.

The above procedure is further explained in FIG. 7 in an example. Based on UL measurement, gNB identifies 8 dominant clusters that exist in the original channel, tagged as A-G, which are distributed in 4 directions, with each direction containing one or multiple taps. In this example, 8 CSI-RS ports are precoded at gNB. Each CSI-RS port is precoded towards a dominant direction with pre-compensated delay for a given cluster. The delay pre-compensation can be realized in different ways, for instance by applying a linear phase slope across occupied subcarriers. As a result, in the beamformed channel, which is seen at UE, all the dominant clusters are aligned at the same delay, hence the UE only needs to apply a wideband filter (e.g., applying the DC component of a DFT matrix (i.e., $W_f$ containing a single all one vector over frequency domain channel) to compress the channel and preserve all the channel information. Based on the compressed channel, the UE calculates $W_1$ (selected CSI-RS ports) and $W_2$ (complex coefficients for combining selected ports), which are the remaining part of the Type II port selection codebook.

Although the discussion on Rel-17 Type II codebook is still ongoing, the Rel-16 Type II codebook structure has been confirmed to be reused for Rel-17, i.e., the Rel-17 also comprises of $W_1$, $W_2$ and $W_f$. One potential difference comparing to the Rel-16 Type II, which is to be discussed in 3GPP as of writing this disclosure, is that $W_f$ might be layer-common. The structure of $W_1$, $W_2$ will remain the same as in Rel-16 Type II.

1.9 Coherent Joint Transmission Over Multiple TRPs

Recently, coherent joint transmission (CJT) from multiple TRPs has been proposed in 3GPP as a potential enhancement for NR Rel-18 (see RWS-210437, 'NR enhancements for DL MIMO,' Huawei, HiSilicon, 3GPP TSG RAN Meeting #92-e, Electronic Meeting, Jun. 28-Jul. 2, 2021 and RWS-210181, 'On Rel-18 NR MIMO enhancements for 5G Advanced,' Samsung, 3GPP TSG RAN Meeting #92-e, Electronic Meeting, Jun. 28-Jul. 2, 2021). The motivation for this proposal is to exploit CJT from multiple TRPs for MU-MIMO scheduling with null forming between co-scheduled users.

1.10 Transmission Configuration Indicator (TCI) State

Several signals can be transmitted from different antenna ports of a same base station. These signals can have the same large-scale properties such as Doppler shift/spread, average delay spread, or average delay. These antenna ports are then said to be quasi co-located (QCL).

If the UE knows that two antenna ports are QCL with respect to a certain parameter (e.g., Doppler spread), the UE can estimate that parameter based on one of the antenna ports and apply that estimate for receiving signal on the other antenna port.

For example, the TCI state may indicate a QCL relation between a CSI-RS for tracking RS (TRS) and the PDSCH DMRS. When UE receives the PDSCH DMRS it can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that use analog beamforming to receive signals, since the UE need to adjust its RX beam in some direction prior to receiving a certain signal. If the UE knows that the signal is spatially QCL with some other signal it has received earlier, then it can safely use the same RX beam to receive also this signal. Note that for beam management, the discussion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for tracking (TRS) for time/frequency offset estimation. To be able to use any QCL reference, the UE would have to receive it with a sufficiently good SINR. In many cases, this means that the TRS has to be transmitted in a suitable beam to a certain UE.

To introduce dynamics in beam and transmission point (TRP) selection, the UE can be configured through RRC signaling with M TCI states, where M is up to 128 in frequency range 2 (FR2) for the purpose of PDSCH reception and up to 8 in FR1, depending on UE capability.

Each TCI state contains QCL information, i.e. one or two source DL RSs, each source RS associated with a QCL type. For example, a TCI state contains a pair of reference signals, each associated with a QCL type, e-g-two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

Each of the M states in the list of TCI states can be interpreted as a list of M possible beams transmitted from the network or a list of M possible TRPs used by the network to communicate with the UE. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via MAC CE one TCI state for PDCCH (i.e., provides a TCI for PDCCH) and up to eight active TCI states for PDSCH. The number of active TCI states the UE support is a UE capability, but the maximum is 8.

Each configured TCI state contains parameters for the quasi co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with 4 active TCI states (from a list of totally 64 configured TCI states). Hence, 60 TCI states are inactive for this particular UE (but some may be active for another UE) and the UE need not be prepared to have large scale parameters estimated for those. But the UE continuously tracks and updates the large scale parameters for the 4 active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation.

1.10.1 UL TCI States

The existing way of using spatial relation for UL beam indication in NR is cumbersome and inflexible. To facilitate UL beam selection for UEs equipped with multiple panels, a unified TCI framework for UL fast panel selection is to be evaluated and introduced in NR Rel-17. Similar to DL, where TCI states are used to indicate DL beams/TRPs, TCI states may also be used to select UL panels and beams used for UL transmissions (i.e., PUSCH, PUCCH, and SRS).

It is envisioned that UL TCI states are configured by higher layers (i.e., RRC) for a UE in number of possible ways. In one scenario, UL TCI states are configured separately from the DL TCI states and each uplink TCI state may contain a DL RS (e.g., NZP CSI-RS or SSB) or an UL RS (e.g., SRS) to indicate a spatial relation. The UL TCI states can be configured either per UL channel/signal or per BWP such that the same UL TCI states can be used for PUSCH, PUCCH, and SRS. Alternatively, a same list of TCI states may be used for both DL and UL, hence a UE is configured with a single list of TCI states for both UL and DL beam indication. The single list of TCI states in this case can be configured either per UL channel/signal or per BWP information elements. When a TCI state is used for both DL and UL, this TCI state may be referred to as joint TCI state or unified TCI state.

1.11 Type II CSI Report on PUSCH

A UE shall perform aperiodic CSI reporting using PUSCH upon successful decoding of a DCI format 0_1 or DCI format 0_2 which triggers an aperiodic CSI trigger state.

When a DCI format 0_1 schedules two PUSCH allocations, the aperiodic CSI report is carried on the second scheduled PUSCH. When a DCI format 0_1 schedules more than two PUSCH allocations, the aperiodic CSI report is carried on the penultimate scheduled PUSCH.

A UE shall perform semi-persistent CSI reporting on the PUSCH upon successful decoding of a DCI format 0_1 or DCI format 0_2 which activates a semi-persistent CSI trigger state. DCI format 0_1 and DCI format 0_2 contains a CSI request field which indicates the semi-persistent CSI trigger state to activate or deactivate. The PUSCH resources and MCS shall be allocated semi-persistently by an uplink DCI.

CSI reporting on PUSCH can be multiplexed with uplink data on PUSCH. CSI reporting on PUSCH can also be performed without any multiplexing with uplink data from the UE.

1.11.1 Part 1 and Part 2 for Type II CSI Report

For the Rel-15 Type II and the Rel-16 Type II (aka Enhanced Type II) CSI feedback on PUSCH, a CSI report comprises of two parts: Part 1 and Part 2. A main motivation for dividing a CSI report into Part 1 and Part 2 is to deal with the dynamically varying CSI payload. For example, based on the time-varying channel, UE may report different ranks over the whole period of connection, which has significant impact on the actual required CSI payload size. In order for the gNB to know the actual payload size, Part 1, which has a fixed payload size that carries the information to calculate the payload size of Part 2, will be decoded first by gNB.

For the Rel-15 Type II CSI feedback, Part 1 contains RI (if reported), CQI, and an indication of the number of non-zero wideband amplitude coefficients per layer for the Type II CSI (see Clause 5.2.2.2.3 in 3GPP TS 38.214). The fields of Part 1-RI (if reported), CQI, and the indication of the number of non-zero wideband amplitude coefficients for each layer—are separately encoded. Part 2 contains the PMI of the Type II CSI. Part 1 and 2 are separately encoded.

For the Rel-16 Type II CSI feedback, Part 1 contains RI, CQI, and an indication of the overall number of non-zero amplitude coefficients across layers for the Rel-16 Type II CSI (see Clause 5.2.2.2.5 in 3GPP TS 38.214). The fields of Part 1-RI, CQI, and the indication of the overall number of non-zero amplitude coefficients across layers—are separately encoded. Part 2 contains the PMI of the Enhanced Type II CSI. Part 1 and 2 are separately encoded.

1.11.2 CSI Omission

Sometimes, it may happen that the allocated PUSCH resource for carrying the CSI report does not fit the entire CSI report content. For such cases, a CSI omission procedure has been specified in 3GPP, where a portion of the Part 2 CSI omitted if the resulting UCI code rate is too low. This is achieved by segmenting the Part 2 CSI into different priority levels and dropping CSI segment starting with the lowest priority level until the UCI code rate falls below a threshold (whereby the CSI payload will "fit" on the PUSCH allocation). The priority levels are described in Table 2, where Priority 0 has the highest priority and $N_{Rep}$ represents the number of CSI reports configured to be carried by PUSCH. The motivation behind this design is that the reported remaining PMI can still be used by the gNB.

TABLE 2

| Priority reporting levels for Part 2 CSI |
| --- |
| Priority 0: |
| For CSI reports 1 to $N_{Rep}$, Group 0 CSI for CSI reports configured as 'typeII-r16' or 'typeII-PortSelection-r16'; Part 2 wideband CSI for CSI reports configured otherwise |
| Priority 1: |
| Group 1 CSI for CSI report 1, if configured as 'typeII-r16' or 'typeII-PortSelection-r16'; Part 2 subband CSI of even subbands for CSI report 1, if configured otherwise |
| Priority 2: |
| Group 2 CSI for CSI report 1, if configured as 'typeII-r16' or 'typeII-PortSelection-r16'; Part 2 subband CSI of odd subbands for CSI report 1, if configured otherwise |
| Priority 3: |
| Group 1 CSI for CSI report 2, if configured as 'typeII-r16' or 'typeII-PortSelection-r16'; Part 2 subband CSI of even subbands for CSI report 2, if configured otherwise |
| Priority 4: |
| Group 2 CSI for CSI report 2, if configured as 'typeII-r16' or 'typeII-PortSelection-r16'. Part 2 subband CSI of odd subbands for CSI report 2, if configured otherwise |
| . |
| . |
| . |
| Priority $2N_{Rep} - 1$: |
| Group 1 CSI for CSI report $N_{Rep}$, if configured as 'typeII-r16' or 'typeII-PortSelection-r16'; Part 2 subband CSI of even subbands for CSI report $N_{Rep}$, if configured otherwise |
| Priority $2N_{Rep}$: |
| Group 2 CSI for CSI report $N_{Rep}$, if configured as 'typeII-r16' or 'typeII-PortSelection-r16'; Part 2 subband CSI of odd subbands for CSI report $N_{Rep}$, if configured otherwise |

CSI omission is only performed on the Part 2 CSI, since if the components of the Part 1 CSI was omitted, the gNB would not have enough information to decode the Part 2 CSI.

SUMMARY

Systems and methods are disclosed herein for Channel State Information (CSI) reporting with angle and delay reciprocity. In one embodiment, a method performed by a user equipment (UE) comprises receiving, from a network node, information for a CSI reporting configuration that configures the UE with: (a) multiple Non-Zero Power (NZP) Channel State Information Reference Signal (CSI-RS) resources for channel measurement associated with a CSI reporting configuration, where each of the multiple NZP CSI-RS resources is associated with a different Transmission Configuration Indicator (TCI) state or unified TCI state, (b) a single NZP CSI-RS resource for channel measurement associated with the CSI reporting configuration, the single NZP CSI-RS resource comprising multiple sets of CSI-RS ports wherein each set of CSI-RS ports within the single NZP CSI-RS resource is associated with a different TCI state or unified TCI state, or (c) both (a) and (b). The information for the CSI reporting configuration further configures the UE with either or both of: a parameter combination indicating at least a total number of frequency domain (FD) basis vectors to be selected per layer across the multiple NZP CSI-RS resources or the multiple sets of CSI-RS ports, or a parameter combination indicating at least a number of FD basis vectors to be selected and reported per layer for each of the plurality of NZP CSI-RS resources or each of the plurality of sets of CSI-RS ports, and a number of precoding matrix indicator (PMI) subbands. The method further comprises performing channel measurement on: (i) the configured multiple NZP CSI-RS resources according to the respective TCI states or unified TCI state, (ii) the configured single NZP CSI-RS resource wherein the multiple sets of CSI-RS ports in the single NZP CSI-RS resource are measured according to the respective TCI states or unified TCI state, or (iii) both (i) and (ii). The method further comprises receiving, from the network node, information that configures the UE with one or more frequency domain basis vector windows that are: (A) per NZP CSI-RS resource or over all configured NZP CSI-RS resources, in the case of configuration of multiple NZP CSI-RS resources for channel measurement, (B) per set of CSI-RS ports or over all sets of CSI-RS ports, in the case of configuration of a single NZP CSI-RS resource for channel measurement, the single NZP CSI-RS resource comprising the multiple sets of CSI-RS ports, or (C) both (A) and (B). The method further comprises receiving, from the network node, information that configures the UE with a number of frequency domain vectors to be selected, where the number of frequency domain vectors to be selected is: (I) specific to NZP CSI-RS resource or common to all configured NZP CSI-RS resources, in the case of configuration of multiple NZP CSI-RS resources for channel measurement, (II) specific to a set of CSI-RS ports within the single configured NZP CSI-RS resource or common to all sets of CSI-RS ports within the single configured NZP CSI-RS resource, in the case of configuration of a single NZP CSI-RS resource for channel measurement, the single NZP CSI-RS resource comprising the multiple sets of CSI-RS ports, or (III) both (I) and (II). The method further comprises computing CSI based on the channel measurements and in accordance with the received information that configures the UE with the one or more frequency domain basis vector windows and the information that configures the UE with the number of frequency domain vectors to be selected, and reporting the computed CSI.

In one embodiment, the UE is configured with multiple(S) NZP CSI-RS resources for channel measurement, and the one or more frequency domain basis vector windows comprise a single frequency basis window that is applicable for all S configured NZP CSI-RS resources. In one embodiment, the information that configures the UE with the single frequency domain basis window comprises an index, M_init, of a starting frequency domain basis vector in the single frequency domain basis window and a window size N, where N is the number of consecutive frequency domain basis vectors in the single frequency domain basis window. In one embodiment, the starting frequency domain basis vector index for the single frequency domain basis window is predefined. In one embodiment, the information that configures the UE with the single frequency domain basis window comprises a window size N that includes a full set of frequency domain basis vectors, wherein N equals to the number of PMI subbands.

In one embodiment, the UE further receive a configuration of S subsets of frequency domain basis vectors within the single frequency domain basis window, where each of the S subsets of FD basis vectors is associated with a respective one of the S configured NZP CSI-RS resources. In one embodiment, the configuration of each of the S subsets of frequency domain basis vectors comprises a starting frequency domain basis vector index and/or length, where the length corresponds to number of frequency domain basis vectors in the subset.

In one embodiment, for each of the S configured NZP CSI-RS resources, the UE is further configured with a number of domain basis vectors to be selected in the single frequency domain basis window.

In one embodiment, a common subset of frequency domain basis vectors is selected for all S configured NZP CSI-RS resources from the single frequency domain basis window. In one embodiment, the UE reports the selected common subset of frequency domain basis vectors as part of the CSI via a combinatorial coefficient index. In one embodiment, the UE performs further down-selection among the selected common subset of frequency domain basis vectors and the further down-selected frequency domain basis vectors are reported in the CSI via a non-zero coefficient bitmap. In one embodiment, for each of the S configured NZP CSI-RS resources, the UE performs further down-selection among the selected common subset of frequency domain basis vectors and the further down-selected frequency domain basis vectors are reported in the CSI via a combinatorial coefficient index. In one embodiment, a total number of down-selected frequency domain basis vectors across all the S configured NZP CSI-RS resources is not more than the total configured frequency domain basis vectors to be selected per layer.

In one embodiment, for each of the S configured NZP CSI-RS resources, the corresponding selected FD basis vectors are phase rotated such that the zero-th FD basis vector (e.g., the DC component which contains all ones) is always selected, wherein the rotated phase is reported as part of the CSI.

In one embodiment, the UE is configured with multiple(S) NZP CSI-RS resources for channel measurement; and the one or more frequency domain basis vector windows comprise S frequency domain basis windows, where each of the S frequency domain basis windows is associated with a respective one of the S configured NZP CSI-RS resources. In one embodiment, the information that configures the UE (1200) with each of the S frequency domain basis windows comprises an index, M_init,s, for a starting frequency domain basis vector and a window size N_s, where N_s is the number of consecutive frequency domain basis vectors starting from the frequency domain basis vector with index M_init,s in a full set of frequency domain basis vectors, wherein the full set of FD basis vectors is determined by the number of PMI subbands. In another embodiment, the information that configures the UE with each of the S frequency domain basis windows comprises a window size N_s, and a starting frequency domain basis vector of the sth frequency domain basis window is preconfigured (e.g., in specifications), where the window size N_s is the number of frequency domain basis vectors in the sth window and M_init,s is the starting frequency domain basis vector of the sth frequency domain basis window.

In one embodiment, the UE is configured to select a number of frequency domain basis vectors according to one of the following: the UE is configured to select a same number of frequency domain basis vectors for each of the S configured NZP CSI-RS resources from the single frequency domain basis window; the UE is configured to select a same number of frequency domain basis vectors for each of the S configured NZP CSI-RS resources from the associated window of FD basis vectors among the S frequency domain basis vector windows; the UE is configured to select a different number of frequency domain basis vectors for different configured NZP CSI-RS resources from the single frequency domain basis window; the UE is configured to select a different number of frequency domain basis vectors for different configured NZP CSI-RS resources from the associated window of frequency domain basis vectors among the S frequency domain basis vector windows.

In one embodiment, a different subset of frequency domain basis vectors is selected for each of the S configured NZP CSI-RS resources from one of the following: from the single FD basis window or from the associated FD basis window. In one embodiment, the UE reports the selected different subset of frequency domain basis vectors in the CSI via a combinatorial coefficient index per configured NZP CSI-RS resource.

In one embodiment, the UE is configured with a single NZP CSI-RS resource for channel measurement, the single NZP CSI-RS resource having multiple(S) sets of CSI-RS ports; and the one or more frequency domain basis vector windows comprise a single frequency basis window that is applicable for all S sets of CSI-RS ports within the single configured NZP CSI-RS resource. In one embodiment, the information that configures the UE with the single frequency domain basis window comprises a starting frequency domain basis index, M_init, and a window size N, where N is the number of frequency domain basis vectors in the single frequency domain basis window and M_init is a starting frequency domain basis vector within the single frequency domain basis window. In one embodiment, the information that configures the UE with the single frequency domain basis window comprises a window size N where N is the number of frequency domain basis vectors in the single frequency domain basis window, and a predefined starting frequency domain basis index for the single frequency domain basis window. In one embodiment, the information that configures the UE with the single frequency domain basis window comprises a window size N that includes a full set of frequency domain basis vectors, wherein the full set of FD basis vectors is determined by the number of PMI subbands N3. In one embodiment, the UE receives configuration of S subsets of frequency domain basis vectors within the single frequency domain basis window, where each of the S subsets of FD basis vectors is associated with a respective one of the S sets of CSI-RS ports within the single configured NZP CSI-RS resource. In one embodiment, the configuration of each of the S subsets of frequency domain basis vectors comprises a starting frequency domain basis vector index and/or length, where the length corresponds to number of frequency domain basis vectors in the subset.

In one embodiment, a common subset of frequency domain basis vectors is selected for all of the S sets CSI-RS ports within the single configured NZP CSI-RS resource from the single frequency domain basis window. In one embodiment, the UE reports the selected common subset of frequency domain basis vectors as part of the CSI via a combinatorial coefficient index. In one embodiment, the UE performs further down-selection among the selected common subset of frequency domain basis vectors and the further down-selected frequency domain basis vectors are reported in the CSI via a combinatorial coefficient index.

In one embodiment, the UE is configured with a single NZP CSI-RS resource for channel measurement, the single NZP CSI-RS resource having multiple(S) sets of CSI-RS ports; and the one or more frequency domain basis vector windows comprise S frequency domain basis windows, where each of the S frequency domain basis windows is associated with a respective one of the S sets of CSI-RS ports within the single configured NZP CSI-RS resource. In one embodiment, the information that configures the UE with each of the S frequency domain basis windows comprises a starting frequency domain basis index, M_init,s, and a window size N_s, where N_s is the number of consecutive frequency domain basis vectors starting from the frequency domain basis vector with index M_init,s out of a full set of frequency domain basis vectors, wherein the full set of FD basis vectors is determined by an associated number of PMI subbands N3. In one embodiment, the information that configures the UE (1200) with each of the S frequency domain basis windows comprises a window size N_s, and a starting frequency domain basis vector of the sth frequency domain basis window is preconfigured (e.g., in specifications), where the window size N_s is the number of frequency domain basis vectors in the sth window and M_init,s is the starting frequency domain basis vector of the sth frequency domain basis window.

In one embodiment, the UE is configured to select a number of frequency domain basis vectors according to one of the following: the UE is configured to select a same number of frequency domain basis vectors for each of the S sets of CSI-RS ports within the single configured NZP CSI-RS resource from the single frequency domain basis window; the UE is configured to select a same number of frequency domain basis vectors for each of the S sets of CSI-RS ports within the single configured NZP CSI-RS resource from the associated window of FD basis vectors among the of the S frequency domain basis vector windows; the UE is configured to select a different number of frequency domain basis vectors for different sets of CSI-RS ports within the single configured NZP CSI-RS resource from the single frequency domain basis window; the UE is configured to select a different number of frequency domain basis vectors for different sets of CSI-RS ports within the single configured NZP CSI-RS resource from the associated window of frequency domain basis vectors among the of the S frequency domain basis vector windows.

In one embodiment, a different subset of frequency domain basis vectors is selected for each of the S sets of CSI-RS ports within the single configured NZP CSI-RS resource from one of the following: from the single FD basis window or from the associated FD basis window. In one embodiment, the UE reports the selected different subset of frequency domain basis vectors in the CSI via a combinatorial coefficient index per configured NZP CSI-RS resource.

Corresponding embodiments of a UE are also disclosed. In one embodiment, a UE comprises one or more transmitters, one or more receivers, and processing circuitry associated with the one or more transmitters and the one or more receivers. The processing circuitry is configured to cause the UE to perform any of the embodiments of the method of operation of a UE disclosed herein.

Embodiments of a network node and a method of operation thereof are also disclosed herein.

BRIEF DESCRIPTION OF THE DRAWINGS

The accompanying drawing figures incorporated in and forming a part of this specification illustrate several aspects of the disclosure, and together with the description serve to explain the principles of the disclosure.

US 12,652,569 B2

23

Figure 1:
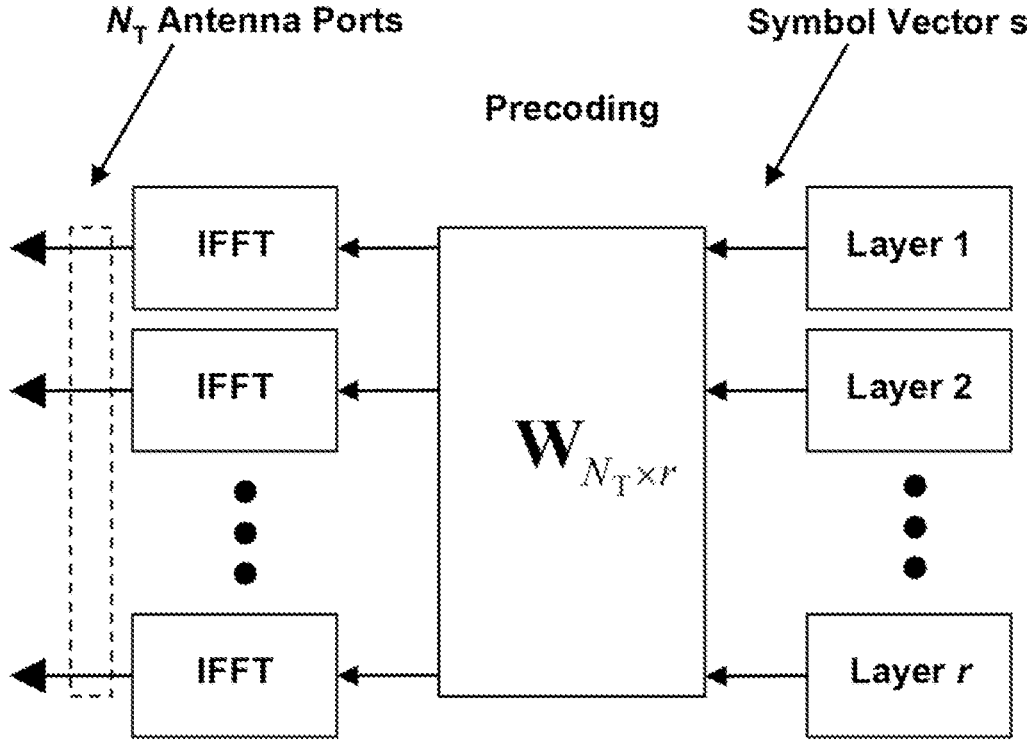
Figure 2:
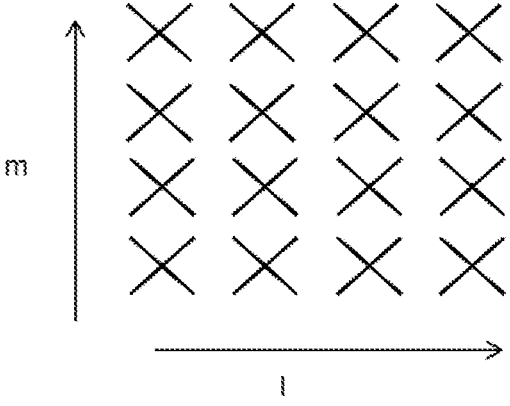
Figure 3:
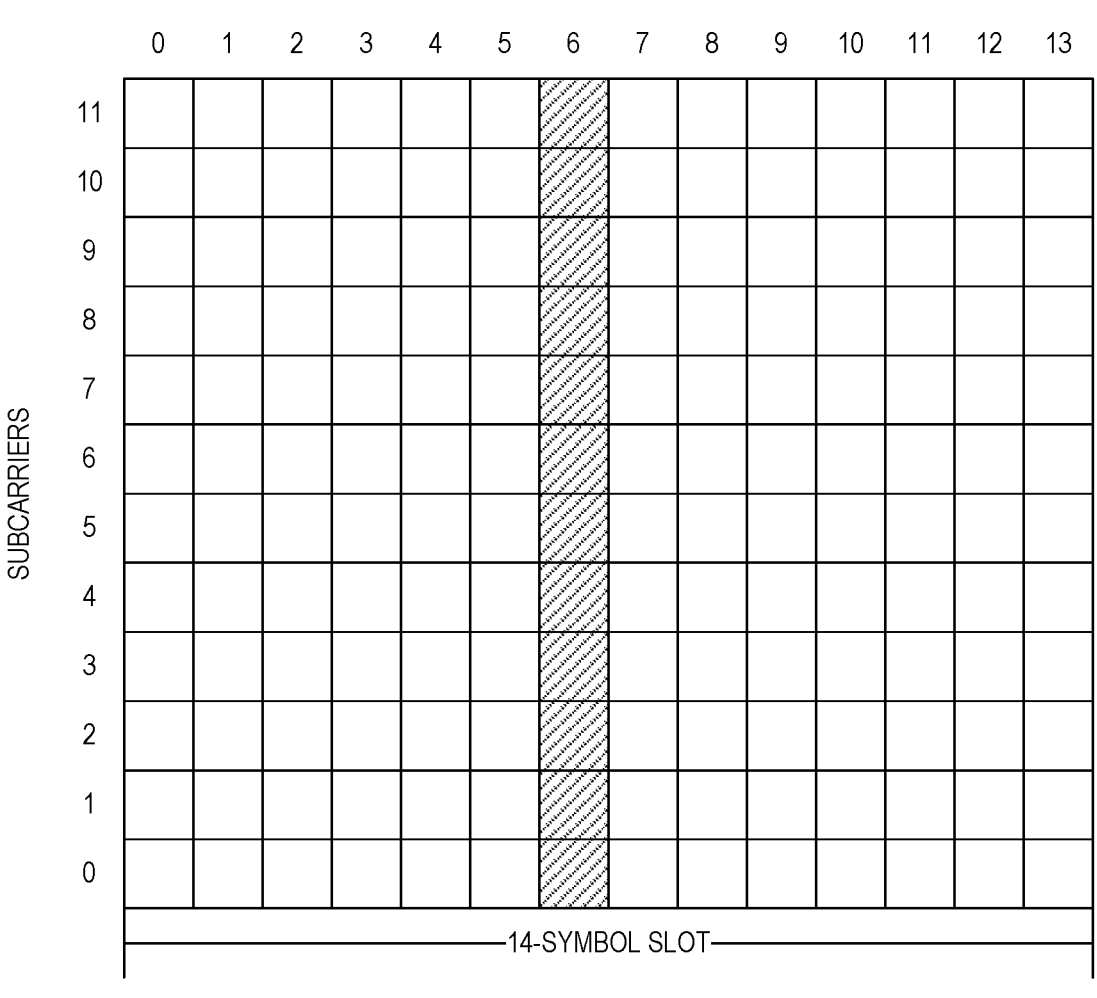
Figure 4:
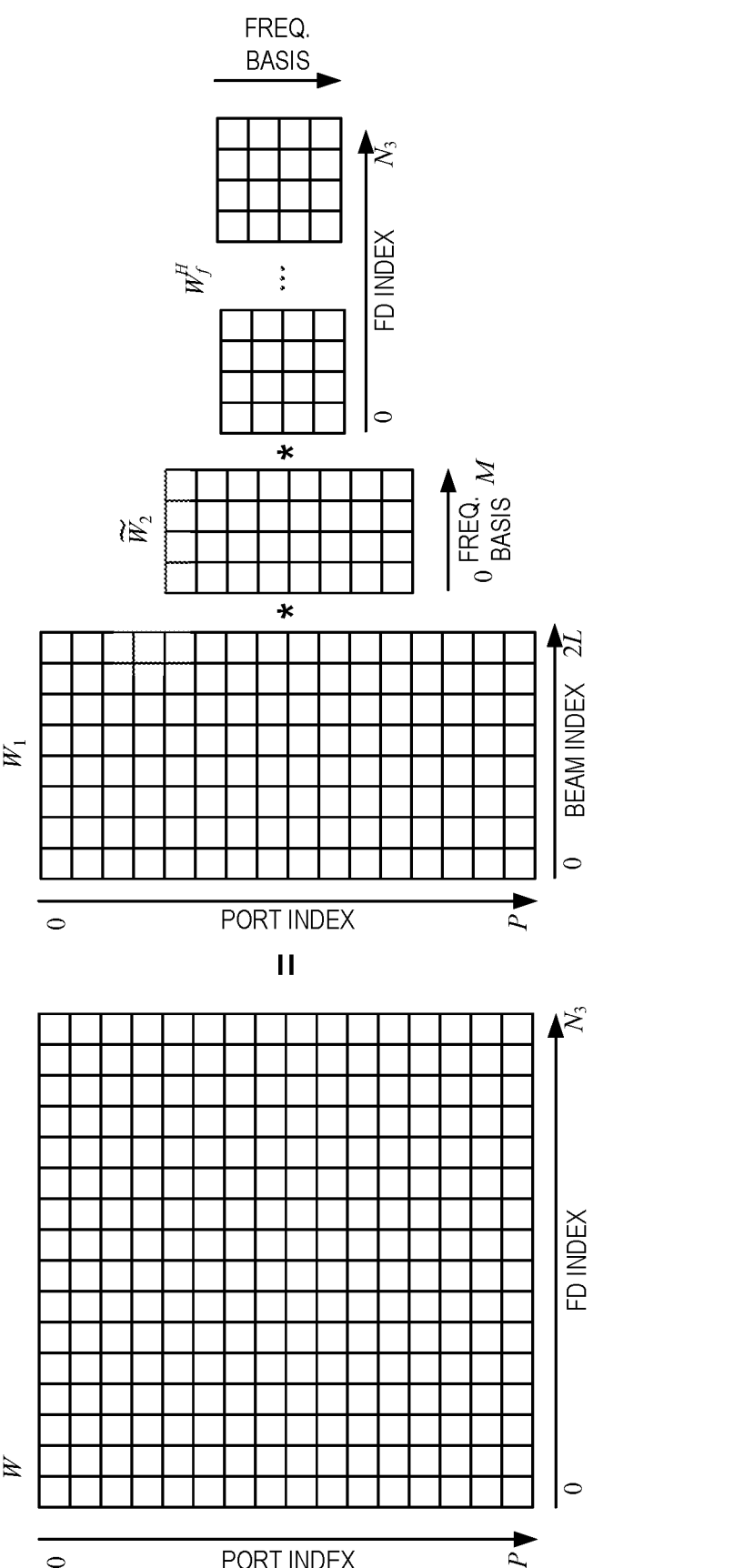
Figure 5:
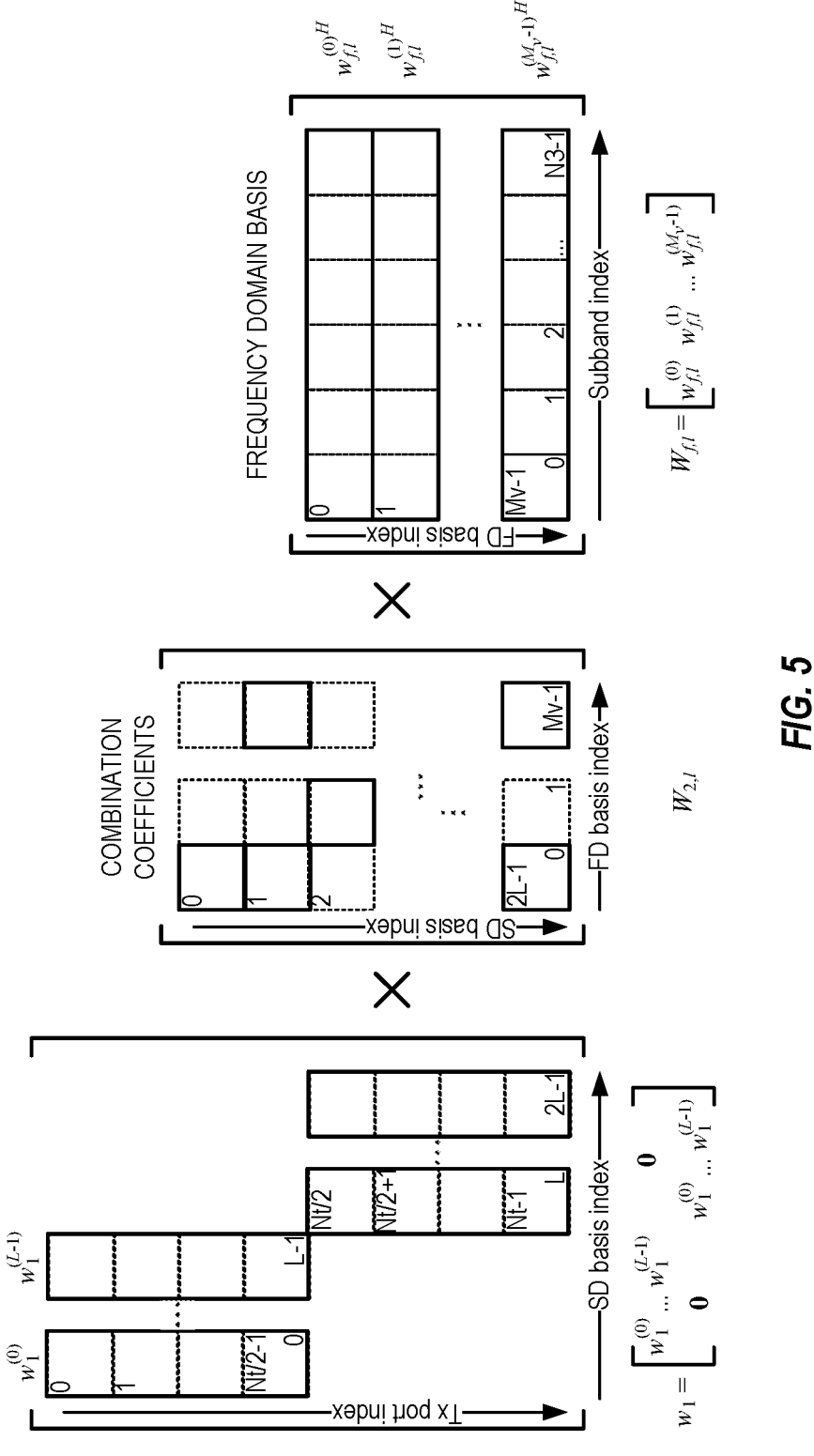

FIG. 1 is an illustration of the spatial multiplexing operation;

FIG. 2 illustrates an example of a 4×4 array with dual-polarized antenna elements;

FIG. 3 shows an example of Channel State Information Reference Signal (CSI-RS) Resource Elements (REs) for twelve antenna ports, where one Resource Element (RE) per Resource Block (RB) per port is shown;

FIG. 4 illustrates the $3^{rd}$ Generation Partnership Project (3GPP) New Radio ($N_R$) Rel-16 Type II codebook structure, utilizing both Spatial Domain (SD) and Frequency Domain (FD) compression;

FIG. 5 illustrates how precoder matrix $W_l$ can be factorized as $$W_l = W_1 \tilde{W}_{2,l} W_{f,l}^H;$$

Figure 7:
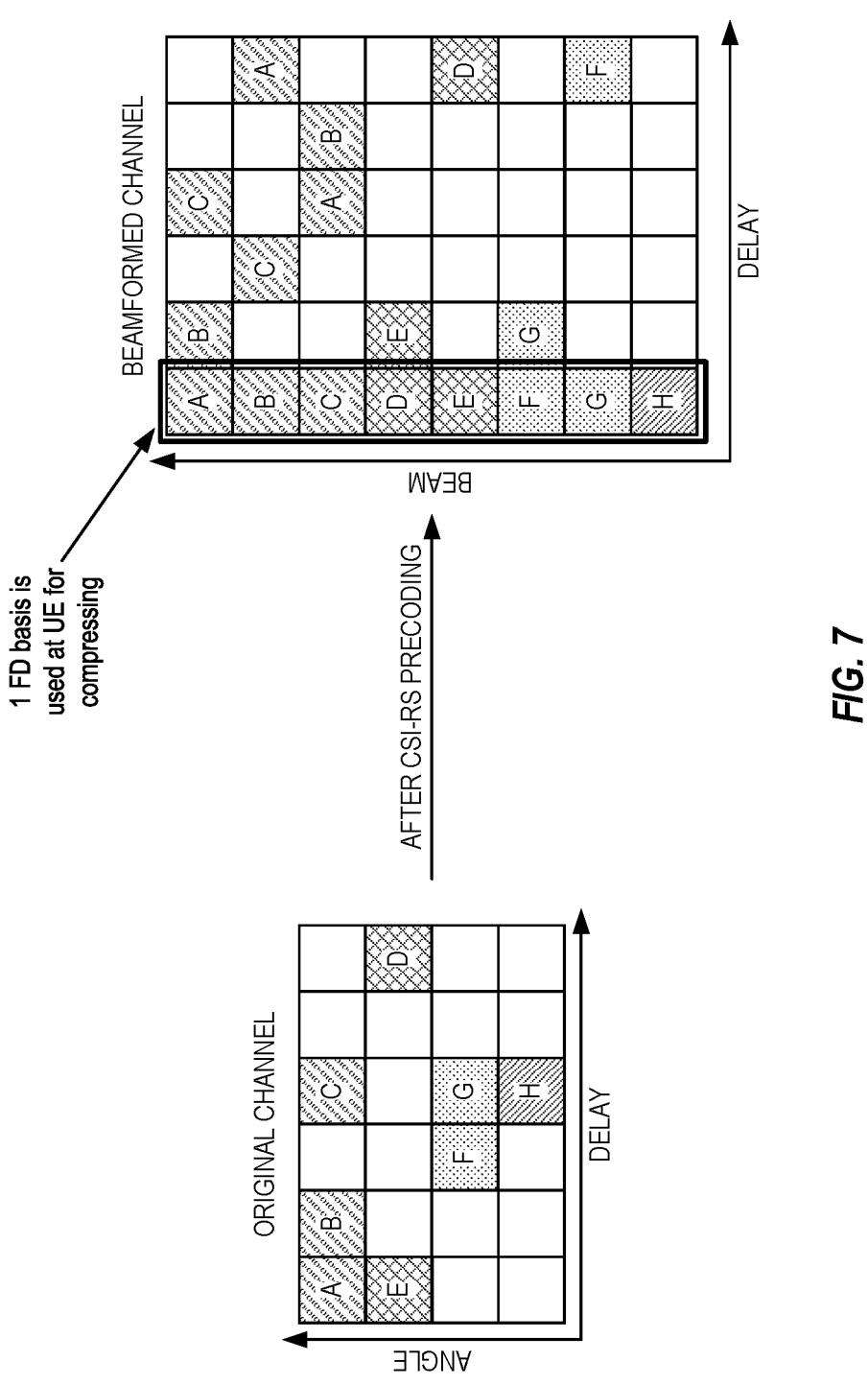
Figure 8:
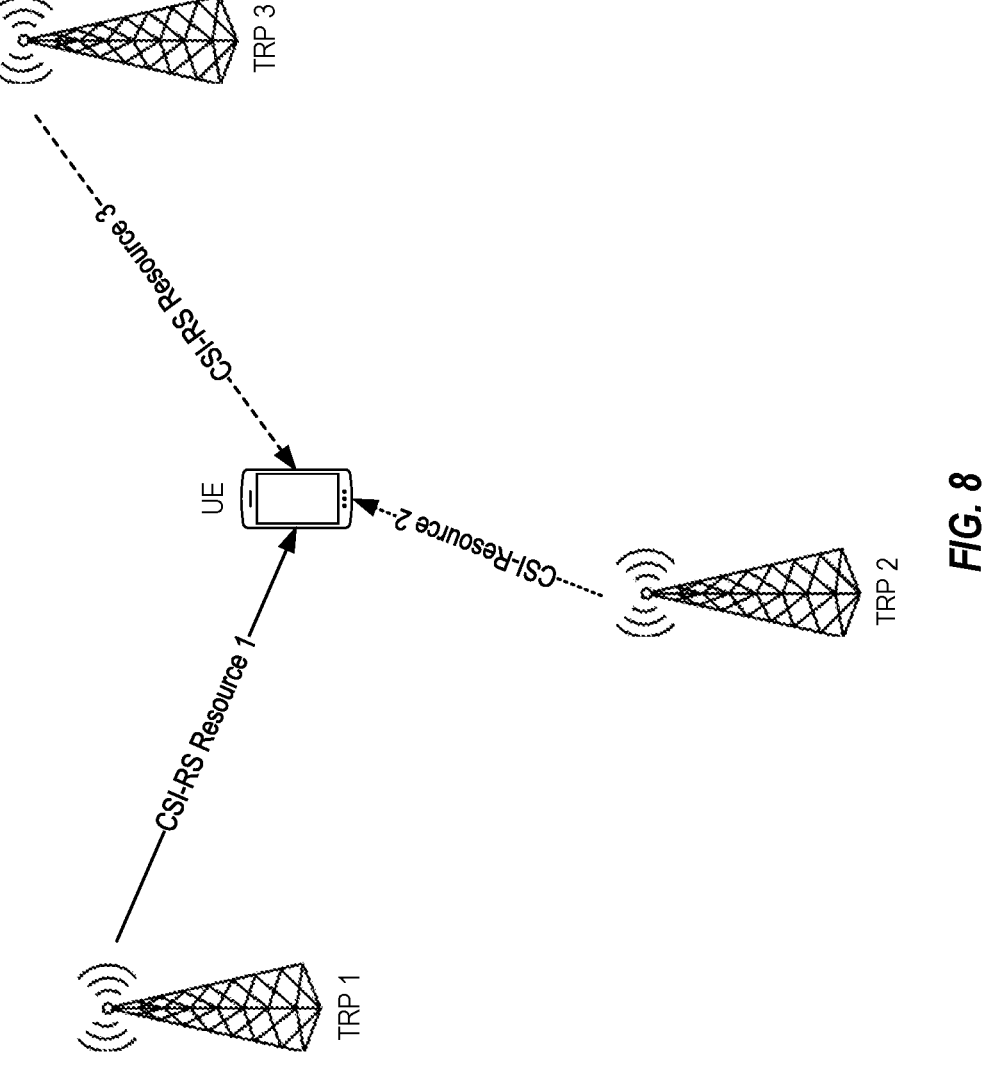
Figure 9:
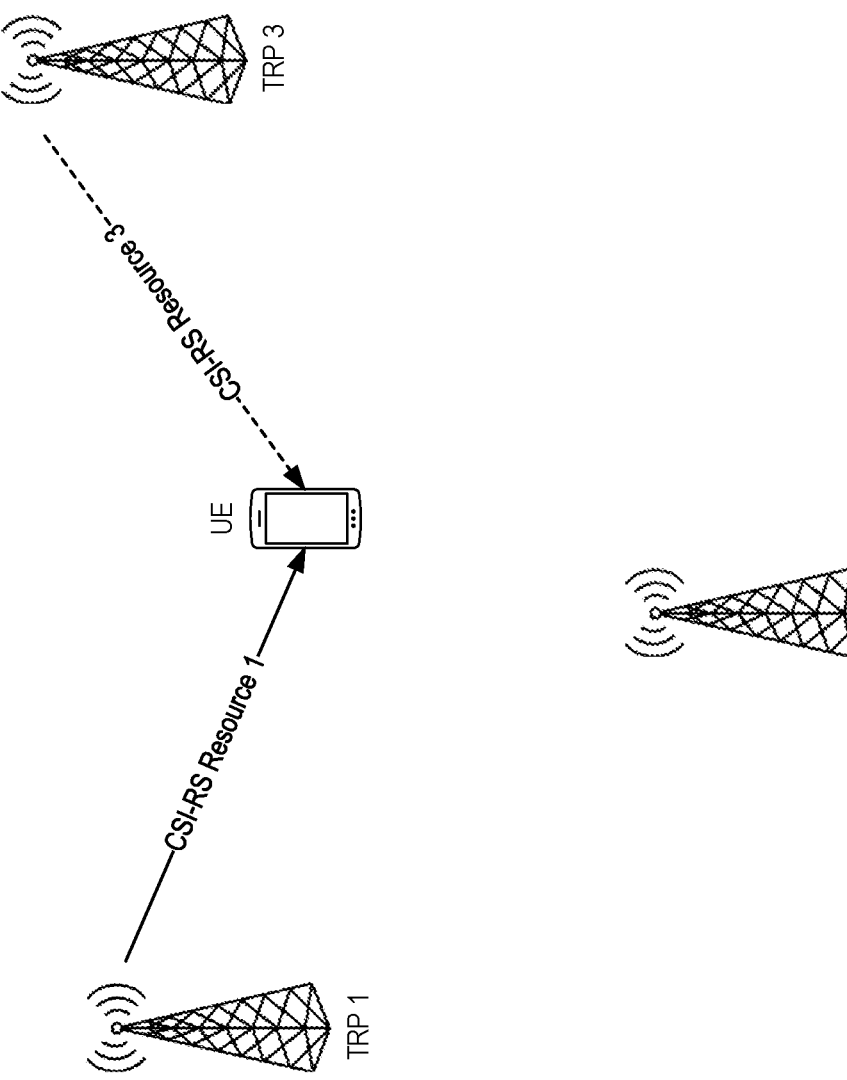
Figure 10:
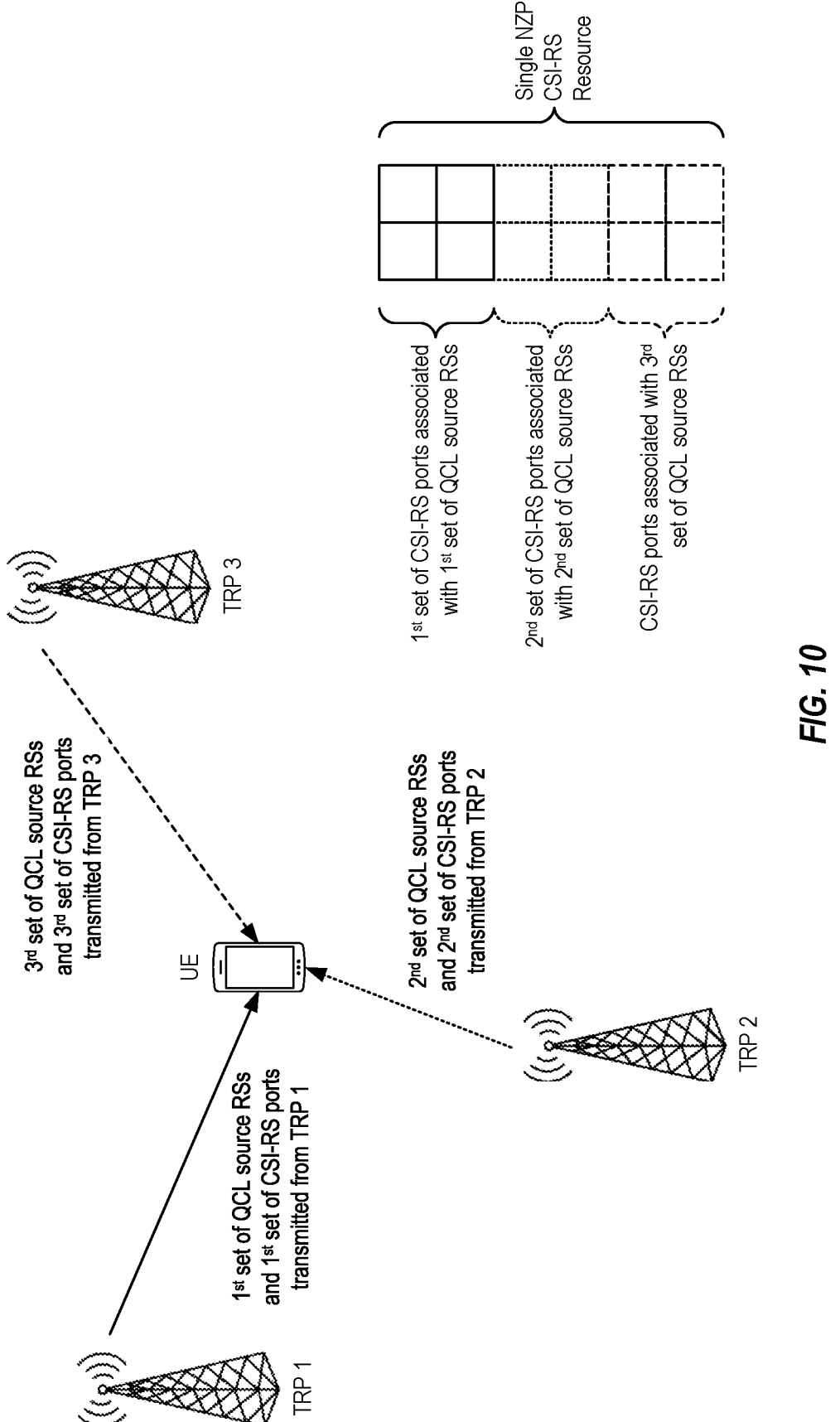
Figure 11:
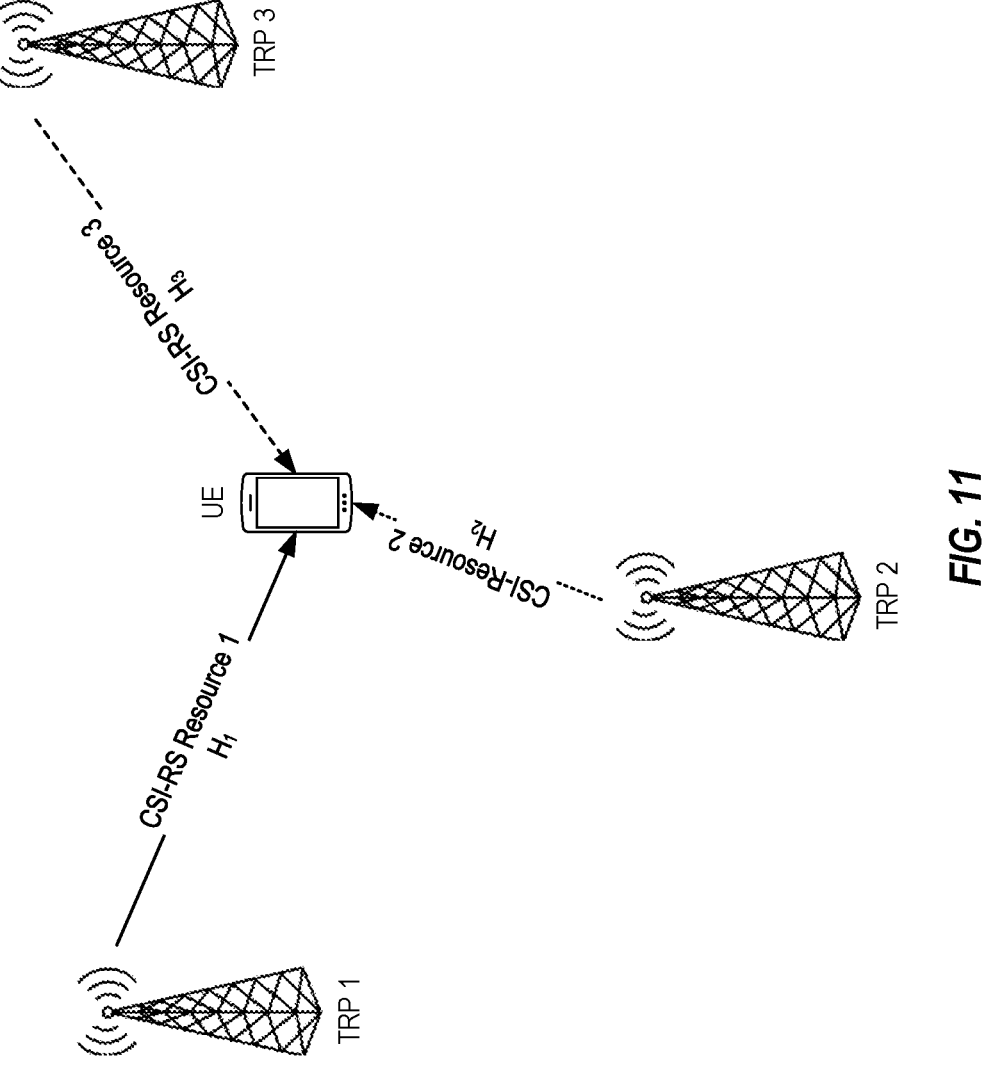
Figure 13:
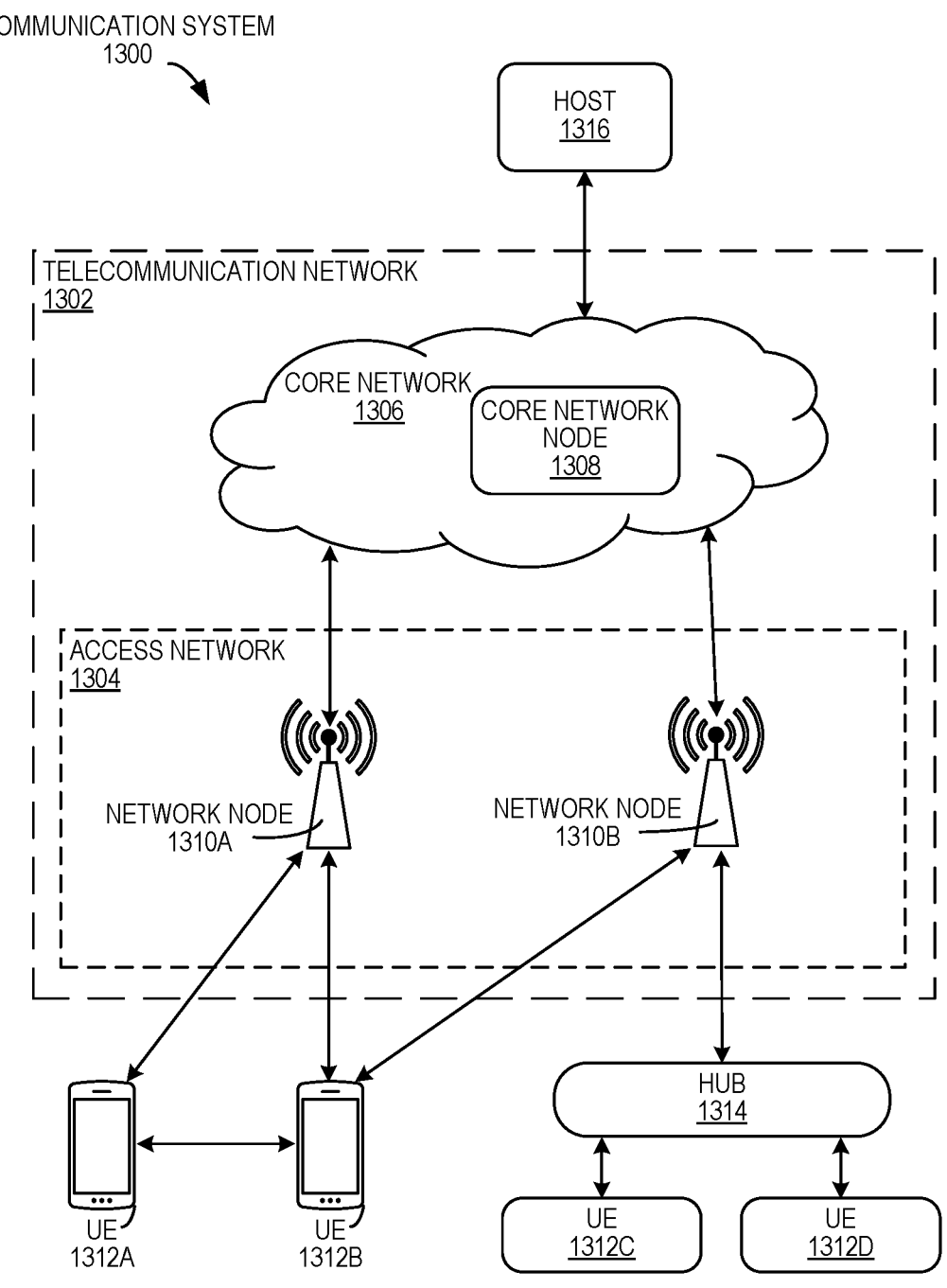
Figure 14:
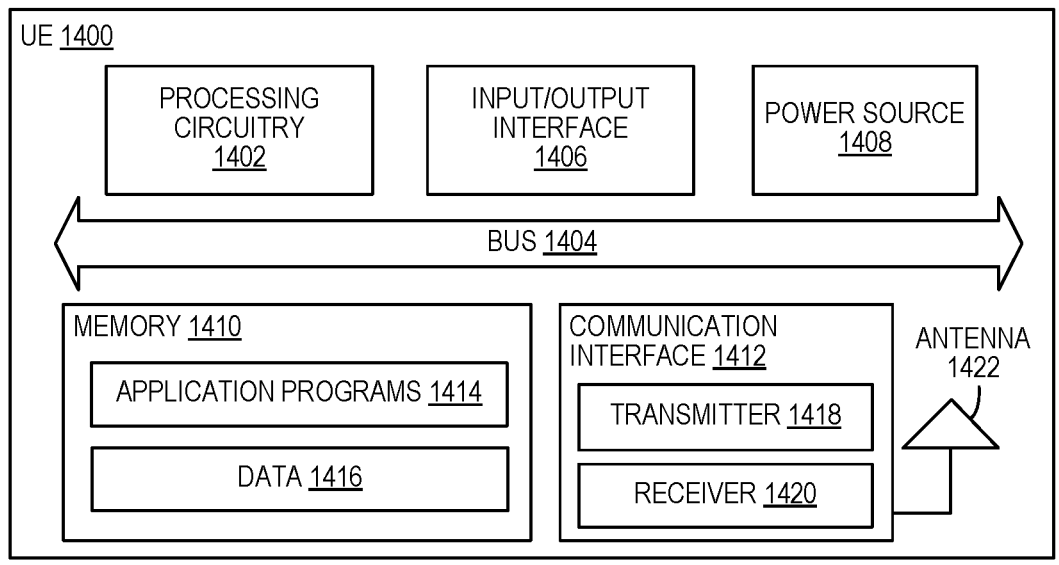
Figure 15:
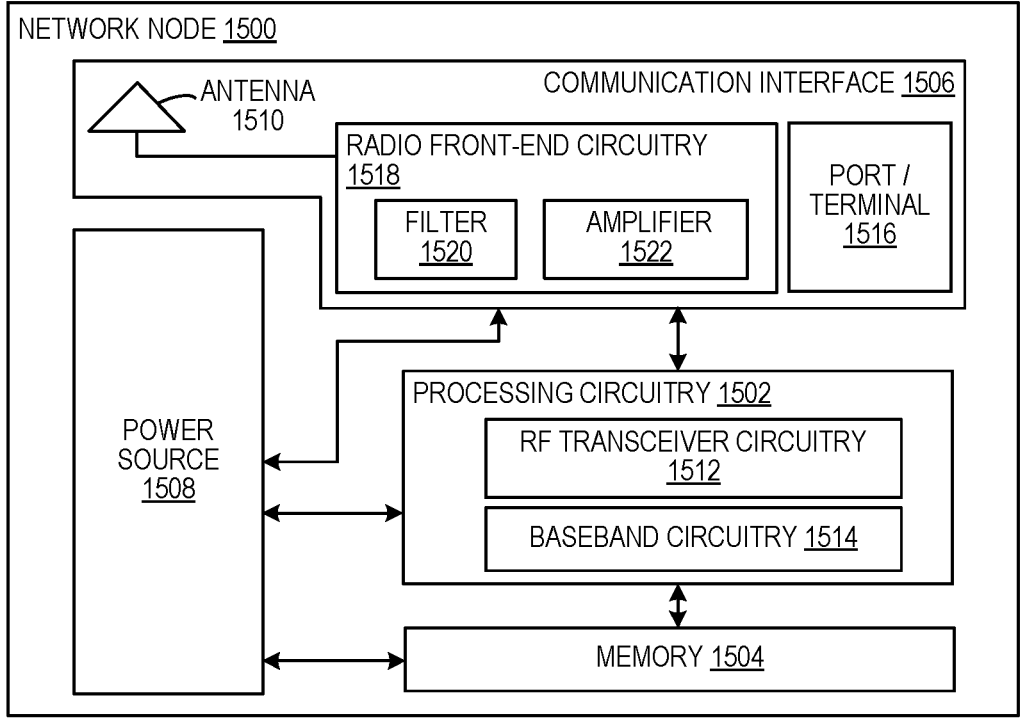
Figure 16:
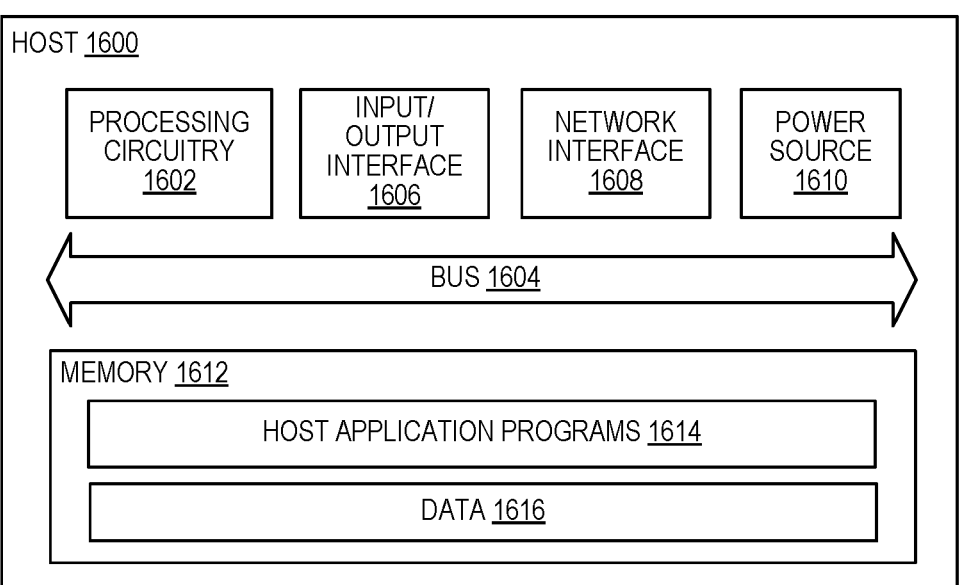
Figure 17:
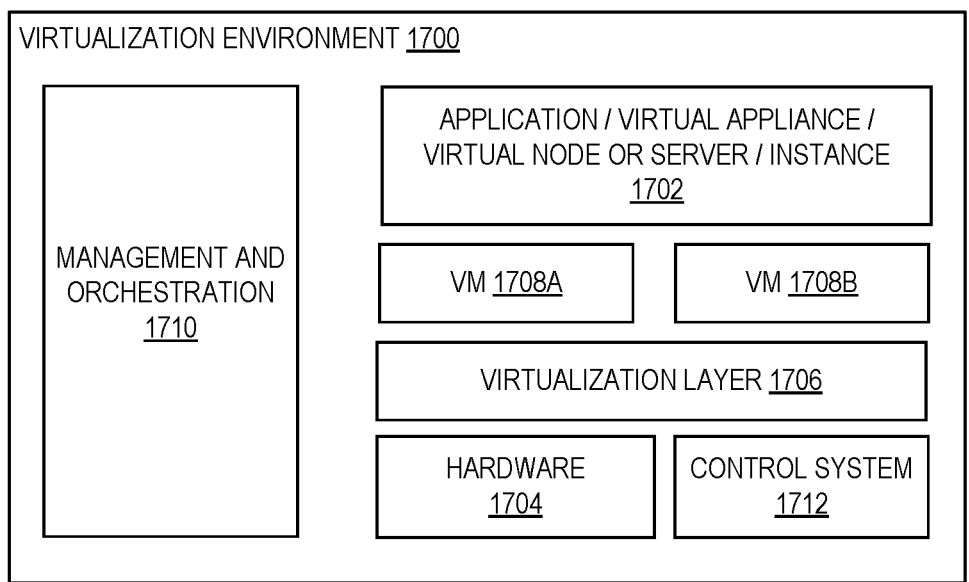
Figure 18:
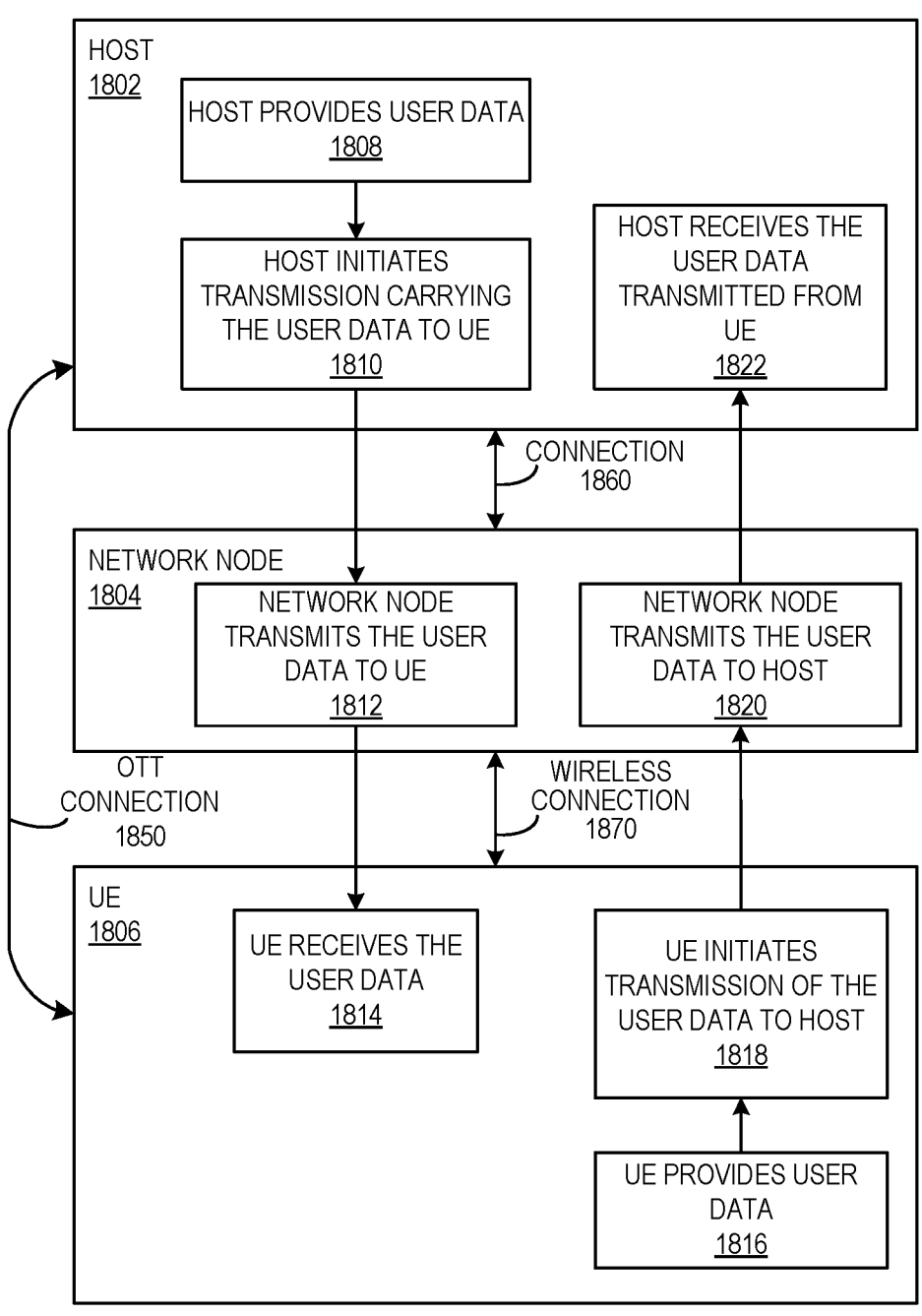

FIG. 6 illustrates one example procedure for reciprocity based Frequency Division Duplexing (FDD) transmission;

FIG. 7 illustrates an example of a procedure in which a $N_R$ base station (gNB) precodes each CSI-RS port towards a dominant cluster;

FIG. 8 shows an example where a User Equipment (UE) is configured with S=3 Non-Zero Power (NZP) CSI-RS resources for channel measurement in accordance with an embodiment of the present disclosure;

FIG. 9 shows an example where the UE is configured with S=3 NZP CSI-RS resources (the three NZP CSI-RS resources are CSI-RS resources 1, 2, and 3) but is configured to perform channel measurements on a subset of the set of configured NZP CSI-RS resources, in accordance with an embodiment of the present disclosure;

FIG. 10 shows an example where the UE is configured with S=3 sets of CSI-RS ports with different Quasi Co-Location (QCL) source reference signals (RSs) (i.e., different Transmission Configuration Indicator (TCI) states or unified TCI states) within a single NZP CSI-RS resource for channel measurement, in accordance with an embodiment of the present disclosure;

FIG. 11 is an illustration of a UE performing measurement on the NZP CSI-RS resources for Coherent Joint Transmission (CJT) CSI feedback, in accordance with an embodiment of the present disclosure;

FIG. 12 illustrates the operation of a UE and a network node in accordance with at least some embodiments of the present disclosure;

FIG. 13 shows an example of a communication system in which embodiments of the present disclosure may be implemented;

FIG. 14 shows a UE in accordance with some embodiments;

FIG. 15 shows a network node in accordance with some embodiments;

FIG. 16 is a block diagram of a host, which may be an embodiment of the host of FIG. 13, in accordance with various aspects described herein;

FIG. 17 is a block diagram illustrating a virtualization environment in which functions implemented by some embodiments may be virtualized; and FIG. 18 shows a communication diagram of a host communicating via a network node with a UE over a partially wireless connection in accordance with some embodiments.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the New Radio (NR) base station, or next generation Node B (gNB), transmitting and receiving radio signals to/from User Equipment (UE) according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the term TRP may not be captured in 3GPP specifications. Instead, a TRP may be represented by a TCI state, a Non-Zero Power (NZP) Channel State Information Reference Signal (CSI-RS) resource, or a subset of ports within an NZP CSI-RS resource.

Note that the description given herein focuses on a 3GPP cellular communications system and, as such, 3GPP terminology or terminology similar to 3GPP terminology is oftentimes used. However, the concepts disclosed herein are not limited to a 3GPP system.

There currently exist certain challenge(s). Although Type II Channel State Information (CSI) enhancements for Coherent Joint Transmission (CJT) from multiple TRPs is described on high level in RWS-210437, 'NR enhancements for DL MIMO,' Huawei, HiSilicon, 3GPP TSG RAN Meeting #92-e, Electronic Meeting, Jun. 28-Jul. 2, 2021 and RWS-210181, 'On Rel-18 $N_R$ MIMO enhancements for 5G Advanced,' Samsung, 3GPP TSG RAN Meeting #92-e, Electronic Meeting, Jun. 28-Jul. 2, 2021), several details on how to perform CSI reporting for Type II CSI from the UE to the gNB for the case with coherent transmission from multiple TRPs have not been discussed in RWS-210437 and RWS-210181. Particularly, how to compute and report frequency domain Type II CSI parameters for the case when coherent transmission from multiple TRPs with angle and delay reciprocity is deployed is an open problem that needs to be solved.

Certain aspects of the disclosure and their embodiments may provide solutions to these or other challenges. Embodiments related to following aspects are described herein for Type II CSI reporting for CJT with angle and delay reciprocity:

configuration of a common Frequency Domain (FD) basis vector window for all configured NZP CSI-RS resources configuration of subsets of FD basis vectors within a common FD basis vector window for each NZP CSI-RS resource configuration of one FD basis vector window per configured NZP CSI-RS resource UE selecting and reporting FD basis vectors from the one or more configured windows of FD basis vectors and reporting the selected FD basis vectors wherein the selection/reporting is common for all S configured NZP CSI-RS resources the selection/reporting is specific to each of the S configured NZP CSI-RS resources Embodiments of a method performed by a UE for CSI feedback are disclosed herein. In one embodiment, a method performed by a UE for CSI feedback comprises one or more of the following steps:

Step 1: The UE receives, from a network node, first configuration information that configures the UE with at least one of the following configurations for channel measurement associated with a CSI reporting configuration:

(a) multiple NZP CSI-RS resources for channel measurement wherein each of the multiple NZP CSI-RS resources is associated with a different Transmission Configuration Indicator (TCI) state or unified TCI state (see Section 2.1.1 for detailed embodiments related to this);

(b) a single NZP CSI-RS resource for channel measurement consisting of multiple sets of CSI-RS ports wherein each set of CSI-RS ports within the single NZP CSI-RS resource is associated with a different TCI state or unified TCI state (See Section 2.1.2 for detailed embodiments related to this); or (c) both (a) and (b).

Step 2: The UE performs channel measurements on:

(i) at least a subset of the configured multiple NZP CSI-RS resources using the respective TCI state or unified TCI state associated with each NZP CSI-RS resource;

(ii) the configured single NZP CSI-RS resource wherein the multiple sets of CSI-RS ports in the single NZP CSI-RS resource are measured using the respective TCI state or unified TCI state associated with each set of CSI-RS ports; or (iii) both (i) and (ii).

Step 3: The UE receives (e.g., from the network node) second configuration information that configures the UE with one or more FD basis vector windows which may be:

A. for the case of configuration of multiple NZP CSI-RS resources (per Step 1(a) above), per NZP CSI-RS resource or over all configured NZP CSI-RS resources;

B. for the case of configuration of a single NZP CSI-RS resources (per Step 1(b) above), per set of CSI-RS ports within the single configured NZP CSI-RS resource or over all configured sets of CSI-RS ports within the singled configured NZP CSI-RS resource; or C. both A and B.

Step 4: The UE receiving configuration of a number of FD basis vectors to be selected which may be:

I. for the case of configuration of multiple NZP CSI-RS resources (per Step 1(a) above), specific to NZP CSI-RS resource or common to all configured NZP CSI-RS resources;

II. for the case of configuration of a single NZP CSI-RS resources (per Step 1(b) above), specific to a set of CSI-RS ports within the single configured NZP CSI-RS resource or common to all sets of CSI-RS ports within the single configured NZP CSI-RS resource; or III. both I and II.

Step 5: The UE computes CSI using the channel measurements performed in step 2 and according to the configuration in Steps 3-4.

Step 6: The UE reports the computed CSI. Note that the CSI may further include one or more other parameters (e.g., Rank Indicator (RI), Channel Quality Indicator (CQI), a set of selected ports, linear combination coefficients, etc.). Note that the optimization described below in Section 2.3.2 may also be used in some embodiments.

In one embodiment, the UE receives a configuration from the gNB (e.g., via Radio Resource Control (RRC) signaling) with a single FD basis window that is commonly used for all S configured NZP CSI-RS resources. In one embodiment, the single FD basis window configuration comprises a starting FD basis index, M_init, and a window size N (note: N is the number of FD basis vectors in the window and M_init is the starting FD basis vector within the window). In another embodiment, the single FD basis window configuration comprises a window size N, and the starting FD basis index is predefined in specifications (note: N is the number of FD basis vectors in the window and M_init is the starting FD basis vector within the window). In another embodiment, the single FD basis window configuration comprises a window size N that includes the full set of FD basis vectors (wherein the full set of FD basis vectors is determined by the number of Precoding Matrix Indicator (PMI) subbands N3). In another embodiment, the UE receives configuration from the gNB (e.g., via RRC) of S subsets of FD basis vectors within the single window, where each of the S subsets of FD basis vectors is associated with each of the S configured NZP CSI-RS resources. Further, in one embodiment, the configuration of each subset comprises a starting FD basis vector index and/or length (i.e., length here corresponds to number of FD basis vectors in the subset).

In another embodiment, the UE receives configuration from the gNB (e.g., via RRC signaling) with S FD basis windows, where each FD basis window is associated with each of the S configured NZP CSI-RS resources. Further, in one embodiment, each of the S FD basis windows configured comprises a starting FD basis index, M_init,s and a window size N_s (note: N_s is the number of FD basis vectors in the sth window and M_init,s is the starting FD basis vector of the sth window). In another embodiment, each of the S FD basis windows configured comprises a window size N_s, and the starting FD basis vector of the sth window is preconfigured in specifications (note: N_s is the number of FD basis vectors in the sth window and M_init,s is the starting FD basis vector of the sth window).

In one embodiment, the UE is configured (e.g., via RRC signaling) to select a number of FD basis vectors according to one of the following:

the UE is configured to select a same number of FD basis vectors for each of the S configured NZP CSI-RS resources from the single FD basis window the UE is configured to select a same number of FD basis vectors for each of the S configured NZP CSI-RS resources from the associated subset of FD basis vectors among the S subsets of FD basis vectors the UE is configured to select a same number of FD basis vectors for each of the S configured NZP CSI-RS resources from the associated window of FD basis vectors among the S FD basis vector windows the UE is configured to select a different number of FD basis vectors for different configured NZP CSI-RS resources from the single FD basis window the UE is configured to select a different number of FD basis vectors for different configured NZP CSI-RS resources from the associated subset of FD basis vectors among the of the S subsets of FD basis vectors the UE is configured to select a different number of FD basis vectors for different configured NZP CSI-RS resources from the associated window of FD basis vectors among the of the S FD basis vector windows In one embodiment, a common subset of FD basis vectors is selected for all S configured NZP CSI-RS resources from the single FD basis window. In one embodiment, the UE reports the selected common subset of FD basis vectors via a combinatorial coefficient index to the gNB. In one embodiment, the UE performs further down-selection among the selected common subset of FD basis vectors and the further down-selected FD basis vectors are reported to the gNB via a non-zero coefficient bitmap. In another embodiment, the UE performs further down-selection among the selected common subset of FD basis vectors and the further down-selected FD basis vectors are reported to the gNB via a combinatorial coefficient index.

In one embodiment, a different subset of FD basis vectors is selected for each of the S configured NZP CSI-RS resources from one of the following from the single FD basis window from the associated subset of FD basis vectors from the associated FD basis window In one embodiment, the UE reports the selected different subset of FD basis vectors to the gNB via a combinatorial coefficient index per configured NZP CSI-RS resource.

In one embodiment, the UE receives configuration from the gNB (e.g., via RRC signaling) with a single FD basis window that is commonly used for all S CSI-RS resources within the single configured NZP CSI-RS resource set. In one embodiment, the single FD basis window configuration comprises a starting FD basis index, M_init and a window size N (note: N is the number of FD basis vectors in the window and M_init is the starting FD basis vector within the window). In another embodiment, the single FD basis window configuration comprises a window size N, and the starting FD basis index is predefined in specifications (note: N is the number of FD basis vectors in the window and M_init is the starting FD basis vector within the window). In another embodiment, the single FD basis window configuration comprises a window size N that includes the full set of FD basis vectors (wherein the full set of FD basis vectors is determined by the number of PMI subbands $N_3$). In another embodiment, the UE receives configuration from the gNB (e.g., via RRC) of S subsets of FD basis vectors within the single window, where each of the S subsets of FD basis vectors is associated with each of the S sets of CSI-RS ports within the single configured NZP CSI-RS resource. Further, in one embodiment, the configuration of each subset comprises a starting FD basis vector index and/or length (i.e., length here corresponds to number of FD basis vectors in the subset).

In another embodiment, the UE receives configuration from the gNB (e.g., via RRC signaling) with S FD basis windows, where each FD basis window is associated with each of the S sets of CSI-RS ports within the single configured NZP CSI-RS resource. Further, in one embodiment, each of the S FD basis windows configured comprises a starting FD basis index, M_init, s and a window size N_s (note: N_s is the number of FD basis vectors in the sth window and M_init,s is the starting FD basis vector of the sth window). In another embodiment, each of the S FD basis windows configured comprises a window size N_s, and the starting FD basis vector of the sth window is preconfigured in specifications (note: N_s is the number of FD basis vectors in the sth window and M_init,s is the starting FD basis vector of the sth window).

In one embodiment, the UE is configured (e.g., via RRC signaling) to select a number of FD basis vectors according to one of the following:

the UE is configured to select a same number of FD basis vectors for each of the S sets of CSI-RS ports within the single configured NZP CSI-RS resource from the single FD basis window the UE is configured to select a same number of FD basis vectors for each of the S sets of CSI-RS ports within the single configured NZP CSI-RS resource from the associated subset of FD basis vectors among the of the S subsets of FD basis vectors the UE is configured to select a same number of FD basis vectors for each of the S sets of CSI-RS ports within the single configured NZP CSI-RS resource from the associated window of FD basis vectors among the of the S FD basis vector windows the UE is configured to select a different number of FD basis vectors for different sets of CSI-RS ports within the single configured NZP CSI-RS resources from the single FD basis window the UE is configured to select a different number of FD basis vectors for different sets of CSI-RS ports within the single configured NZP CSI-RS resources from the associated subset of FD basis vectors among the of the S subsets of FD basis vectors the UE is configured to select a different number of FD basis vectors for different sets of CSI-RS ports within the single configured NZP CSI-RS resources from the associated window of FD basis vectors among the of the S FD basis vector windows In one embodiment, a common subset of FD basis vectors is selected for all S sets of CSI-RS ports within the single configured NZP CSI-RS resources from the single FD basis window. In one embodiment, the UE reports the selected common subset of FD basis vectors via a combinatorial coefficient index to the gNB. In one embodiment, the UE performs further down-selection among the selected common subset of FD basis vectors and the further down-selected FD basis vectors are reported to the gNB via a non-zero coefficient bitmap. In another embodiment, the UE performs further down-selection among the selected common subset of FD basis vectors and the further down-selected FD basis vectors are reported to the gNB via a combinatorial coefficient index.

In one embodiment, a different subset of FD basis vectors is selected for each of the S sets of CSI-RS ports within the single configured NZP CSI-RS resources from one of the following from the single FD basis window
    from the associated subset of FD basis vectors
    from the associated FD basis window In one embodiment, the UE reports the selected different subset of FD basis vectors to the gNB via a combinatorial coefficient index per set of CSI-RS ports within the single configured NZP CSI-RS resource.

Certain embodiments may provide one or more of the following technical advantage(s). With embodiments of the proposed solutions, the network can know the association between reported Type II frequency domain compression parameters and NZP CSI-RS resources transmitted from different TRPs during CJT. From this association, the network can know which frequency domain basis vectors corresponding to which TRP which transmits the NZP CSI-RS. Using the reported Type II frequency domain compression parameters, the network can perform precoding to a UE from each of the TRPs used in a CJT with angle and delay reciprocity.

2.1 Channel Measurement 2.1.1 Multiple NZP CSI-RS Resources for Channel Measurement The UE is configured by the gNB with NZP CSI-RS resource(s) for channel measurement. To enable Channel State Information (CSI) feedback corresponding to Coherent Joint Transmission (CJT) from multiple TRPs, the UE may be signaled with S>1 NZP CSI-RS resource(s) in a CSI reporting configuration to perform channel measurement for the purpose of calculating CSI. In addition, CSI resource(s) for Interference Measurement (CSI-IM(s)) or additional NZP CSI-RS resource(s) for interference measurement may also be signaled to the UE.

In one embodiment, the UE is higher layer configured (e.g., via Radio Resource Control (RRC) signaling) with S NZP CSI-RS resource(s) for channel measurement. Each of the S NZP CSI-RS resources may be associated with different TCI states or unified TCI states. The different TCI states may consist of one or more of the following:

different QCL source reference signals (RSs) of QCL Types A, B, or C, where the different QCL Type A/B/C source RSs may be transmitted from different TRPs;
    different QCL source RSs of QCL Type D, where the different QCL Type D source RSs may be transmitted from different TRPs;

FIG. 8 shows an example where the UE is configured S=3 NZP CSI-RS resources for channel measurement. The S=3 NZP CSI-RS resources denoted as CSI-RS resources 1, 2, and 3 are transmitted from TRPs 1, 2, and 3, respectively. CSI-RS resources 1, 2, and 3 are measured by the UE to compute/calculate the CSI corresponding to CJT from TRPs 1, 2, and 3. That is, the channel $H_1$ corresponding to TRP 1 is measured on CSI-RS resource 1, the channel $H_2$ corresponding to TRP 2 is measured on CSI-RS resource 2, and the channel $H_3$ corresponding to TRP 3 is measured on CSI-RS resource 3.

In another variant of this embodiment, S NZP CSI-RS resources are configured for channel measurement, and the UE is further indicated by the gNB with a subset S' (where S≥S' >1) of the NZP CSI-RS resources to perform channel measurement. The further indication may be via a Medium Access Control (MAC) Control Element (CE) control message or via a Downlink Control Information (DCI) (e.g., via a DCI field of a DCI that triggers a CSI report or a DCI field of a DCI that is independent of the DCI that triggers the CSI report). For instance, when a UE is configured via RRC signaling with S NZP CSI-RS resources, the UE may receive a MAC CE from the gNB to indicate S'≤S NZP CSI-RS resources that are to be used for channel measurement to calculate CSI corresponding to CJT. FIG. 9 shows an example where the UE is configured with S=3 NZP CSI-RS resources (the three NZP CSI-RS resources are CSI-RS resources 1, 2, and 3 wherein CSI-RS resource is not shown in FIG. 9). Then, the UE receives a further indication (e.g., via MAC CE signaling or via DCI) of S'=2 NZP CSI-RS resources (i.e., CSI-RS resources 1 and 3) for channel measurement to calculate CSI corresponding to CJT from TRP1 and TRP3. The channel $H_1$ corresponding to TRP 1 is measured on CSI-RS resource 1, and the channel $H_3$ corresponding to TRP 3 is measured on CSI-RS resource 3. In a scenario where based on channel measurement in the uplink, the gNB may know that the UE sees stronger channel from TRP 1 and 3, the gNB may indicate the UE dynamically to use the subset of NZP CSI-RS resources (e.g., CSI-RS resources 1 and 3) for channel measurement. Being able to dynamically indicate a subset S' of NZP CSI-RS resources for channel measurement out of the configured S NZP CSI-RS resources enables the network to dynamically update the NZP CSI-RS resources for channel measurement without the need to RRC reconfigure the UE which tends to be slower compared to dynamically indicating the S' NZP CSI-RS resources. In one extension to this embodiment, the MAC-CE or DCI used to indicate the subset S' of the NZP CSI-RS resources to perform channel measurements on, also includes an indication whether the remaining S-S' NZP CSI-RS resource(s) (initially configured for channel measurements), instead should be used as NZP CSI-RS resources for interference measurements. For example, in FIG. 9, where the gNB indicates NZP CSI-RS resource 1 and NZP CSI-RS resource 3 for channel measurements to calculate CSI corresponding to CJT, the gNB can also indicate whether the UE should ignore the NZP CSI-RS resource 2 or use NZP CSI-RS resource 2 for interference measurement. In case it is used for interference measurements, the UE could assume that the Identity matrix is used as the precoder over the CSI-RS resource ports belonging to that NZP CSI-RS resource. This could for example be useful in case the gNB knows that it will use the TRP2 to transmit to other UEs at the same time (i.e., MU-MIMO). The UE could add the interference estimated from the S-S' NZP CSI-RS resource(s) with other potential interference measurements associated with other CSI-IM(s) or other additional NZP CSI-RS resource(s) configured for interference measurements.

In yet another variant of this embodiment, S NZP CSI-RS resources are configured for channel measurement, and the UE selects a subset S' (where S≥S'>1) of the NZP CSI-RS resources to calculate CSI corresponding to CJT. The selected subset of S' NZP CSI-RS resources are reported by the UE to the gNB as part of the CSI feedback. In one example, the number S' is reported as part of CSI part 1, and indicators indicating the selected subset of S' NZP CSI-RS resources are reported as part of CSI part 2. In an alternative embodiment, the S' NZP CSI-RS resources are reported in a MAC CE control message from the UE to the gNB. Consider the example in FIG. 9 where the UE is configured with S=3 NZP CSI-RS resources. Then, the UE measures the configured S=3 NZP CSI-RS resources and selects S'=2 NZP CSI-RS resources (i.e., CSI-RS resources 1 and 3) for channel measurement to calculate CSI corresponding to CJT from TRP1 and TRP3. For instance, the UE may select CSI-RS resources 1 and 3 based on the strongest received signal strength among the S=3 NZP CSI-RS resources configured. In one extension to this embodiment, when the UE selects a subset S' of the NZP CSI-RS resources to perform channel measurements on, the UE can either use the remaining S-S' NZP CSI-RS resource(s) (initially configured for channel measurements), as NZP CSI-RS resources for interference measurements or ignore them. In one alternate of this embodiment, a UE is pre-configured in the specification to use them as NZP-CSI-RS resource for interference measurements. In one alternate of this embodiment, a UE is pre-configured in the specification to ignore them. In another alternate of this embodiment, the UE can be RRC configured (e.g., with a flag in CSI-ReportConfig information element (IE) as specified in TS 38.311) to either to use them as NZP-CSI-RS resource for interference measurements or to ignore them. In case they are used for interference measurements, the UE could add the interference estimated from the S-S' NZP CSI-RS resource(s) with other potential interference measurements associated with other CSI-IM(s) or other additional NZP CSI-RS resource(s) configured for interference measurements.

In another embodiment, each of the S NZP CSI-RS resources is configured with a same number of CSI-RS ports. In addition, the S NZP CSI-RS resources are orthogonal and in a same slot. In other words, the UE can measure all channels associated with the S NZP CSI-RS within a slot. The total number of CSI-RS ports from all the CSI-RS resources may not exceed 32.

2.1.2 Single NZP CSI-RS Resource for Channel Measurement

In this embodiment, to enable CSI feedback corresponding to CJT from multiple TRPs, the UE may be signaled with a single NZP CSI-RS resource in a CSI reporting configuration to perform channel measurement for the purpose of calculating CSI. In addition, CSI-IM(s) or additional NZP CSI-RS resource(s) for interference measurement may also be signaled to the UE.

In this embodiment, the UE is higher layer configured (i.e., via RRC signaling) with a single NZP CSI-RS resource for channel measurement that consists of S sets of CSI-RS ports. Each of the S sets of CSI-RS ports may be associated with different TCI states or unified TCI states (i.e., there are S different TCI states or unified TCI states associated with the S sets of CSI-RS ports). The different TCI states may consist of one or more of the following:

> different QCL source reference signals (RSs) of QCL Types A, B, or C, where the different QCL Type A/B/C source RSs may be transmitted from different TRPs;
> different QCL source RSs of QCL Type D, where the different QCL Type D source RSs may be transmitted from different TRPs;

FIG. 10 shows an example where the UE is configured with S=3 sets of CSI-RS ports with different QCL source RSs (i.e., different TCI states or unified TCI states) within a single NZP CSI-RS resource for channel measurement.

> The $1^{st}$ set of CSI-RS ports are associated with the $1^{st}$ set of QCL source RSs which are contained in a $1^{st}$ set of TCI state(s). The $1^{st}$ set of CSI-RS ports and the $1^{st}$ set of QCL source RSs are transmitted from TRP 1.
> The $2^{nd}$ set of CSI-RS ports are associated with the $2^{nd}$ set of QCL source RSs which are contained in a $2^{nd}$ set of TCI state(s). The $2^{nd}$ set of CSI-RS ports and the $2^{nd}$ set of QCL source RSs are transmitted from TRP 2.
> The $3^{rd}$ set of CSI-RS ports are associated with the $3^{rd}$ set of QCL source RSs which are contained in a $3^{rd}$ set of TCI state(s). The $3^{rd}$ set of CSI-RS ports and the $3^{rd}$ set of QCL source RSs are transmitted from TRP 3.

A beamformed CSI-RS may be transmitted on each CSI-RS port from a TRP, and the beamformed channel from a TRP is measured from the corresponding CSI-RS port. The UE may select a subset of the ports in the NZP CSI-RS resource and report the selected CSI-RS ports as part of the CSI feedback corresponding to CJT. The selected CSI-RS ports that are included in the CSI report can belong to one or more of the S sets of CSI-RS ports.

In an alternative embodiment, a UE may be higher layer configured (i.e., via RRC signaling) with an aggregated NZP CSI-RS resource for channel measurement that consists of S CSI-RS resources aggregated. Each of the S CSI-RS resources may be associated with different TCI states or unified TCI states (i.e., there are S different TCI states or unified TCI states associated with the S aggregated CSI-RS resources). The different TCI states may consist of one or more of the following:

> different QCL source reference signals (RSs) of QCL Types A, B, or C, where the different QCL Type A/B/C source RSs may be transmitted from different TRPs;
> different QCL source RSs of QCL Type D, where the different QCL Type D source RSs may be transmitted from different TRPs;

2.2 Type II CSI Reporting Enhancement for CJT with Angle and Delay Reciprocity

The UE performs measurement on the NZP CSI-RS resources for CJT CSI feedback as shown in FIG. 11. The channel measurements corresponding to CSI-RS resources 1, 2, and 3 are respectively denoted as $H_1$, $H_2$, and $H_3$. Note that measured channel $H_s$ corresponds to the channel measured between the UE and a TRP.

The Type II CSI report can also be used for CJT in conjunction with beamformed CSI-RS and angle and delay reciprocity. For such scenarios, the configuration and reporting mechanisms can be based on the Rel-17 Type II CSI.

For each MIMO layer, the precoder matrix is given by a size-$P \times N_3$ matrix $$W = W_1 \tilde{W}_2 W_f^H,$$

where $$P = \sum_{s=0}^{S-1} P_s$$

is the total number of CSI-RS ports in all the S NZP CSI-RS resources, where $P_s$ is the number of CSI-RS ports in the sth NZP CSI-RS resource.

> $N_3$ is the number of PMI subbands, or the length of the FD basis vectors $$W_1 = \text{diag}\left(W_1^{(0)}, \ldots, W_1^{(S-1)}\right)$$

is size-$P \times 2$ L block diagonal spatial compression matrix, where L is the total number of selected ports associated with all the S NZP CSI-RS resources, where $$W_1^{(s)} = \begin{bmatrix} u_1^s, \ldots, u_{L_s}^s & 0 \\ 0 & u_1^s, \ldots, u_{L_s}^s \end{bmatrix} (s = 0, \ldots, S-1)$$

is a port selection matrix associated with the sth NZP CSI-RS resource, $$\{u_1^s, \ldots, u_{L_s}^s\}$$

is a set of size $P_s/2 \times 1$ orthogonal vectors, each with one element equals to 1 and the rest elements equal to zero, associated with the sth NZP CSI-RS resource, and $$L = \sum_{s=0}^{S-1} L_s.$$

$W_f$ is size-$N_3 \times M_{total}$ frequency compression matrix, where $M_{total}$ is the total number of selected FD basis vectors out of the $N_3$ orthogonal FD DFT basis vectors $\{f_0\ f_1\ \ldots\ f_{N_3-1}\}$ for all S NZP CSI-RS resources, where $f_k$ is a size-$N_3 \times 1$ frequency domain DFT vector $\tilde{W}_2$ is size 2 $L \times M_{total}$ coefficient matrix $$W = W_1 \tilde{W}_2 W_f^H = \begin{bmatrix} W^{(0)} \\ \ldots \\ W^{(S-1)} \end{bmatrix},$$

where $W^{(s)}$ is a size $P_s \times N_3$ matrix associated with the sth CSI-RS resources and is normalized to norm $$\frac{1}{\sqrt[2]{\gamma_s}},$$

where $\gamma_s$ is the number of layers associated with the sth NZP CSI-RS resource 2.2.1 gNB Configuring FD Basis Vectors Delay pre-compensation is expected to be applied jointly over all configured NZP CSI-RS resources, such that the combined DL channel (over all the configured NZP CSI-RS resources) is much less frequency-selective (ideally frequency flat) when observed by the UE. Most of the channel knowledge can thus be preserved within some FD basis window(s), which contains a number of consecutive FD basis vectors. The UE then determines the actual FD basis vectors that are used for Type II CSI compression and feedback to gNB. The selected CSI-RS ports and coefficients that combine the selected CSI-RS ports and the selected FD basis vectors are also reported.

In some embodiments, the gNB can configure a single FD basis window that is commonly used for all configured NZP CSI-RS resources. The FD basis window can be configured via a starting FD basis index, $M_{init}$ and a window size N. For example, when $M_{init}=1$, and N=4, it means that FD basis vectors 1, 2, 3, 4 are configured to the UE. Alternatively, if $M_{init}$ has been pre-defined or specified in 3GPP, e.g., $M_{init}=0$ (i.e., the DC FD component), only the size of the window needs to be configured. $M_{init}$ (if configured) and N is higher-layer configured, e.g., via RRC, to the UE.

In some embodiments, besides configuring a common FD basis window that is identified by $M_{init}$ (if configured) and N, gNB in addition can configure to the UE a subset of FD basis vectors that are within the window for each associated NZP CSI-RS resource. This is useful when the propagation channels for different NZP CSI-RS resources have different different properties (e.g., some with line-of-sight (LoS), some with non-LoS (NLoS)). This subset of FD basis vectors can be configured via higher layer signaling, e.g., RRC. In some embodiments, the UE is configured with a starting FD basis vector index for each subset of FD basis vectors. In addition, the UE may also be configured with a length for each subset of FD basis vectors wherein the length represents the number of FD basis vectors in the subset.

In some other embodiments, each configured NZP CSI-RS resource can be associated with a different FD basis window. The FD basis window for NZP CSI-RS resource s is configured via a starting FD basis index $M_{init,s}$ and the corresponding window size $N_s$, for s=0,1, . . . , S−1, where S is the number of configured CSI-RS resources. Alternatively, if $M_{init,s}$ has been pre-defined or specified in 3GPP, e.g., $M_{init,s}=0$ (i.e., the DC FD component), only the size of the window needs to be reported. $M_{init,s}$ and $N_s$ for s=0, 1, . . . , S−1 are higher-layer configured, e.g., via RRC, to the UE.

In some other embodiments, the FD window has length $N_3$, therefore the window contains the full set of FD basis vectors. In this case, gNB configuration is not needed.

In some embodiments, besides configuring FD basis window, gNB may also explicitly configure the number of FD basis vectors selected by the UE for the configured NZP CSI-RS resources.

In some embodiments, the number of FD basis vectors selected by the UE are the same for all configured NZP CSI-RS resources, which is configured to the UE directly or using some parameter combination, via higher-layer signaling, e.g., RRC.

In some other embodiments, the number of FD basis vectors selected by the UE can be different for different NZP CSI-RS resources. The number of FD basis vectors selected by the UE for NZP CSI-RS resource s, can be directly signaled to the UE or can be signaled to the UE using some parameter combination, via higher-layer signaling, e.g., RRC.

Above, in this section, the gNB configures a single FD basis window commonly used for all configured NZP CSI-RS resources or different FD basis windows for different configured NZP CSI-RS resources (i.e., multiple FD basis windows for multiple configured NZP CSI-RS resources, respectively). However, in another embodiment, the UE is configured with a single NZP CSI-RS resource with multiple sets of CSI-RS ports (see Section 2.1.2 above). In this case, in one embodiment, the gNB configures the UE with a single FD basis window that is commonly used for all of the sets of CSI-RS ports within the single configured NZP CSI-RS resource. However, in one embodiment, the gNB configures the UE with different FD basis windows for different sets of CSI-RS ports within the single configured NZP CSI-RS resource (i.e., multiple FD basis window for the multiple sets of CSI-RS ports, respectively).

2.2.2 UE Reporting the Selected FD Basis Vectors

For each NZP CSI-RS resource, UE selects a subset of FD basis vectors from the configured FD basis window and report to gNB. Note that while following is described for the case in which the UE is configured with multiple NZP CSI-RS resources (e.g., as described above in Section 2.1.1), corresponding embodiments apply for the case in which the UE is configured with a single NZP CSI-RS resource with multiple sets of CSI-RS ports (e.g., the UE selects a subset of FD basis vectors from the configured FD basis window for each of the multiple sets of CSI-RS ports within the single configured NZP CSI-RS resource).

In some embodiments, a common subset of FD basis vectors is selected from the configured FD basis window for all the NZP CSI-RS resources. The selected subset of FD basis vectors can be reported to gNB using a combinatorial coefficient (e.g., $i_{1,6,l}$ for layer 1 if layer-specific FD basis vectors are selected, or $i_{1,6}$ for all layers if layer-common FD basis vectors are selected), the combinatorial coefficient takes on a value in the range $$\left\{0, 1, \dots, \binom{N}{M}-1\right\},$$

where N is the size of the configured FD basis window, and M is the number of FD basis vectors in the common subset.

When a common subset of FD basis vectors is selected from the configured FD basis window for all the NZP CSI-RS resources, in some embodiments, UE can further down-select the FD basis vectors within the common set for which non-zero coefficients will be reported. This is useful since it is unlikely that all the FD basis vectors in the common set are strong for a particular TRP. In such cases, the coefficients associated with the weak FD basis are close to zero, which requires unnecessary overhead to report. In some embodiments, the down-selected FD basis vectors associated with a NZP CSI-RS can be reported to the gNB using a combinatorial coefficient, which takes on a value in the range $$\left\{0, 1, \dots, \binom{M}{M_s}-1\right\},$$

where $M_s$ is the number of down-selected FD basis vectors for the s-th NZP CSI-RS.

In some other embodiments, UE selects a subset of FD basis vectors that are used for each individual NZP CSI-RS resource from the configured candidate set of FD basis vectors. The selected subset of FD basis vectors for NZP CSI-RS resource s, for S=0, 1, . . . , S−1, can be reported to gNB using a combinatorial coefficient (e.g., $i_{1,6,l,s}$ for layer 1 if layer-specific FD basis vectors are selected, or $i_{1,6,s}$ for all layers if layer-common FD basis vectors are selected), the combinatorial coefficient takes on a value in the range $$\left\{0, 1, \dots, \binom{N_s}{M_s}-1\right\},$$

where $N_s$ is the number of candidate FD basis vectors for NZP CSI-RS resource s, and $N_s$ is the number of FD basis vectors in the selected subset for NZP CSI-RS resource s.

2.3 Further Optimization for Reporting FD Basis

In the following, optimization related to reporting of FD basis vectors are proposed.

2.3.1 Rotation of FD Basis Vectors for Each Associated NZP CSI-RS

For each NZP CSI-RS resource, when calculating the Type II report, UE can rotate the corresponding selected FD basis vectors such that the zero-th FD basis vector (e.g., the DC component which contains all ones) is always selected. Therefore, the zero-th FD basis vector will always be selected for all NZP CSI-RS resources so that it does not need to be reported. Based on this, UE can calculate the linear combination coefficient matrix, $W_2$, to ensure coherency between NZP CSI-RS resources and selected FD basis vectors. The reporting overhead can thus be saved. In some embodiments, for each NZP CSI-RS, UE only needs to report the FD basis vectors that are not the zero-th FD basis vector.

2.3.2 Reporting FD Basis Vectors Per NZP CSI-RS with a Constraint on the Total Number of Selected FD Basis Vectors In some scenarios, the propagation channels between the UE and the multiple TRPs are different in richness. For example, a UE may have line-of-sight (LoS) to one TRP while has non-LoS to another TRP. In such cases, a single FD basis vector may be sufficient for the first TRP while multiple FD basis vectors are needed for the second TRP.

In light of this, different number of FD basis vectors can be selected for different TRPs (hence the associated NZP CSI-RS) based on channel condition. The gNB only needs to configure the maximum total number of FD basis vectors selected by UE for all NZP CSI-RS resources, it is up to the UE to report the actual number of selected FD basis vectors for each NZP CSI-RS.

UE can report the selected FD basis vectors for NZP CSI-RS resource s with a bitmap of length $N_s$, for s=0, . . . , S−1, where S is the number of configured NZP CSI-RS resources, and $N_s$ is the number of FD basis candidates (can be explicitly configured via high-layer parameter, or can be implicitly inferred from the number of PMI subbands) for NZP CSI-RS resource s. Each bit field in the bitmap corresponds to a unique FD basis vector candidate that is commonly known to the gNB and the UE. The bitmap for NZP CSI-RS resource s contains $M_s$ ones ($0 \leq M_s \leq N_s$), indicating the $M_s$ FD basis vectors selected by the UE. The rest $N_s - M_s$ bit fields are all zeros. Denote $M_{max}$ the maximum limit on the total number of orthogonal FD basis vectors selected over all S NZP CSI-RS resources, $$\sum_{s=0}^{S-1} M_s \leq M_{max}$$

shall be fulfilled.

The number of FD basis vectors selected by the UE for NZP CSI-RS resource s can be inferred by counting the number of ones in the bit field. In this way, there is no need to signal the number of selected FD basis vectors per NZP CSI-RS explicitly, thereby reducing the encoding/reporting complexity. In addition, the payload stays constant and is therefore more predictable (otherwise payload may vary depending on the actual number of selected FD basis vectors for each NZP CSI-RS).

To further explain the above, consider a case where 3 NZP CSI-RS resources are configured to the UE, i.e., s=0, 1, 2. Assuming that the UE can select FD basis vectors from 4 candidates, indexed by 0, 1, 2, 3 (i.e., $N_1=N_2=N_3=4$), from which the UE selects a maximum of $M_{max}=6$ FD basis vectors in total over all 3 NZP CSI-RS resources $$\left(\sum_{s=0}^{2} M_s \leq 6, 0 \leq M_s \leq 4\right).$$

Based on the channel measurements, the UE may select FD basis vectors {0}, {0, 1} and {0, 1, 3} for NZP CSI-RS resource 0, 1 and 2, respectively. Then, the selected FD basis vectors can be encoded as 1000, 1100, and 1101, for NZP CSI-RS resource 0, 1 and 2, respectively. In addition, if the zero-th FD basis is not reported, as proposed in Section 2.3.1, the selected FD basis vectors can be instead encoded as 000, 100 and 101 for NZP CSI-RS resource 0, 1 and 2, respectively. Note that with the bitmap encoding, it is also possible for the UE to report fewer number of FD basis vectors than maximally configured, without any increase in payload for indicating the choice.

In addition, a FD basis vector $f_k \in \{f_0 \, f_1 \ldots f_{N_3-1}\}$, among the selected FD basis vectors associated to all the CSI-RS resources, corresponding to the strongest received signal power is determined and the index of the FD basis vector $f_{k'}$ is reported by the UE. The coefficients in $\tilde{W}_2$ are scaled by the coefficient associated with the FD vector $f_{k'}$. The coefficient associated with the FD vector $f_{k'}$ is thus equal to one and may not be reported by the UE.

2.4 Further Description

FIG. 12 illustrates the operation of a UE 1200 and a network node 1202 in accordance with at least some of the embodiments described above. The process of FIG. 12 includes the following steps. Note that not all steps are required. The UE 1200 and/or the network node 1202 may perform any one or more of the steps illustrated in FIG. 12 and described below.

Step 1204: The UE 1200 receives, from the network node 1202, information that configures the UE 1200 with:

(a) multiple NZP CSI-RS resources for channel measurement associated with a CSI reporting configuration, where each of the multiple NZP CSI-RS resources is associated with a different TCI state or unified TCI state;

(b) a single NZP CSI-RS resource for channel measurement associated with the CSI reporting configuration, the single NZP CSI-RS resource comprising (e.g., consisting of) multiple sets of CSI-RS ports wherein each set of CSI-RS ports within the single NZP CSI-RS resource is associated with a different TCI state or unified TCI state; or (c) both (a) and (b);

Step 1206: The UE 1200 performs channel measurement on:

(i) at least a subset of the configured multiple NZP CSI-RS resources using the respective TCI states or unified TCI state;

(ii) the configured single NZP CSI-RS resource wherein the multiple sets of CSI-RS ports in the single NZP CSI-RS resource are measured using the respective TCI states or unified TCI state; or (iii) both (i) and (ii);

Step 1208: The UE 1200 receives, from the network node 1202, information that configures the UE 1200 with one or more frequency domain basis vector windows that are:

A. per NZP CSI-RS resource or over all configured NZP CSI-RS resources, in the case of configuration of multiple NZP CSI-RS resources for channel measurement;

B. per set of CSI-RS ports or over all sets of CSI-RS ports, in the case of configuration of a single NZP CSI-RS resource for channel measurement, the single NZP CSI-RS resource comprising the multiple sets of CSI-RS ports; or C. both A and B;

Step 1210: The UE 1200 receives, from the network node 1202, information that configures the UE 1200 with a number of frequency domain vectors to be selected, where the number of frequency domain vectors to be selected is:

I. specific to NZP CSI-RS resource or common to all configured NZP CSI-RS resources, in the case of configuration of multiple NZP CSI-RS resources for channel measurement;

II. specific to a set of CSI-RS ports within the single configured NZP CSI-RS resource or common to all sets of CSI-RS ports within the single configured NZP CSI-RS resource, in the case of configuration of a single NZP CSI-RS resource for channel measurement, the single NZP CSI-RS resource comprising the multiple sets of CSI-RS ports; or III. both I and II;

Step 1212: The UE 1200 computes CSI based on the channel measurements and in accordance with the received information that configures the UE 1200 with the one or more frequency domain basis vector windows and the information that configures the UE 1200 with the number of frequency domain vectors to be selected.

Step 1214: The UE 1200 reports the computed CSI.

In one embodiment, the UE 1200 is configured with multiple(S) NZP CSI-RS resources for channel measurement in step 1204, and the one or more frequency domain basis vector windows comprise a single frequency basis window that is commonly used for all S configured NZP CSI-RS resources. In one embodiment, the information that configures the UE 1200 with the single frequency domain basis window comprises a starting frequency domain basis index, M_init, and a window size N, where N is the number of frequency domain basis vectors in the single frequency domain basis window and M_init is a starting frequency domain basis vector within the single frequency domain basis window. In another embodiment, the information that configures the UE 1200 with the single frequency domain basis window comprises a window size N where N is the number of frequency domain basis vectors in the single frequency domain basis window, and a starting frequency domain basis index for the single frequency domain basis window is predefined (e.g., in specifications). In another embodiment, the information that configures the UE 1200 with the single frequency domain basis window comprises a window size N that includes a full set of frequency domain basis vectors, wherein the full set of frequency domain basis vectors is determined by an associated number of PMI subbands N3. In another embodiment, the UE 1200 receives configuration of S subsets of frequency domain basis vectors within the single frequency domain basis window, where each of the S subsets of frequency domain basis vectors is associated with a respective one of the S configured NZP CSI-RS resources. Further, in one embodiment, the configuration of each of the S subsets of frequency domain basis vectors comprises a starting frequency domain basis vector index and/or length, where the length corresponds to number of frequency domain basis vectors in the subset. In one embodiment, a common subset of frequency domain basis vectors is selected for all S configured NZP CSI-RS resources from the single frequency domain basis window. Further, in one embodiment, the UE 1200 reports the selected common subset of frequency domain basis vectors as part of the CSI via a combinatorial coefficient index. In one embodiment, the UE 1200 performs further down-selection among the selected common subset of frequency domain basis vectors and the further down-selected frequency domain basis vectors are reported in the CSI via a non-zero coefficient bitmap. In another embodiment, the UE 1200 performs further down-selection among the selected common subset of frequency domain basis vectors and the further down-selected frequency domain basis vectors are reported in the CSI via a combinatorial coefficient index.

In another embodiment, the UE 1200 is configured with multiple(S) NZP CSI-RS resources for channel measurement, and the one or more frequency domain basis vector windows comprise S frequency domain basis windows, where each of the S frequency domain basis windows is associated with a respective one of the S configured NZP CSI-RS resources. In one embodiment, the information that configures the UE 1200 with each of the S frequency domain basis windows comprises a starting frequency domain basis index, M_init,s, and a window size N_s, where N_s is the number of frequency domain basis vectors in the sth frequency domain basis window and M_init,s is the starting frequency domain basis vector of the sth frequency domain basis window. In another embodiment, the information that configures the UE 1200 with each of the S frequency domain basis windows comprises a window size N_s, and a starting frequency domain basis vector of the sth frequency domain basis window is preconfigured (e.g., in specifications), where the window size N_s is the number of frequency domain basis vectors in the sth window and M_init,s is the starting frequency domain basis vector of the sth frequency domain basis window.

In one embodiment, the UE 1200 is configured to select a number of frequency domain basis vectors according to one of the following:

the UE is configured to select a same number of frequency domain basis vectors for each of the S configured NZP CSI-RS resources from the single frequency domain basis window the UE is configured to select a same number of frequency domain basis vectors for each of the S configured NZP CSI-RS resources from the associated subset of frequency domain basis vectors among the of the S subsets of frequency domain basis vectors the UE is configured to select a same number of frequency domain basis vectors for each of the S configured NZP CSI-RS resources from the associated window of FD basis vectors among the of the S frequency domain basis vector windows the UE is configured to select a different number of frequency domain basis vectors for different configured NZP CSI-RS resources from the single frequency domain basis window the UE is configured to select a different number of frequency domain basis vectors for different configured NZP CSI-RS resources from the associated subset of frequency domain basis vectors among the of the S subsets of frequency domain basis vectors the UE is configured to select a different number of frequency domain basis vectors for different configured NZP CSI-RS resources from the associated window of frequency domain basis vectors among the of the S frequency domain basis vector windows.

In one embodiment, a different subset of frequency domain basis vectors is selected for each of the S configured NZP CSI-RS resources from one of the following: from the single FD basis window, from the associated subset of FD basis vectors, or from the associated FD basis window. In on embodiment, the UE reports the selected different subset of frequency domain basis vectors in the CSI via a combinatorial coefficient index per configured NZP CSI-RS resource.

In another embodiment, the UE 1200 is configured with a single NZP CSI-RS resource for channel measurement, the single NZP CSI-RS resource having multiple(S) sets of CSI-RS ports, and the one or more frequency domain basis vector windows comprise a single frequency basis window that is commonly used for all S sets of CSI-RS ports within the single configured NZP CSI-RS resource. In one embodiment, the information that configures the UE 1200 with the single frequency domain basis window comprises a starting frequency domain basis index, M_init, and a window size N, where N is the number of frequency domain basis vectors in the single frequency domain basis window and M_init is a starting frequency domain basis vector within the single frequency domain basis window. In another embodiment, the information that configures the UE 1200 with the single frequency domain basis window comprises a window size N where N is the number of frequency domain basis vectors in the single frequency domain basis window, and a starting frequency domain basis index for the single frequency domain basis window is predefined (e.g., in specifications). In another embodiment, the information that configures the UE 1200 with the single frequency domain basis window comprises a window size N that includes a full set of frequency domain basis vectors, wherein the full set of FD basis vectors is determined by an associated number of PMI subbands N3.

In one embodiment, the UE 1200 receives configuration of S subsets of frequency domain basis vectors within the single frequency domain basis window, where each of the S subsets of frequency domain basis vectors is associated with a respective one of the S sets of CSI-RS ports within the single configured NZP CSI-RS resource. In one embodiment, the configuration of each of the S subsets of frequency domain basis vectors comprises a starting frequency domain basis vector index and/or length, where the length corresponds to number of frequency domain basis vectors in the subset.

In one embodiment, a common subset of frequency domain basis vectors is selected for all of the S sets CSI-RS ports within the single configured NZP CSI-RS resource from the single frequency domain basis window. In one embodiment, the UE 1200 reports the selected common subset of frequency domain basis vectors as part of the CSI via a combinatorial coefficient index. In one embodiment, the UE 1200 performs further down-selection among the selected common subset of frequency domain basis vectors and the further down-selected frequency domain basis vectors are reported in the CSI via a non-zero coefficient bitmap. In another embodiment, the UE 1200 performs further down-selection among the selected common subset of frequency domain basis vectors and the further down-selected frequency domain basis vectors are reported in the CSI via a combinatorial coefficient index.

In one embodiment, the UE 1200 is configured with a single NZP CSI-RS resource for channel measurement, the single NZP CSI-RS resource having multiple(S) sets of CSI-RS ports; and the one or more frequency domain basis vector windows comprise S frequency domain basis windows, where each of the S frequency domain basis windows is associated with a respective one of the S sets of CSI-RS ports within the single configured NZP CSI-RS resource. In one embodiment, the information that configures the UE 1200 with each of the S frequency domain basis windows comprises a starting frequency domain basis index, M_init,s, and a window size N_s, where N_s is the number of frequency domain basis vectors in the sth frequency domain basis window and M_init,s is the starting frequency domain basis vector of the sth frequency domain basis window. In another embodiment, the information that configures the UE 1200 with each of the S frequency domain basis windows comprises a window size N_s, and a starting frequency domain basis vector of the sth frequency domain basis window is preconfigured (e.g., in specifications), where the window size N_s is the number of frequency domain basis vectors in the sth window and M_init,s is the starting frequency domain basis vector of the sth frequency domain basis window.

In one embodiment, the UE 1200 is configured to select a number of frequency domain basis vectors according to one of the following:

the UE is configured to select a same number of frequency domain basis vectors for each of the S sets of CSI-RS ports within the single configured NZP CSI-RS resource from the single frequency domain basis window the UE is configured to select a same number of frequency domain basis vectors for each of the S sets of CSI-RS ports within the single configured NZP CSI-RS resource from the associated subset of frequency domain basis vectors among the of the S subsets of frequency domain basis vectors the UE is configured to select a same number of frequency domain basis vectors for each of the S sets of CSI-RS ports within the single configured NZP CSI-RS resource from the associated window of FD basis vectors among the of the S frequency domain basis vector windows the UE is configured to select a different number of frequency domain basis vectors for different sets of CSI-RS ports within the single configured NZP CSI-RS resource from the single frequency domain basis window the UE is configured to select a different number of frequency domain basis vectors for different sets of CSI-RS ports within the single configured NZP CSI-RS resource from the associated subset of frequency domain basis vectors among the of the S subsets of frequency domain basis vectors the UE is configured to select a different number of frequency domain basis vectors for different sets of CSI-RS ports within the single configured NZP CSI-RS resource from the associated window of frequency domain basis vectors among the of the S frequency domain basis vector windows.

In one embodiment, a different subset of frequency domain basis vectors is selected for each of the S sets of CSI-RS ports within the single configured NZP CSI-RS resource from one of the following: from the single FD basis window, from the associated subset of FD basis vectors, or from the associated FD basis window. In one embodiment, the UE 1200 reports the selected different subset of frequency domain basis vectors in the CSI via a combinatorial coefficient index per configured NZP CSI-RS resource.

FIG. 13 shows an example of a communication system 1300 in which embodiments of the present disclosure may be implemented.

In the example, the communication system 1300 includes a telecommunication network 1302 that includes an access network 1304, such as a Radio Access Network (RAN), and a core network 1306, which includes one or more core network nodes 1308. The access network 1304 includes one or more access network nodes, such as network nodes 1310A and 1310B (one or more of which may be generally referred to as network nodes 1310), or any other similar Third Generation Partnership Project (3GPP) access node or non-3GPP Access Point (AP). The network nodes 1310 facilitate direct or indirect connection of User Equipment (UE), such as by connecting UEs 1312A, 1312B, 1312C, and 1312D (one or more of which may be generally referred to as UEs 1312) to the core network 1306 over one or more wireless connections. Note that the network node 1202 of FIG. 12 may be, for example, one of the network nodes 1310, and the UE 1200 of FIG. 12 may be one of the UEs 1312.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1300 may include any number of wired or wireless networks, network nodes, UEs, and/or any other components or systems that may facilitate or participate in the communication of data and/or signals whether via wired or wireless connections. The communication system 1300 may include and/or interface with any type of communication, telecommunication, data, cellular, radio network, and/or other similar type of system.

The UEs 1312 may be any of a wide variety of communication devices, including wireless devices arranged, configured, and/or operable to communicate wirelessly with the network nodes 1310 and other communication devices. Similarly, the network nodes 1310 are arranged, capable, configured, and/or operable to communicate directly or indirectly with the UEs 1312 and/or with other network nodes or equipment in the telecommunication network 1302 to enable and/or provide network access, such as wireless network access, and/or to perform other functions, such as administration in the telecommunication network 1302.

In the depicted example, the core network 1306 connects the network nodes 1310 to one or more hosts, such as host 1316. These connections may be direct or indirect via one or more intermediary networks or devices. In other examples, network nodes may be directly coupled to hosts. The core network 1306 includes one more core network nodes (e.g., core network node 1308) that are structured with hardware and software components. Features of these components may be substantially similar to those described with respect to the UEs, network nodes, and/or hosts, such that the descriptions thereof are generally applicable to the corresponding components of the core network node 1308. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-Concealing Function (SIDF), Unified Data Management (UDM), Security Edge Protection Proxy (SEPP), Network Exposure Function (NEF), and/or a User Plane Function (UPF).

The host 1316 may be under the ownership or control of a service provider other than an operator or provider of the access network 1304 and/or the telecommunication network 1302, and may be operated by the service provider or on behalf of the service provider. The host 1316 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1300 of FIG. 13 enables connectivity between the UEs, network nodes, and hosts. In that sense, the communication system 1300 may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable Second, Third, Fourth, or Fifth Generation (2G, 3G, 4G, or 5G) standards, or any applicable future generation standard (e.g., Sixth Generation (6G)); Wireless Local Area Network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any Low Power Wide Area Network (LPWAN) standards such as LoRa and Sigfox.

In some examples, the telecommunication network 1302 is a cellular network that implements 3GPP standardized features. Accordingly, the telecommunication network 1302 may support network slicing to provide different logical networks to different devices that are connected to the telecommunication network 1302. For example, the telecommunication network 1302 may provide Ultra Reliable Low Latency Communication (URLLC) services to some UEs, while providing enhanced Mobile Broadband (eMBB) services to other UEs, and/or massive Machine Type Communication (mMTC)/massive Internet of Things (IoT) services to yet further UEs.

In some examples, the UEs 1312 are configured to transmit and/or receive information without direct human interaction. For instance, a UE may be designed to transmit information to the access network 1304 on a predetermined schedule, when triggered by an internal or external event, or in response to requests from the access network 1304. Additionally, a UE may be configured for operating in single- or multi-Radio Access Technology (RAT) or multi-standard mode. For example, a UE may operate with any one or combination of WiFi, New Radio (NR), and LTE, i.e. be configured for Multi-Radio Dual Connectivity (MR-DC), such as Evolved UMTS Terrestrial RAN (E-UTRAN) NR-Dual Connectivity (EN-DC).

In the example, a hub 1314 communicates with the access network 1304 to facilitate indirect communication between one or more UEs (e.g., UE 1312C and/or 1312D) and network nodes (e.g., network node 1310B). In some examples, the hub 1314 may be a controller, router, content source and analytics, or any of the other communication devices described herein regarding UEs. For example, the hub 1314 may be a broadband router enabling access to the core network 1306 for the UEs. As another example, the hub 1314 may be a controller that sends commands or instructions to one or more actuators in the UEs. Commands or instructions may be received from the UEs, network nodes 1310, or by executable code, script, process, or other instructions in the hub 1314. As another example, the hub 1314 may be a data collector that acts as temporary storage for UE data and, in some embodiments, may perform analysis or other processing of the data. As another example, the hub 1314 may be a content source. For example, for a UE that is a Virtual Reality (VR) headset, display, loudspeaker or other media delivery device, the hub 1314 may retrieve VR assets, video, audio, or other media or data related to sensory information via a network node, which the hub 1314 then provides to the UE either directly, after performing local processing, and/or after adding additional local content. In still another example, the hub 1314 acts as a proxy server or orchestrator for the UEs, in particular in if one or more of the UEs are low energy IoT devices.

The hub 1314 may have a constant/persistent or intermittent connection to the network node 1310B. The hub 1314 may also allow for a different communication scheme and/or schedule between the hub 1314 and UEs (e.g., UE 1312C and/or 1312D), and between the hub 1314 and the core network 1306. In other examples, the hub 1314 is connected to the core network 1306 and/or one or more UEs via a wired connection. Moreover, the hub 1314 may be configured to connect to a Machine-to-Machine (M2M) service provider over the access network 1304 and/or to another UE over a direct connection. In some scenarios, UEs may establish a wireless connection with the network nodes 1310 while still connected via the hub 1314 via a wired or wireless connection. In some embodiments, the hub 1314 may be a dedicated hub—that is, a hub whose primary function is to route communications to/from the UEs from/to the network node 1310B. In other embodiments, the hub 1314 may be a non-dedicated hub—that is, a device which is capable of operating to route communications between the UEs and the network node 1310B, but which is additionally capable of operating as a communication start and/or end point for certain data channels.

FIG. 14 shows a UE 1400 in accordance with some embodiments. As used herein, a UE refers to a device capable, configured, arranged, and/or operable to communicate wirelessly with network nodes and/or other UEs. Examples of a UE include, but are not limited to, a smart phone, mobile phone, cell phone, Voice over Internet Protocol (VOIP) phone, wireless local loop phone, desktop computer, Personal Digital Assistant (PDA), wireless camera, gaming console or device, music storage device, playback appliance, wearable terminal device, wireless endpoint, mobile station, tablet, laptop, Laptop Embedded Equipment (LEE), Laptop Mounted Equipment (LME), smart device, wireless Customer Premise Equipment (CPE), vehicle-mounted or vehicle embedded/integrated wireless device, etc. Other examples include any UE identified by the 3GPP, including a Narrowband Internet of Things (NB-IoT) UE, a Machine Type Communication (MTC) UE, and/or an enhanced MTC (eMTC) UE.

A UE may support Device-to-Device (D2D) communication, for example by implementing a 3GPP standard for sidelink communication, Dedicated Short-Range Communication (DSRC), Vehicle-to-Vehicle (V2V), Vehicle-to-Infrastructure (V2I), or Vehicle-to-Everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1400 includes processing circuitry 1402 that is operatively coupled via a bus 1404 to an input/output interface 1406, a power source 1408, memory 1410, a communication interface 1412, and/or any other component, or any combination thereof. Certain UEs may utilize all or a subset of the components shown in FIG. 14. The level of integration between the components may vary from one UE to another UE. Further, certain UEs may contain multiple instances of a component, such as multiple processors, memories, transceivers, transmitters, receivers, etc.

The processing circuitry 1402 is configured to process instructions and data and may be configured to implement any sequential state machine operative to execute instructions stored as machine-readable computer programs in the memory 1410. The processing circuitry 1402 may be implemented as one or more hardware-implemented state machines (e.g., in discrete logic, Field Programmable Gate Arrays (FPGAs), Application Specific Integrated Circuits (ASICs), etc.); programmable logic together with appropriate firmware; one or more stored computer programs, general purpose processors, such as a microprocessor or Digital Signal Processor (DSP), together with appropriate software; or any combination of the above. For example, the processing circuitry 1402 may include multiple Central Processing Units (CPUs).

In the example, the input/output interface 1406 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1400. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1408 is structured as a battery or battery pack. Other types of power sources, such as an external power source (e.g., an electricity outlet), photovoltaic device, or power cell, may be used. The power source 1408 may further include power circuitry for delivering power from the power source 1408 itself, and/or an external power source, to the various parts of the UE 1400 via input circuitry or an interface such as an electrical power cable. Delivering power may be, for example, for charging the power source 1408. Power circuitry may perform any formatting, converting, or other modification to the power from the power source 1408 to make the power suitable for the respective components of the UE 1400 to which power is supplied.

The memory 1410 may be or be configured to include memory such as Random Access Memory (RAM), Read Only Memory (ROM), Programmable ROM (PROM), Erasable PROM (EPROM), Electrically EPROM (EEPROM), magnetic disks, optical disks, hard disks, removable cartridges, flash drives, and so forth. In one example, the memory 1410 includes one or more application programs 1414, such as an operating system, web browser application, a widget, gadget engine, or other application, and corresponding data 1416. The memory 1410 may store, for use by the UE 1400, any of a variety of various operating systems or combinations of operating systems.

The memory 1410 may be configured to include a number of physical drive units, such as Redundant Array of Independent Disks (RAID), flash memory, USB flash drive, external hard disk drive, thumb drive, pen drive, key drive, High Density Digital Versatile Disc (HD-DVD) optical disc drive, internal hard disk drive, Blu-Ray optical disc drive, Holographic Digital Data Storage (HDDS) optical disc drive, external mini Dual In-line Memory Module (DIMM), Synchronous Dynamic RAM (SDRAM), external micro-DIMM SDRAM, smartcard memory such as a tamper resistant module in the form of a Universal Integrated Circuit Card (UICC) including one or more Subscriber Identity Modules (SIMs), such as a Universal SIM (USIM) and/or Internet Protocol Multimedia Services Identity Module (ISIM), other memory, or any combination thereof. The UICC may for example be an embedded UICC (eUICC), integrated UICC (iUICC) or a removable UICC commonly known as a 'SIM card.' The memory 1410 may allow the UE 1400 to access instructions, application programs, and the like stored on transitory or non-transitory memory media, to off-load data, or to upload data. An article of manufacture, such as one utilizing a communication system, may be tangibly embodied as or in the memory 1410, which may be or comprise a device-readable storage medium.

The processing circuitry 1402 may be configured to communicate with an access network or other network using the communication interface 1412. The communication interface 1412 may comprise one or more communication subsystems and may include or be communicatively coupled to an antenna 1422. The communication interface 1412 may include one or more transceivers used to communicate, such as by communicating with one or more remote transceivers of another device capable of wireless communication (e.g., another UE or a network node in an access network). Each transceiver may include a transmitter 1418 and/or a receiver 1420 appropriate to provide network communications (e.g., optical, electrical, frequency allocations, and so forth). Moreover, the transmitter 1418 and receiver 1420 may be coupled to one or more antennas (e.g., the antenna 1422) and may share circuit components, software, or firmware, or alternatively be implemented separately.

In the illustrated embodiment, communication functions of the communication interface 1412 may include cellular communication, WiFi communication, LPWAN communication, data communication, voice communication, multimedia communication, short-range communications such as Bluetooth, NFC, location-based communication such as the use of the Global Positioning System (GPS) to determine a location, another like communication function, or any combination thereof. Communications may be implemented according to one or more communication protocols and/or standards, such as IEEE 802.11, Code Division Multiplexing Access (CDMA), Wideband CDMA (WCDMA), GSM, LTE, NR, UMTS, WiMax, Ethernet, Transmission Control Protocol/Internet Protocol (TCP/IP), Synchronous Optical Networking (SONET), Asynchronous Transfer Mode (ATM), Quick User Datagram Protocol Internet Connection (QUIC), Hypertext Transfer Protocol (HTTP), and so forth.

Regardless of the type of sensor, a UE may provide an output of data captured by its sensors, through its communication interface 1412, or via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application, and healthcare. Non-limiting examples of such an IoT device are a device which is or which is embedded in: a connected refrigerator or freezer, a television, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or VR, a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1400 shown in FIG. 14.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship, an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator and handle communication of data for both the speed sensor and the actuators.

FIG. 15 shows a network node 1500 in accordance with some embodiments. As used herein, network node refers to equipment capable, configured, arranged, and/or operable to communicate directly or indirectly with a UE and/or with other network nodes or equipment in a telecommunication network. Examples of network nodes include, but are not limited to, APs (e.g., radio APs), Base Stations (BSs) (e.g., radio BSs, Node Bs, evolved Node Bs (eNBs), and NR Node Bs (gNBs)).

BSs may be categorized based on the amount of coverage they provide (or, stated differently, their transmit power level) and so, depending on the provided amount of coverage, may be referred to as femto BSs, pico BSs, micro BSs, or macro BSs. A BS may be a relay node or a relay donor node controlling a relay. A network node may also include one or more (or all) parts of a distributed radio BS such as centralized digital units and/or Remote Radio Units (RRUs), sometimes referred to as Remote Radio Heads (RRHs). Such RRUs may or may not be integrated with an antenna as an antenna integrated radio. Parts of a distributed radio BS may also be referred to as nodes in a Distributed Antenna System (DAS).

Other examples of network nodes include multiple Transmission Point (multi-TRP) 5G access nodes, Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1500 includes processing circuitry 1502, memory 1504, a communication interface 1506, and a power source 1508. The network node 1500 may be composed of multiple physically separate components (e.g., a Node B component and an RNC component, or a BTS component and a BSC component, etc.), which may each have their own respective components. In certain scenarios in which the network node 1500 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1500 may be configured to support multiple RATs. In such embodiments, some components may be duplicated (e.g., separate memory 1504 for different RATs) and some components may be reused (e.g., an antenna 1510 may be shared by different RATs). The network node 1500 may also include multiple sets of the various illustrated components for different wireless technologies integrated into network node 1500, for example GSM, WCDMA, LTE, NR, WiFi, Zigbee, Z-wave, Long Range Wide Area Network (LoRaWAN), Radio Frequency Identification (RFID), or Bluetooth wireless technologies. These wireless technologies may be integrated into the same or different chip or set of chips and other components within the network node 1500.

The processing circuitry 1502 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other network node 1500 components, such as the memory 1504, to provide network node 1500 functionality.

In some embodiments, the processing circuitry 1502 includes a System on a Chip (SOC). In some embodiments, the processing circuitry 1502 includes one or more of Radio Frequency (RF) transceiver circuitry 1512 and baseband processing circuitry 1514. In some embodiments, the RF transceiver circuitry 1512 and the baseband processing circuitry 1514 may be on separate chips (or sets of chips), boards, or units, such as radio units and digital units. In alternative embodiments, part or all of the RF transceiver circuitry 1512 and the baseband processing circuitry 1514 may be on the same chip or set of chips, boards, or units.

The memory 1504 may comprise any form of volatile or non-volatile computer-readable memory including, without limitation, persistent storage, solid state memory, remotely mounted memory, magnetic media, optical media, RAM, ROM, mass storage media (for example, a hard disk), removable storage media (for example, a flash drive, a Compact Disk (CD), or a Digital Video Disk (DVD)), and/or any other volatile or non-volatile, non-transitory device-readable, and/or computer-executable memory devices that store information, data, and/or instructions that may be used by the processing circuitry 1502. The memory 1504 may store any suitable instructions, data, or information, including a computer program, software, an application including one or more of logic, rules, code, tables, and/or other instructions capable of being executed by the processing circuitry 1502 and utilized by the network node 1500. The memory 1504 may be used to store any calculations made by the processing circuitry 1502 and/or any data received via the communication interface 1506. In some embodiments, the processing circuitry 1502 and the memory 1504 are integrated.

The communication interface 1506 is used in wired or wireless communication of signaling and/or data between a network node, access network, and/or UE. As illustrated, the communication interface 1506 comprises port(s)/terminal(s) 1516 to send and receive data, for example to and from a network over a wired connection. The communication interface 1506 also includes radio front-end circuitry 1518 that may be coupled to, or in certain embodiments a part of, the antenna 1510. The radio front-end circuitry 1518 comprises filters 1520 and amplifiers 1522. The radio front-end circuitry 1518 may be connected to the antenna 1510 and the processing circuitry 1502. The radio front-end circuitry 1518 may be configured to condition signals communicated between the antenna 1510 and the processing circuitry 1502. The radio front-end circuitry 1518 may receive digital data that is to be sent out to other network nodes or UEs via a wireless connection. The radio front-end circuitry 1518 may convert the digital data into a radio signal having the appropriate channel and bandwidth parameters using a combination of the filters 1520 and/or the amplifiers 1522. The radio signal may then be transmitted via the antenna 1510. Similarly, when receiving data, the antenna 1510 may collect radio signals which are then converted into digital data by the radio front-end circuitry 1518. The digital data may be passed to the processing circuitry 1502. In other embodiments, the communication interface 1506 may comprise different components and/or different combinations of components.

In certain alternative embodiments, the network node 1500 does not include separate radio front-end circuitry 1518; instead, the processing circuitry 1502 includes radio front-end circuitry and is connected to the antenna 1510. Similarly, in some embodiments, all or some of the RF transceiver circuitry 1512 is part of the communication interface 1506. In still other embodiments, the communication interface 1506 includes the one or more ports or terminals 1516, the radio front-end circuitry 1518, and the RF transceiver circuitry 1512 as part of a radio unit (not shown), and the communication interface 1506 communicates with the baseband processing circuitry 1514, which is part of a digital unit (not shown).

The antenna 1510 may include one or more antennas, or antenna arrays, configured to send and/or receive wireless signals. The antenna 1510 may be coupled to the radio front-end circuitry 1518 and may be any type of antenna capable of transmitting and receiving data and/or signals wirelessly. In certain embodiments, the antenna 1510 is separate from the network node 1500 and connectable to the network node 1500 through an interface or port.

The antenna 1510, the communication interface 1506, and/or the processing circuitry 1502 may be configured to perform any receiving operations and/or certain obtaining operations described herein as being performed by the network node 1500. Any information, data, and/or signals may be received from a UE, another network node, and/or any other network equipment. Similarly, the antenna 1510, the communication interface 1506, and/or the processing circuitry 1502 may be configured to perform any transmitting operations described herein as being performed by the network node 1500. Any information, data, and/or signals may be transmitted to a UE, another network node, and/or any other network equipment.

The power source 1508 provides power to the various components of the network node 1500 in a form suitable for the respective components (e.g., at a voltage and current level needed for each respective component). The power source 1508 may further comprise, or be coupled to, power management circuitry to supply the components of the network node 1500 with power for performing the functionality described herein. For example, the network node 1500 may be connectable to an external power source (e.g., the power grid or an electricity outlet) via input circuitry or an interface such as an electrical cable, whereby the external power source supplies power to power circuitry of the power source 1508. As a further example, the power source 1508 may comprise a source of power in the form of a battery or battery pack which is connected to, or integrated in, power circuitry. The battery may provide backup power should the external power source fail.

Embodiments of the network node 1500 may include additional components beyond those shown in FIG. 15 for providing certain aspects of the network node's functionality, including any of the functionality described herein and/or any functionality necessary to support the subject matter described herein. For example, the network node 1500 may include user interface equipment to allow input of information into the network node 1500 and to allow output of information from the network node 1500. This may allow a user to perform diagnostic, maintenance, repair, and other administrative functions for the network node 1500.

FIG. 16 is a block diagram of a host 1600, which may be an embodiment of the host 1316 of FIG. 13, in accordance with various aspects described herein. As used herein, the host 1600 may be or comprise various combinations of hardware and/or software including a standalone server, a blade server, a cloud-implemented server, a distributed server, a virtual machine, container, or processing resources in a server farm. The host 1600 may provide one or more services to one or more UEs.

The host 1600 includes processing circuitry 1602 that is operatively coupled via a bus 1604 to an input/output interface 1606, a network interface 1608, a power source 1610, and memory 1612. Other components may be included in other embodiments. Features of these components may be substantially similar to those described with respect to the devices of previous figures, such as FIGS. 14 and 15, such that the descriptions thereof are generally applicable to the corresponding components of the host 1600.

The memory 1612 may include one or more computer programs including one or more host application programs

1614 and data 1616, which may include user data, e.g. data generated by a UE for the host 1600 or data generated by the host 1600 for a UE. Embodiments of the host 1600 may utilize only a subset or all of the components shown. The host application programs 1614 may be implemented in a container-based architecture and may provide support for video codecs (e.g., Versatile Video Coding (VVC), High Efficiency Video Coding (HEVC), Advanced Video Coding (AVC), Moving Picture Experts Group (MPEG), VP9) and audio codecs (e.g., Free Lossless Audio Codec (FLAC), Advanced Audio Coding (AAC), MPEG, G.711), including transcoding for multiple different classes, types, or implementations of UEs (e.g., handsets, desktop computers, wearable display systems, and heads-up display systems). The host application programs 1614 may also provide for user authentication and licensing checks and may periodically report health, routes, and content availability to a central node, such as a device in or on the edge of a core network. Accordingly, the host 1600 may select and/or indicate a different host for Over-The-Top (OTT) services for a UE. The host application programs 1614 may support various protocols, such as the HTTP Live Streaming (HLS) protocol, Real-Time Messaging Protocol (RTMP), Real-Time Streaming Protocol (RTSP), Dynamic Adaptive Streaming over HTTP (DASH or MPEG-DASH), etc.

FIG. 17 is a block diagram illustrating a virtualization environment 1700 in which functions implemented by some embodiments may be virtualized. In the present context, virtualizing means creating virtual versions of apparatuses or devices which may include virtualizing hardware platforms, storage devices, and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more Virtual Machines (VMs) implemented in one or more virtual environments 1700 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1702 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1704 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1706 (also referred to as hypervisors or VM Monitors (VMMs)), provide VMs 1708A and 1708B (one or more of which may be generally referred to as VMs 1708), and/or perform any of the functions, features, and/or benefits described in relation with some embodiments described herein. The virtualization layer 1706 may present a virtual operating platform that appears like networking hardware to the VMs 1708.

The VMs 1708 comprise virtual processing, virtual memory, virtual networking, or interface and virtual storage, and may be run by a corresponding virtualization layer 1706.

Different embodiments of the instance of a virtual appliance 1702 may be implemented on one or more of the VMs 1708, and the implementations may be made in different ways. Virtualization of the hardware is in some contexts referred to as Network Function Virtualization (NFV). NFV may be used to consolidate many network equipment types onto industry standard high volume server hardware, physical switches, and physical storage, which can be located in data centers and customer premise equipment.

In the context of NFV, a VM 1708 may be a software implementation of a physical machine that runs programs as if they were executing on a physical, non-virtualized machine. Each of the VMs 1708, and that part of the hardware 1704 that executes that VM, be it hardware dedicated to that VM and/or hardware shared by that VM with others of the VMs 1708, forms separate virtual network elements. Still in the context of NFV, a virtual network function is responsible for handling specific network functions that run in one or more VMs 1708 on top of the hardware 1704 and corresponds to the application 1702.

The hardware 1704 may be implemented in a standalone network node with generic or specific components. The hardware 1704 may implement some functions via virtualization. Alternatively, the hardware 1704 may be part of a larger cluster of hardware (e.g., such as in a data center or CPE) where many hardware nodes work together and are managed via management and orchestration 1710, which, among others, oversees lifecycle management of the applications 1702. In some embodiments, the hardware 1704 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a RAN or a BS. In some embodiments, some signaling can be provided with the use of a control system 1712 which may alternatively be used for communication between hardware nodes and radio units.

FIG. 18 shows a communication diagram of a host 1802 communicating via a network node 1804 with a UE 1806 over a partially wireless connection in accordance with some embodiments. Example implementations, in accordance with various embodiments, of the UE (such as the UE 1312A of FIG. 13 and/or the UE 1400 of FIG. 14), the network node (such as the network node 1310A of FIG. 13 and/or the network node 1500 of FIG. 15), and the host (such as the host 1316 of FIG. 13 and/or the host 1600 of FIG. 16) discussed in the preceding paragraphs will now be described with reference to FIG. 18.

Like the host 1600, embodiments of the host 1802 include hardware, such as a communication interface, processing circuitry, and memory. The host 1802 also includes software, which is stored in or is accessible by the host 1802 and executable by the processing circuitry. The software includes a host application that may be operable to provide a service to a remote user, such as the UE 1806 connecting via an OTT connection 1850 extending between the UE 1806 and the host 1802. In providing the service to the remote user, a host application may provide user data which is transmitted using the OTT connection 1850.

The network node 1804 includes hardware enabling it to communicate with the host 1802 and the UE 1806 via a connection 1860. The connection 1860 may be direct or pass through a core network (like the core network 1306 of FIG. 13) and/or one or more other intermediate networks, such as one or more public, private, or hosted networks. For example, an intermediate network may be a backbone network or the Internet.

The UE 1806 includes hardware and software, which is stored in or accessible by the UE 1806 and executable by the UE's processing circuitry. The software includes a client application, such as a web browser or operator-specific "app" that may be operable to provide a service to a human or non-human user via the UE 1806 with the support of the host 1802. In the host 1802, an executing host application may communicate with the executing client application via the OTT connection 1850 terminating at the UE 1806 and the host 1802. In providing the service to the user, the UE's client application may receive request data from the host's host application and provide user data in response to the request data. The OTT connection 1850 may transfer both the request data and the user data. The UE's client application may interact with the user to generate the user data that it provides to the host application through the OTT connection 1850.

The OTT connection 1850 may extend via the connection 1860 between the host 1802 and the network node 1804 and via a wireless connection 1870 between the network node 1804 and the UE 1806 to provide the connection between the host 1802 and the UE 1806. The connection 1860 and the wireless connection 1870, over which the OTT connection 1850 may be provided, have been drawn abstractly to illustrate the communication between the host 1802 and the UE 1806 via the network node 1804, without explicit reference to any intermediary devices and the precise routing of messages via these devices.

As an example of transmitting data via the OTT connection 1850, in step 1808, the host 1802 provides user data, which may be performed by executing a host application. In some embodiments, the user data is associated with a particular human user interacting with the UE 1806. In other embodiments, the user data is associated with a UE 1806 that shares data with the host 1802 without explicit human interaction. In step 1810, the host 1802 initiates a transmission carrying the user data towards the UE 1806. The host 1802 may initiate the transmission responsive to a request transmitted by the UE 1806. The request may be caused by human interaction with the UE 1806 or by operation of the client application executing on the UE 1806. The transmission may pass via the network node 1804 in accordance with the teachings of the embodiments described throughout this disclosure. Accordingly, in step 1812, the network node 1804 transmits to the UE 1806 the user data that was carried in the transmission that the host 1802 initiated, in accordance with the teachings of the embodiments described throughout this disclosure. In step 1814, the UE 1806 receives the user data carried in the transmission, which may be performed by a client application executed on the UE 1806 associated with the host application executed by the host 1802.

In some examples, the UE 1806 executes a client application which provides user data to the host 1802. The user data may be provided in reaction or response to the data received from the host 1802. Accordingly, in step 1816, the UE 1806 may provide user data, which may be performed by executing the client application. In providing the user data, the client application may further consider user input received from the user via an input/output interface of the UE 1806. Regardless of the specific manner in which the user data was provided, the UE 1806 initiates, in step 1818, transmission of the user data towards the host 1802 via the network node 1804. In step 1820, in accordance with the teachings of the embodiments described throughout this disclosure, the network node 1804 receives user data from the UE 1806 and initiates transmission of the received user data towards the host 1802. In step 1822, the host 1802 receives the user data carried in the transmission initiated by the UE 1806.

One or more of the various embodiments improve the performance of OTT services provided to the UE 1806 using the OTT connection 1850, in which the wireless connection 1870 forms the last segment.

In an example scenario, factory status information may be collected and analyzed by the host 1802. As another example, the host 1802 may process audio and video data which may have been retrieved from a UE for use in creating maps. As another example, the host 1802 may collect and analyze real-time data to assist in controlling vehicle congestion (e.g., controlling traffic lights). As another example, the host 1802 may store surveillance video uploaded by a UE. As another example, the host 1802 may store or control access to media content such as video, audio, VR, or AR which it can broadcast, multicast, or unicast to UEs. As other examples, the host 1802 may be used for energy pricing, remote control of non-time critical electrical load to balance power generation needs, location services, presentation services (such as compiling diagrams etc. from data collected from remote devices), or any other function of collecting, retrieving, storing, analyzing, and/or transmitting data.

In some examples, a measurement procedure may be provided for the purpose of monitoring data rate, latency, and other factors on which the one or more embodiments improve. There may further be an optional network functionality for reconfiguring the OTT connection 1850 between the host 1802 and the UE 1806 in response to variations in the measurement results. The measurement procedure and/or the network functionality for reconfiguring the OTT connection 1850 may be implemented in software and hardware of the host 1802 and/or the UE 1806. In some embodiments, sensors (not shown) may be deployed in or in association with other devices through which the OTT connection 1850 passes; the sensors may participate in the measurement procedure by supplying values of the monitored quantities exemplified above, or by supplying values of other physical quantities from which software may compute or estimate the monitored quantities. The reconfiguring of the OTT connection 1850 may include message format, retransmission settings, preferred routing, etc.; the reconfiguring need not directly alter the operation of the network node 1804. Such procedures and functionalities may be known and practiced in the art. In certain embodiments, measurements may involve proprietary UE signaling that facilitates measurements of throughput, propagation times, latency, and the like by the host 1802. The measurements may be implemented in that software causes messages to be transmitted, in particular empty or 'dummy' messages, using the OTT connection 1850 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining, or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box or nested within multiple boxes, in practice computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hardwired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole and/or by end users and a wireless network generally.

Some example embodiments of the present disclosure are as follows:

Group A Embodiments

Embodiment 1: A method performed by a user equipment, UE, (1200), the method comprising one or more of the following steps:

receiving (1204), from a network node (1202), information that configures the UE (1200) with:
(a) multiple NZP CSI-RS resources for channel measurement associated with a CSI reporting configuration, where each of the multiple NZP CSI-RS resources is associated with a different TCI state or unified TCI state; or
(b) a single NZP CSI-RS resource for channel measurement associated with the CSI reporting configuration, the single NZP CSI-RS resource comprising (e.g., consisting of) multiple sets of CSI-RS ports wherein each set of CSI-RS ports within the single NZP CSI-RS resource is associated with a different TCI state or unified TCI state; or
(c) both (a) and (b);
performing (1206) channel measurement on:
(i) at least a subset of the configured multiple NZP CSI-RS resources using the respective TCI states or unified TCI state; or
(ii) the configured single NZP CSI-RS resource wherein the multiple sets of CSI-RS ports in the single NZP CSI-RS resource are measured using the respective TCI states or unified TCI state; or
(iii) both (i) and (ii);
receiving (1208), from the network node (1202), information that configures the UE (1200) with one or more frequency domain basis vector windows that are:
A. per NZP CSI-RS resource or over all configured NZP CSI-RS resources, in the case of configuration of multiple NZP CSI-RS resources for channel measurement; or
B. per set of CSI-RS ports or over all sets of CSI-RS ports, in the case of configuration of a single NZP CSI-RS resource for channel measurement, the single NZP CSI-RS resource comprising the multiple sets of CSI-RS ports; or
C. both A and B;
receiving (1210), from the network node (1202), information that configures the UE (1200) with a number of frequency domain vectors to be selected, where the number of frequency domain vectors to be selected is:
I. specific to NZP CSI-RS resource or common to all configured NZP CSI-RS resources, in the case of configuration of multiple NZP CSI-RS resources for channel measurement; or
II. specific to a set of CSI-RS ports within the single configured NZP CSI-RS resource or common to all sets of CSI-RS ports within the single configured NZP CSI-RS resource, in the case of configuration of a single NZP CSI-RS resource for channel measurement, the single NZP CSI-RS resource comprising the multiple sets of CSI-RS ports; or
III. both I and II;
computing (1212) CSI based on the channel measurements and in accordance with the received information that configures the UE (1200) with the one or more frequency domain basis vector windows and the information that configures the UE (1200) with the number of frequency domain vectors to be selected; and
reporting (1214) the computed CSI.

Embodiment 2: The method of embodiment 1 wherein: the UE is configured with multiple(S) NZP CSI-RS resources for channel measurement; and the one or more frequency domain basis vector windows comprise a single frequency basis window that is commonly used for all S configured NZP CSI-RS resources.

Embodiment 3: The method of embodiment 2 wherein the information that configures the UE with the single frequency domain basis window comprises a starting frequency domain basis vector index, M_init, and a window size N, where N is the number of consecutive frequency domain basis vectors starting from the frequency domain basis vector with index M_init out of a full set of frequency domain basis vectors, wherein the full set of FD basis vectors is determined by an associated number of PMI subbands N3.

Embodiment 4: The method of embodiment 2 wherein the information that configures the UE with the single frequency domain basis window comprises a window size N where N is the number of consecutive frequency domain basis vectors in the single frequency domain basis window, and a starting frequency domain basis index for the single frequency domain basis window is predefined (e.g., in specifications).

Embodiment 5: The method of embodiment 2 wherein the information that configures the UE with the single frequency domain basis window comprises a window size N that includes a full set of frequency domain basis vectors, wherein the full set of FD basis vectors is determined by an associated number of PMI subbands N3.

Embodiment 6: The method of embodiment 2 wherein the UE receives configuration to report S subsets of frequency domain basis vectors within the single frequency domain basis window, where each of the S subsets of FD basis vectors is associated with a respective one of the S configured NZP CSI-RS resources.

Embodiment 7: The method of embodiment 2 wherein the UE receives configuration to report a single subset of frequency domain basis vectors within the single frequency domain basis window.

Embodiment 8: The method of any of embodiments 2 to 7 wherein a common subset of frequency domain basis vectors is selected for all S configured NZP CSI-RS resources from the single frequency domain basis window.

Embodiment 9: The method of embodiment 8 wherein the UE reports the selected common subset of frequency domain basis vectors as part of the CSI via a combinatorial coefficient index.

Embodiment 10: The method of embodiment 8 or 9 wherein the UE performs further down-selection among the selected common subset of frequency domain basis vectors and the further down-selected frequency domain basis vectors are reported in the CSI via a non-zero coefficient bitmap.

Embodiment 11: The method of embodiment 8 or 9 wherein the UE performs further down-selection among the selected common subset of frequency domain basis vectors and the further down-selected frequency domain basis vectors are reported in the CSI via a combinatorial coefficient index.

Embodiment 12: The method of embodiment 1 wherein: the UE is configured with multiple(S) NZP CSI-RS resources for channel measurement; and the one or more frequency domain basis vector windows comprise S frequency domain basis windows, where each of the S frequency domain basis windows is associated with a respective one of the S configured NZP CSI-RS resources.

Embodiment 13: The method of embodiment 12 wherein the information that configures the UE (1200) with each of the S frequency domain basis windows comprises a starting frequency domain basis vector index, M_init,s, and a window size N_s, where N_s is the number of consecutive frequency domain basis vectors starting from the frequency domain basis vector with index M_init,s out of a full set of frequency domain basis vectors, wherein the full set of FD basis vectors is determined by an associated number of PMI subbands N3.

Embodiment 14: The method of embodiment 12 wherein the information that configures the UE (1200) with each of the S frequency domain basis windows comprises a window size N_s, and a starting frequency domain basis vector of the sth frequency domain basis window is preconfigured (e.g., in specifications), where the window size N_s is the number of frequency domain basis vectors in the sth window and M_init,s is the starting frequency domain basis vector of the sth frequency domain basis window.

Embodiment 15: The method of any of embodiments 2 to 14 wherein the UE is configured to select a number of frequency domain basis vectors according to one of the following:

the UE is configured to select a same number of frequency domain basis vectors for each of the S configured NZP CSI-RS resources from the single frequency domain basis window the UE is configured to select a same number of frequency domain basis vectors for each of the S configured NZP CSI-RS resources from the associated window of FD basis vectors among the S frequency domain basis vector windows the UE is configured to select a different number of frequency domain basis vectors for different configured NZP CSI-RS resources from the single frequency domain basis window the UE is configured to select a different number of frequency domain basis vectors for different configured NZP CSI-RS resources from the associated window of frequency domain basis vectors among the of the S frequency domain basis vector windows.

Embodiment 16: The method embodiment 2 to 15 wherein a different subset of frequency domain basis vectors is selected for each of the S configured NZP CSI-RS resources from one of the following from the single FD basis window from the associated FD basis window Embodiment 17: The method of embodiment 16, wherein the UE reports the selected different subset of frequency domain basis vectors in the CSI via a combinatorial coefficient index per configured NZP CSI-RS resource.

Embodiment 18: The method of embodiment 1 wherein: the UE is configured with a single NZP CSI-RS resource for channel measurement, the single NZP CSI-RS resource having multiple(S) sets of CSI-RS ports; and the one or more frequency domain basis vector windows comprise a single frequency basis window that is commonly used for all S sets of CSI-RS ports within the single configured NZP CSI-RS resource.

Embodiment 19: The method of embodiment 18 wherein the information that configures the UE with the single frequency domain basis window comprises a starting frequency domain basis index, M_init, and a window size N, where N is the number of frequency domain basis vectors in the single frequency domain basis window and M_init is a starting frequency domain basis vector within the single frequency domain basis window.

Embodiment 20: The method of embodiment 18 wherein the information that configures the UE with the single frequency domain basis window comprises a window size N where N is the number of frequency domain basis vectors in the single frequency domain basis window, and a starting frequency domain basis index for the single frequency domain basis window is predefined (e.g., in specifications).

Embodiment 21: The method of embodiment 18 wherein the information that configures the UE with the single frequency domain basis window comprises a window size N that includes a full set of frequency domain basis vectors, wherein the full set of FD basis vectors is determined by an associated number of PMI subbands N3.

Embodiment 22: The method of embodiment 18 wherein the UE receives a configuration to report S subsets of frequency domain basis vectors within the single frequency domain basis window, where each of the S subsets of FD basis vectors is associated with a respective one of the S sets of CSI-RS ports within the single configured NZP CSI-RS resource.

Embodiment 23: The method of any of embodiments 18 to 22 wherein a common subset of frequency domain basis vectors is selected for all of the S sets CSI-RS ports within the single configured NZP CSI-RS resource from the single frequency domain basis window.

Embodiment 24: The method of embodiment 23 wherein the UE reports the selected common subset of frequency domain basis vectors as part of the CSI via a combinatorial coefficient index.

Embodiment 25: The method of embodiment 23 or 24 wherein the UE performs further down-selection among the selected common subset of frequency domain basis vectors and the further down-selected frequency domain basis vectors are reported in the CSI via a non-zero coefficient bitmap.

Embodiment 26: The method of embodiment 23 or 24 wherein the UE performs further down-selection among the selected common subset of frequency domain basis vectors and the further down-selected frequency domain basis vectors are reported in the CSI via a combinatorial coefficient index.

Embodiment 27: The method of embodiment 1 wherein: the UE is configured with a single NZP CSI-RS resource for channel measurement, the single NZP CSI-RS resource having multiple(S) sets of CSI-RS ports; and the one or more frequency domain basis vector windows comprise S frequency domain basis windows, where each of the S frequency domain basis windows is associated with a respective one of the S sets of CSI-RS ports within the single configured NZP CSI-RS resource.

Embodiment 28: The method of embodiment 27 wherein the information that configures the UE (1200) with each of the S frequency domain basis windows comprises a starting frequency domain basis index, M_init,s, and a window size N_s, where N_s is the number of consecutive frequency domain basis vectors starting from the frequency domain basis vector with index M_init,s out of a full set of frequency domain basis vectors, wherein the full set of FD basis vectors is determined by an associated number of PMI subbands N3.

Embodiment 29: The method of embodiment 27 wherein the information that configures the UE (1200) with each of the S frequency domain basis windows comprises a window size N_s, and a starting frequency domain basis vector of the sth frequency domain basis window is preconfigured (e.g., in specifications), where the window size N_s is the number of frequency domain basis vectors in the sth window and M_init,s is the starting frequency domain basis vector of the sth frequency domain basis window.

Embodiment 30: The method of any of embodiments 18 to 29 wherein the UE is configured to select a number of frequency domain basis vectors according to one of the following:
the UE is configured to select a same number of frequency domain basis vectors for each of the S sets of CSI-RS ports within the single configured NZP CSI-RS resource from the single frequency domain basis window
the UE is configured to select a same number of frequency domain basis vectors for each of the S sets of CSI-RS ports within the single configured NZP CSI-RS resource from the associated window of FD basis vectors among the of the S frequency domain basis vector windows
the UE is configured to select a different number of frequency domain basis vectors for different sets of CSI-RS ports within the single configured NZP CSI-RS resource from the single frequency domain basis window
the UE is configured to select a different number of frequency domain basis vectors for different sets of CSI-RS ports within the single configured NZP CSI-RS resource from the associated window of frequency domain basis vectors among the of the S frequency domain basis vector windows.

Embodiment 31: The method embodiment 18 to 30 wherein a different subset of frequency domain basis vectors is selected for each of the S sets of CSI-RS ports within the single configured NZP CSI-RS resource from one of the following
from the single FD basis window
from the associated FD basis window Embodiment 32: The method of embodiment 31, wherein the UE reports the selected different subset of frequency domain basis vectors in the CSI via a combinatorial coefficient index per configured NZP CSI-RS resource.

Embodiment 33: The method of any of the previous embodiments, further comprising: providing user data; and forwarding the user data to a host via the transmission to the network node.

Group B Embodiments

Embodiment 34: A method performed by a network node (1202), the method comprising one or more of the following steps:
transmitting (1204), to a user equipment, UE, (1200), information that configures the UE (1200) with:
(a) multiple NZP CSI-RS resources for channel measurement associated with a CSI reporting configuration, where each of the multiple NZP CSI-RS resources is associated with a different TCI state or unified TCI state; or
(b) a single NZP CSI-RS resource for channel measurement associated with the CSI reporting configuration, the single NZP CSI-RS resource comprising (e.g., consisting of) multiple sets of CSI-RS ports wherein each set of CSI-RS ports within the single NZP CSI-RS resource is associated with a different TCI state or unified TCI state; or
(c) both (a) and (b);
transmitting (1208), to the UE (1200), information that configures the UE (1200) with one or more frequency domain basis vector windows that are:
A. per NZP CSI-RS resource or over all configured NZP CSI-RS resources, in the case of configuration of multiple NZP CSI-RS resources for channel measurement; or
B. per set of CSI-RS ports or over all sets of CSI-RS ports, in the case of configuration of a single NZP CSI-RS resource for channel measurement, the single NZP CSI-RS resource comprising the multiple sets of CSI-RS ports; or
C. both A and B;
transmitting (1210), to the UE (1200), information that configures the UE (1200) with a number of frequency domain vectors to be selected, where the number of frequency domain vectors to be selected is:
I. specific to NZP CSI-RS resource or common to all configured NZP CSI-RS resources, in the case of configuration of multiple NZP CSI-RS resources for channel measurement; or
II. specific to a set of CSI-RS ports within the single configured NZP CSI-RS resource or common to all sets of CSI-RS ports within the single configured NZP CSI-RS resource, in the case of configuration of a single NZP CSI-RS resource for channel measurement, the single NZP CSI-RS resource comprising the multiple sets of CSI-RS ports; or
III. both I and II; and
receiving (1214), from the UE (1200), CSI in accordance with the transmitted information that configures the UE (1200) with the one or more frequency domain basis vector windows and the transmitted information that configures the UE (1200) with the number of frequency domain vectors to be selected.

Embodiment 35: The method of any of the previous embodiments, further comprising: obtaining user data; and forwarding the user data to a host or a user equipment.

Group C Embodiments

Embodiment 36: A user equipment, comprising: processing circuitry configured to perform any of the steps of any of the Group A embodiments; and power supply circuitry configured to supply power to the processing circuitry.

Embodiment 37: A network node, the network node comprising: processing circuitry configured to perform any of the steps of any of the Group B embodiments; power supply circuitry configured to supply power to the processing circuitry.

Embodiment 38: A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 39: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

Embodiment 40: The host of the previous embodiment, wherein the cellular network further includes a network node configured to communicate with the UE to transmit the user data to the UE from the host.

Embodiment 41: The host of the previous 2 embodiments, wherein: the processing circuitry of the host is configured to execute a host application, thereby providing the user data; and the host application is configured to interact with a client application executing on the UE, the client application being associated with the host application.

Embodiment 42: A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A embodiments to receive the user data from the host.

Embodiment 43: The method of the previous embodiment, further comprising: at the host, executing a host application associated with a client application executing on the UE to receive the user data from the UE.

Embodiment 44: The method of the previous embodiment, further comprising: at the host, transmitting input data to the client application executing on the UE, the input data being provided by executing the host application, wherein the user data is provided by the client application in response to the input data from the host application.

Embodiment 45: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

Embodiment 46: The host of the previous embodiment, wherein the cellular network further includes a network node configured to communicate with the UE to transmit the user data from the UE to the host.

Embodiment 47: The host of the previous 2 embodiments, wherein: the processing circuitry of the host is configured to execute a host application, thereby providing the user data; and the host application is configured to interact with a client application executing on the UE, the client application being associated with the host application.

Embodiment 48: A method implemented by a host configured to operate in a communication system that further includes a network node and a user equipment (UE), the method comprising: at the host, receiving user data transmitted to the host via the network node by the UE, wherein the UE performs any of the steps of any of the Group A embodiments to transmit the user data to the host.

Embodiment 49: The method of the previous embodiment, further comprising: at the host, executing a host application associated with a client application executing on the UE to receive the user data from the UE.

Embodiment 50: The method of the previous embodiment, further comprising: at the host, transmitting input data to the client application executing on the UE, the input data being provided by executing the host application, wherein the user data is provided by the client application in response to the input data from the host application.

Embodiment 51: A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

Embodiment 52: The host of the previous embodiment, wherein: the processing circuitry of the host is configured to execute a host application that provides the user data; and the UE comprises processing circuitry configured to execute a client application associated with the host application to receive the transmission of user data from the host.

Embodiment 53: A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B embodiments to transmit the user data from the host to the UE.

Embodiment 54: The method of the previous embodiment, further comprising, at the network node, transmitting the user data provided by the host for the UE.

Embodiment 55: The method of any of the previous 2 embodiments, wherein the user data is provided at the host by executing a host application that interacts with a client application executing on the UE, the client application being associated with the host application.

Embodiment 56: A communication system configured to provide an over-the-top service, the communication system comprising: a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

Embodiment 57: The communication system of the previous embodiment, further comprising: the network node; and/or the user equipment.

Embodiment 58: A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

Embodiment 59: The host of the previous 2 embodiments, wherein: the processing circuitry of the host is configured to execute a host application, thereby providing the user data; and the host application is configured to interact with a client application executing on the UE, the client application being associated with the host application.

Embodiment 60: The host of the any of the previous 2 embodiments, wherein the initiating receipt of the user data comprises requesting the user data.

Embodiment 61: A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B embodiments to receive the user data from the UE for the host.

Embodiment 62: The method of the previous embodiment, further comprising at the network node, transmitting the received user data to the host.

Those skilled in the art will recognize improvements and modifications to the embodiments of the present disclosure. All such improvements and modifications are considered within the scope of the concepts disclosed herein.

The invention claimed is:

1. A method performed by a User Equipment (UE), the method comprising the following steps:

receiving, from a network node, information for a Channel State Information (CSI) reporting configuration that configures the UE with:

multiple Non-Zero Power (NZP) CSI Reference Signal (CSI-RS) resources for channel measurement associated with the CSI reporting configuration, where each of the multiple NZP CSI-RS resources is associated with a different Transmission Configuration Indicator (TCI) state or unified TCI state; and a parameter combination indicating at least a total number of Frequency Domain (FD) basis vectors to be selected across the multiple NZP CSI-RS resources or a plurality of sets of CSI-RS ports;

performing channel measurement on:

the configured multiple NZP CSI-RS resources according to the respective TCI state or unified TCI state;

receiving, from the network node, information that configures the UE with one or more FD basis vector windows that are over all configured NZP CSI-RS resources, in the case of configuration of multiple NZP CSI-RS resources for channel measurement;

receiving, from the network node, information that configures the UE with a number of FD basis vectors to be selected, where the number of FD basis vectors to be selected is common to all configured NZP CSI-RS resources, in the case of configuration of multiple NZP CSI-RS resources for channel measurement;

computing CSI based on the channel measurements and in accordance with the received information that configures the UE with the one or more frequency domain basis vector windows and the information that configures the UE with the number of FD basis vectors to be selected; and reporting the computed CSI.

2. The method of claim 1, wherein:

the UE is configured with multiple(S) NZP CSI-RS resources for channel measurement; and the one or more frequency domain basis vector windows comprise a single FD basis window that is applicable for all S configured NZP CSI-RS resources.

3. The method of claim 2, wherein the information that configures the UE with the single FD basis window comprises an index (M_init) of a starting FD basis vector in the single FD basis window and a window size N, where N is a number of consecutive FD basis vectors in the single FD basis window.

4. The method of claim 3, wherein the starting FD basis vector index for the single FD basis window is predefined.

5. The method of claim 2, wherein a common subset of FD basis vectors is selected for all S configured NZP CSI-RS resources from the single FD basis window.

6. The method of claim 5, wherein the UE reports the selected common subset of FD basis vectors as part of the CSI via a combinatorial coefficient index.

7. The method of claim 5, wherein the UE performs further down-selection among the selected common subset of FD basis vectors and the further down-selected FD basis vectors are reported in the CSI via a non-zero coefficient bitmap.

8. The method of claim 1, wherein for each of the multiple(S) configured NZP CSI-RS resources, the corresponding selected FD basis vectors are phase rotated such that a zero-th FD basis vector is always selected, wherein the rotated phase is reported as part of the CSI.

9. A User Equipment (UE) comprising one or more transmitters;

one or more receivers; and processing circuitry associated with the one or more transmitters and the one or more receivers, the processing circuitry configured to cause the UE to perform one or more of the following:

receiving, from a network node, information for a Channel State Information (CSI) reporting configuration that configures the UE with:

multiple Non-Zero Power (NZP) CSI Reference Signal (CSI-RS) resources for channel measurement associated with a CSI reporting configuration, where each of the multiple NZP CSI-RS resources is associated with a different Transmission Configuration Indicator (TCI) state or unified TCI state; and a parameter combination indicating at least a total number of Frequency Domain (FD) basis vectors to be selected across the multiple NZP CSI-RS resources or a plurality of sets of CSI-RS ports;

performing channel measurement on:

the configured multiple NZP CSI-RS resources according to the respective TCI state or unified TCI state;

receiving, from the network node, information that configures the UE with one or more FD basis vector windows that are over all configured NZP CSI-RS resources, in the case of configuration of multiple NZP CSI-RS resources for channel measurement;

receiving, from the network node, information that configures the UE with a number of FD basis vectors to be selected, where the number of FD basis vectors to be selected is common to all configured NZP CSI-RS resources, in the case of configuration of multiple NZP CSI-RS resources for channel measurement;

computing CSI based on the channel measurements and in accordance with the received information that configures the UE with the one or more FD basis vector windows and the information that configures the UE with the number of FD basis vectors to be selected; and reporting the computed CSI.

10. The UE of claim 9, wherein:

the UE is configured with multiple(S) NZP CSI-RS resources for channel measurement; and the one or more FD basis vector windows comprise a single FD basis window that is applicable for all S configured NZP CSI-RS resources.

11. The UE of claim 10, wherein the information that configures the UE with the single FD basis window comprises an index (M_init) of a starting FD basis vector in the single FD basis window and a window size N, where N is a number of consecutive FD basis vectors in the single FD basis window.

12. The UE of claim 11, wherein the starting FD basis vector index for the single FD basis window is predefined.

13. The UE of claim 10, wherein a common subset of FD basis vectors is selected for all S configured NZP CSI-RS resources from the single FD basis window.

14. The UE of claim 13, wherein the UE reports the selected common subset of FD basis vectors as part of the CSI via a combinatorial coefficient index.

15. The UE of claim 13, wherein the UE performs further down-selection among the selected common subset of FD basis vectors and the further down-selected FD basis vectors are reported in the CSI via a non-zero coefficient bitmap.

16. The UE of claim 9, wherein for each of the multiple(S) configured NZP CSI-RS resources, the corresponding selected FD basis vectors are phase rotated such that a zero-th FD basis vector is always selected, wherein the rotated phase is reported as part of the CSI.

17. A method performed by a network node, the method comprising:

transmitting, to a User Equipment (UE), information that configures the UE with:

multiple Non-Zero Power (NZP) Channel State Information (CSI) Reference Signal (CSI-RS) resources for channel measurement associated with a CSI reporting configuration, where each of the multiple NZP CSI-RS resources is associated with a different Transmission Configuration Indicator (TCI) state or unified TCI state;

transmitting, to the UE, information that configures the UE with one or more Frequency Domain (FD) basis vector windows that are: over all configured NZP CSI-RS resources, in the case of configuration of multiple NZP CSI-RS resources for channel measurement;

transmitting, to the UE, information that configures the UE with a number of FD basis vectors to be selected, where the number of FD basis vectors to be selected is:

common to all configured NZP CSI-RS resources, in the case of configuration of multiple NZP CSI-RS resources for channel measurement; and receiving, from the UE, CSI in accordance with the transmitted information that configures the UE with the one or more FD basis vector windows and the transmitted information that configures the UE with the number of FD basis vectors to be selected.

* * * * *